US011358171B2

(12) United States Patent
Bewlay et al.

(10) Patent No.: US 11,358,171 B2
(45) Date of Patent: Jun. 14, 2022

(54) COATING SYSTEM AND METHOD

(71) Applicant: General Electric Company, Schenectady, NY (US)

(72) Inventors: Bernard Patrick Bewlay, Niskayuna, NY (US); Ambarish Jayant Kulkarni, Niskayuna, NY (US); Byron Pritchard, Cincinnati, OH (US); Krzysztof Lesnicki, Niskayuna, NY (US); Hrishikesh Keshavan, Niskayuna, NY (US); Mehmet Dede, Cincinnati, OH (US); Larry Rosenzweig, Clifton Park, NY (US); Jay Morgan, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/777,448

(22) Filed: Jan. 30, 2020

(65) Prior Publication Data

US 2020/0164392 A1 May 28, 2020

Related U.S. Application Data

(60) Division of application No. 15/460,729, filed on Mar. 16, 2017, now Pat. No. 10,589,300, which is a
(Continued)

(51) Int. Cl.
*B05D 1/02* (2006.01)
*B05B 7/10* (2006.01)
(Continued)

(52) U.S. Cl.
CPC ............ *B05D 1/02* (2013.01); *B05B 1/046* (2013.01); *B05B 7/025* (2013.01); *B05B 7/045* (2013.01);
(Continued)

(58) Field of Classification Search
None
See application file for complete search history.

(56) References Cited

U.S. PATENT DOCUMENTS 1,513,624 A * 10/1924 Parker .................. B05B 7/0433
239/404
2,564,677 A 8/1951 Davis
(Continued)

FOREIGN PATENT DOCUMENTS

EP 1494020 A1 1/2005
EP 2889711 A2 7/2015
(Continued)

OTHER PUBLICATIONS

Rai, et al.; CMAS-Resistant Thermal Barrier Coatings (TBC); International Journal of Applied Ceramic Technology May 2009; vol. 7, Issue 5; pp. 662-674.
(Continued)

*Primary Examiner* — Michael P. Rodriguez
(74) *Attorney, Agent, or Firm* — Fitch, Even, Tabin & Flannery LLP

(57) ABSTRACT

An atomizing spray device includes a housing having plural inlets and one or more outlets fluidly coupled with each other by an interior chamber. The inlets include a first inlet shaped to receive a first fluid and a second inlet shaped to receive a slurry of ceramic particles and a second fluid. The interior chamber in the housing is shaped to mix the first fluid received via the first inlet with the slurry received via the second inlet inside the housing to form a mixture in a location between the inlets and the one or more outlets. The interior chamber in the housing also is shaped to direct the mixture formed inside the housing as droplets outside of the housing via the one or more outlets such that, based on a discharged amount of the first fluid in the droplets, the first
(Continued)

fluid promotes evaporation of the second fluid as the droplets traverse from the housing toward a surface of a component.

18 Claims, 22 Drawing Sheets

Related U.S. Application Data continuation-in-part of application No. 15/368,242, filed on Dec. 2, 2016, now Pat. No. 10,265,725, and a continuation-in-part of application No. 15/368,185, filed on Dec. 2, 2016, now Pat. No. 10,384,808.

(51) Int. Cl.
| | |
|---|---|
| *B05B 7/16* | (2006.01) |
| *B64F 5/40* | (2017.01) |
| *B05B 7/08* | (2006.01) |
| *F01D 5/00* | (2006.01) |
| *B05B 7/04* | (2006.01) |
| *B05B 7/02* | (2006.01) |
| *B05B 7/06* | (2006.01) |
| *B05B 12/00* | (2018.01) |
| *B05B 1/04* | (2006.01) |
| *B05B 13/04* | (2006.01) |

(52) U.S. Cl.
CPC .............. *B05B 7/067* (2013.01); *B05B 7/068* (2013.01); *B05B 7/0876* (2013.01); *B05B 7/0892* (2013.01); *B05B 7/10* (2013.01); *B05B 7/1686* (2013.01); *B05B 12/00* (2013.01); *B64F 5/40* (2017.01); *F01D 5/005* (2013.01); *B05B 13/0431* (2013.01); *F05D 2230/30* (2013.01); *F05D 2230/72* (2013.01); *F05D 2260/80* (2013.01); *F05D 2300/611* (2013.01)

(56) References Cited

U.S. PATENT DOCUMENTS

| | | | |
|---|---|---|---|
| 3,131,091 A | | 4/1964 | Jones |
| 3,635,401 A | | 1/1972 | Bromley |
| 3,925,580 A | * | 12/1975 | Brewer .................... B05D 1/02 427/372.2 |
| 5,262,206 A | | 11/1993 | Rangaswamy et al. |
| 5,372,312 A | | 12/1994 | Vidusek |
| 5,453,383 A | * | 9/1995 | Roufs ................... A23G 3/2092 118/19 |
| 5,474,235 A | * | 12/1995 | Cole ..................... B05B 7/0458 239/431 |
| 6,010,746 A | | 1/2000 | Descoteaux et al. |
| 7,506,822 B2 | | 3/2009 | Cairo et al. |
| 7,582,359 B2 | | 9/2009 | Sabol et al. |
| 7,690,840 B2 | | 4/2010 | Zombo et al. |
| 8,221,825 B2 | | 7/2012 | Reitz et al. |
| 8,356,482 B2 | | 1/2013 | Duval et al. |
| 8,470,460 B2 | | 6/2013 | Lee |
| 8,742,944 B2 | | 6/2014 | Mitchell et al. |
| 8,758,502 B2 | | 6/2014 | Nienburg et al. |
| 8,986,778 B2 | | 3/2015 | Zombo |
| 9,073,077 B2 | | 7/2015 | Unosawa et al. |
| 9,096,763 B2 | | 8/2015 | Belov et al. |
| 9,102,015 B2 | | 8/2015 | Kulkarni et al. |
| 9,212,947 B2 | | 12/2015 | Feist et al. |
| 9,341,586 B2 | | 5/2016 | Henderkott et al. |
| 9,395,301 B2 | | 7/2016 | Cheverton et al. |
| 9,983,147 B2 | | 5/2018 | Ahmadian et al. |
| 10,994,287 B2 | | 5/2021 | Kulkarni et al. |
| 2003/0221315 A1 | | 12/2003 | Baumann et al. |
| 2004/0124268 A1 | | 7/2004 | Frazier et al. |
| 2004/0228976 A1 | | 11/2004 | Skoog et al. |
| 2006/0006589 A1 | * | 1/2006 | Canova ................. C04B 35/111 264/661 |
| 2006/0045985 A1 | | 3/2006 | Kozak |
| 2009/0169752 A1 | | 7/2009 | Fu et al. |
| 2009/0252985 A1 | | 10/2009 | Nagaraj et al. |
| 2012/0009080 A1 | | 1/2012 | Shaw et al. |
| 2012/0283963 A1 | | 11/2012 | Mitchell et al. |
| 2014/0261824 A1 | | 9/2014 | Byers et al. |
| 2015/0028132 A1 | | 1/2015 | Vidusek et al. |
| 2015/0160097 A1 | | 6/2015 | Haldeman et al. |
| 2015/0355055 A1 | | 12/2015 | Utay |
| 2016/0069743 A1 | | 3/2016 | McQuilkin et al. |
| 2016/0160679 A1 | | 6/2016 | Griffiths et al. |
| 2016/0207639 A1 | | 7/2016 | Ellis et al. |
| 2017/0157719 A1 | | 6/2017 | Diwinsky et al. |
| 2017/0173611 A1 | | 6/2017 | Tan et al. |
| 2017/0361919 A1 | | 12/2017 | Waddleton |
| 2018/0002816 A1 | | 1/2018 | Kennedy et al. |
| 2018/0154381 A1 | | 6/2018 | Bewlay et al. |
| 2018/0250688 A1 | | 9/2018 | Kulkarni et al. |
| 2019/0003954 A1 | | 1/2019 | Detor et al. |

FOREIGN PATENT DOCUMENTS

| | | |
|---|---|---|
| EP | 3043299 A1 | 7/2016 |
| EP | 3214519 A1 | 9/2017 |
| WO | 2007023292 A2 | 3/2007 |
| WO | 2012151150 A1 | 11/2012 |
| WO | 2015086957 A2 | 6/2015 |
| WO | 2015116300 A3 | 8/2015 |

OTHER PUBLICATIONS

Bilge Senturk, et al.; CMAS-Resistant Plasma Sprayed Thermal Barrier Coatings Based on Y2O3-Stablized ZrO2 with Al3+ and Ti4+ Solute Additions; Journal of Thermal Spray Technology, Apr. 2014; vol. 23, Issue 4; pp. 708-715.

Wu, et al.; Evaluation of Plasma Sprayed YSZ Thermal Barrier Coatings with the CMAS Deposits Infiltration using Impedance Spectroscopy; Progress in Natural Science: Material International; Feb. 2012; vol. 22, Issue 1; pp. 40-47.

Steinke et al., A Novel Test Approach for Plasma-Sprayed Coatings Tested Simultaneously Under CMAS and Thermal Gradient Cycling Conditions, Surface and Coatings Technology 205.7, 2010, pp. 2287-2295.

\* cited by examiner

```
                    1300 ─┐
                          ↘

┌─────────────────────────────┐
         │ Coating application determined │──1302
         └──────────────┬──────────────┘
                        ↓
         ┌─────────────────────────────┐
         │   Providing a spray device    │──1304
         └──────────────┬──────────────┘
                        ↓
         ┌─────────────────────────────┐
         │   Selecting a first fluid for  │
         │ mixing with ceramic particles │──1306
         │  for promoting evaporation of │
         │           the fluid           │
         └──────────────┬──────────────┘
                        ↓
         ┌─────────────────────────────┐
         │  Selecting the temperature of │
         │  the first fluid to promote   │──1308
         │    evaporation of the fluid   │
         └──────────────┬──────────────┘
                        ↓
         ┌─────────────────────────────┐
         │  Forming a two-phase droplet  │
         │ by discharging a slurry having│──1310
         │ the first fluid and a gas from│
         │        the spray device       │
         └──────────────┬──────────────┘
                        ↓
         ┌─────────────────────────────┐
         │   Traversing the two-phase    │──1312
         │  droplets toward a component  │
         └──────────────┬──────────────┘
                        ↓
         ┌─────────────────────────────┐
         │ Evaporating the first fluid from│
         │  the two-phase droplets while   │──1314
         │  they traverse through the air  │
         └──────────────┬──────────────┘
                        ↓
         ┌─────────────────────────────┐
         │    Coating a surface of the   │──1316
         │   component with the droplets │
         └─────────────────────────────┘
```

FIG. 21

COATING SYSTEM AND METHOD

CROSS-REFERENCE TO RELATED APPLICATIONS

This application is a divisional of U.S. patent application Ser. No. 15/460,729, filed 16 Mar. 2017 (now U.S. Pat. No. 10,589,300, issued 17 Mar. 2020), which is a continuation-in-part of U.S. patent application Ser. No. 15/368,242, filed 2 Dec. 2016 (now U.S. Pat. No. 10,265,725, issued 23 Apr. 2019), and U.S. patent application Ser. No. 15/368,185, filed 2 Dec. 2016 (now U.S. Pat. No. 10,384,808, issued 20 Aug. 2019), the entire disclosures of which are incorporated herein by reference.

FIELD

The subject matter described herein relates to engine maintenance.

BACKGROUND

Turbine engines in commercial aircraft have routine maintenance schedules to reduce downtime of the engines and systems (e.g., vehicles) that rely on continued operation of the engines. Different components and features of the engine react differently to engine wear and use over time, depending on factors such as the extent of use and environmental conditions to which the engine is exposed.

A thermal barrier coating may be used in the turbine engine to protect the engine from heat within the engine. Over time, thermal barrier coatings degrade as a result of spallation and other damage, such as exposure to exhaust heat wearing down the coatings. As the thermal barriers degrade, the turbines are more susceptible to failures and the coatings may need to be restored or replaced. Typically, a thermal barrier coating is restored at regularly scheduled maintenance intervals by disassembling the turbine engine so that a restorative thermal barrier coating can be applied.

This maintenance of the engine results in significant down time and expense. The thermal barrier coating may not wear and degrade in the same manner for each individual aircraft or system that includes an engine with a thermal barrier coating. Thus, a thermal barrier coating may need to be restored at intervals that do not coincide with the regularly scheduled maintenance schedule of the engine or aircraft. The end result is either reduced engine performance resulting from a coating in use that needs to be restored, or unnecessary down time spent restoring a coating that does not need to be restored.

Atomizing spray devices are utilized in many different applications to apply coatings onto machinery such as engines, such as thermal barrier coatings. Typically, the thermal barrier coating is restored by disassembly of the turbine engine so that a restorative thermal barrier coating can be applied. This is problematic where the engine is being utilized as the amount of downtime required for disassembly greatly impacts costs and efficiencies of operating the engine (or systems that rely on operation of the engine).

BRIEF DESCRIPTION

In one embodiment, an atomizing spray device includes a housing having plural inlets and one or more outlets fluidly coupled with each other by an interior chamber. The inlets include a first inlet shaped to receive a first fluid and a second inlet shaped to receive a slurry of ceramic particles and a second fluid. The interior chamber in the housing is shaped to mix the first fluid received via the first inlet with the slurry received via the second inlet inside the housing to form a mixture in a location between the inlets and the one or more outlets. The interior chamber in the housing also is shaped to direct the mixture formed inside the housing as droplets outside of the housing via the one or more outlets such that, based on a discharged amount of the first fluid in the droplets, the first fluid promotes evaporation of the second fluid as the droplets traverse from the housing toward a surface of a component.

In one embodiment, a method includes receiving a first fluid into a housing of an atomizing spray device through a first inlet of the housing, receiving a slurry of ceramic particles and a second fluid into the housing of the atomizing spray device through a second inlet of the housing, mixing the first fluid and the slurry in an interior chamber of the housing of the atomizing spray device to form a mixture in a location between the first and second inlets and one or more outlets, and directing the mixture outside of the housing of the atomizing spray device as droplets via the one or more outlets such that, based on a discharged amount of the first fluid in the droplets, the first fluid promotes evaporation of the second fluid as the droplets traverse from the housing toward a surface of a component.

In one embodiment, an atomizing spray device includes a housing having plural inlets through a first surface of the housing and one or more outlets through a different, second surface of the housing. The housing includes an interior chamber that fluidly couples the inlets with the one or more outlets. The inlets include a first inlet shaped to receive a first fluid and a second inlet shaped to receive a slurry of ceramic particles and a second fluid. The interior chamber in the housing is shaped to mix the first fluid received via the first inlet with the slurry received via the second inlet inside the housing to form a mixture in a location between the inlets and the one or more outlets. The interior chamber in the housing also is shaped to direct the mixture formed inside the housing as droplets outside of the housing via the one or more outlets such that, based on a discharged amount of the first fluid in the droplets, the first fluid promotes evaporation of the second fluid as the droplets traverse from the housing toward a surface of a component.

BRIEF DESCRIPTION OF THE DRAWINGS

FIG. 1 is a schematic diagram of a control system for determining coating restoration maintenance in accordance with one embodiment;

FIG. 2 is a schematic diagram of a coating restoration system;

FIG. 3 illustrates a flow chart of a method for determining maintenance for a turbine engine;

FIG. 4 illustrates a flow chart of a method of restoring a coating;

FIG. 5 is a schematic diagram of a coating system;

FIG. 6 is a perspective view of an atomizing spray device in accordance with one embodiment;

FIG. 7 is a sectional view of the atomizing spray device of FIG. 6 taken along the line 7-7 shown in FIG. 6;

FIG. 8 is a cut away plan view of the atomizing spray device of FIG. 6;

FIG. 9 is a perspective view of an atomizing spray device in accordance with one embodiment;

FIG. 10 is a sectional view of the atomizing spray device of FIG. 9 taken along the line 10-10 shown in FIG. 9;

FIG. 11 is a cut away plan view of the atomizing spray device of FIG. 9;

FIG. 21 is a flow chart of a method of coating a surface utilizing an atomizing spray device

DETAILED DESCRIPTION

Figure 1:
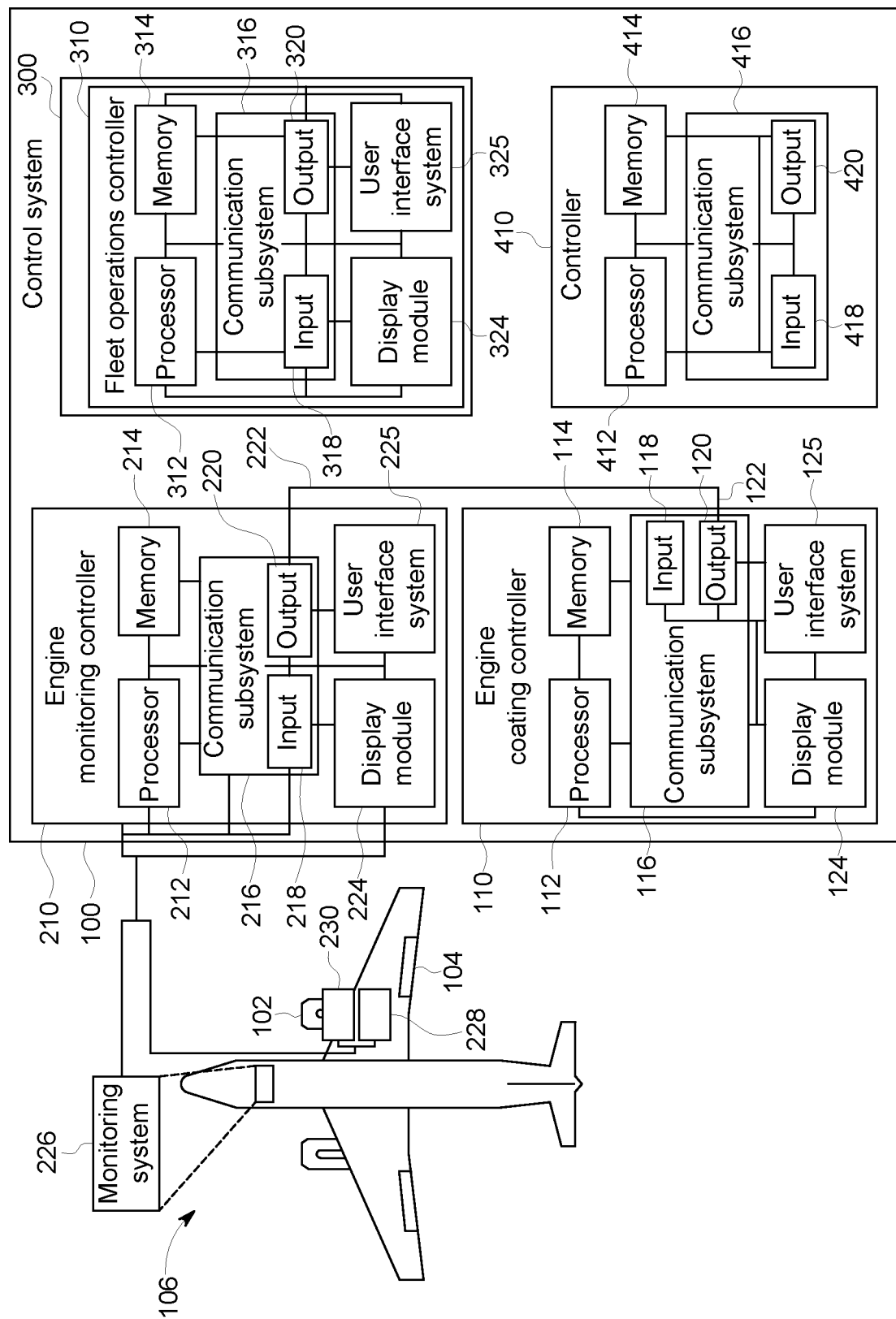

A control system has one or more engine controllers that are configured to provide an analytics-based engine to restore protective coatings, such as thermal barrier coatings, on turbine components. The one or more engine controllers use engine parameters such as engine operating data, data and information received from a monitoring system or engine monitoring controller, data and information inputted into the one or more controllers of a coating restoration system, data and information received from an auxiliary control controller or system such as a vehicle control system (e.g., of an aircraft or other type of vehicle), to identify coating degradation and to determine when to perform a coating restoration procedure.

The control system monitors engine performance parameters or operational parameters. Responsive to detection of degradation based on these parameters, one or more coatings within the engine are restored while the engine is still in an installed configuration with reduced disruption to the operation of the powered system in which the engine is disposed. The installation can occur during an on-wing configuration for an aircraft engine, or in a field installation for an industrial power turbine.

The one or more engine controllers are configured to communicate with one or more controllers of a coating restoration system and/or determine when a coating restoration system is to perform the restoration. The coating restoration system includes a mobile supply unit and a spray nozzle coupled to the supply unit. The spray nozzle provides the coating in a slurry form onto components inside the engine. The mobile supply unit of the coating restoration system could include a power supply, an air supply, a water supply, and a coating restoration system mounted to a transport vehicle. The coating restoration application system supplies and stores the restoration coating agent so that the agent can be delivered to the spray nozzle for application in the turbine engine. The mobile supply unit for providing the coating restoration could be in the back of a truck; the mobile supply unit may be incorporated into a work cart, trailer, or other type of vehicle or support structure.

The one or more engine controllers are in communication with components of the gas turbine engines and the coating restoration system by communication links (e.g., including wired and/or wireless, direct or indirect, connections). The control system also includes a monitoring system that is in communication with the one or more engine controllers. The monitoring system has an engine performance monitor that monitors engine use data such that the one or more engine controllers can use the data to determine or predict when a coating restoration of a component such as a turbine engine should be performed. The engine use data can include data including full flight and full service exposure data for the turbine engine, the environmental conditions in which the turbine engine has operated and the like. The one or more engine controllers are configured to determine the efficacy of a selected or recommended coating restoration procedure. The one or more engine controllers can also determine a coating restoration schedule based on a specified objective (e.g., prolong engine life, improve performance, or improve efficiency), based on historical engine data and/or other engine operational data. The one or more engine controllers make the determinations by making calculations using an algorithm, comparing data to historical engine data in a look-up table, or the like.

The control system comprises one or more hardware components, software components or computer-executable components and data structures including a maintenance determination routine. The one or more engine controllers interface with the monitoring system to determine when to apply one or more additives to a thermal barrier coating to restore the coating. The one or more engine controllers make determinations of when to apply the one or more additives based on data and information received from the monitoring system. The one or more engine controllers optionally estimate an improved or increased useful life span or service life of the coating or engine resulting from restoration of the thermal barrier coating.

The one or more engine controllers utilize the engine performance information generated by the engine performance monitor to determine when to restore a coating in order to maintain or improve the performance of an engine system. If performance of the engine is severely degraded, the one or more engine controllers are configured to initiate a coating restoration event. If an engine is operating normally, the one or more engine controllers are configured to determine one or more future coating restorations for the engine at time intervals based on a number of coating restoration schedule criteria. These criteria include usage data (e.g., how often the engine is scheduled or expected to be used, flight or other travel plans of a vehicle that is propelled by operation of the engine, operating conditions of the engine (e.g., short or long duration missions, altitude, humidity, frequency of accelerations versus cruising segments, etc.), characteristics of the coating restoration technique, and the like.

The one or more engine monitoring controllers receive the operational information from an engine performance monitor that indicates the usage of the engine. The one or more engine monitoring controllers can be the engine controller of an aircraft or other vehicle. The one or more engine monitoring controllers may be a Full Authority Digital Engine Controller (FADEC), a component thereof, or a separate module in communication with a FADEC (e.g., via one or more electronic communication links or networks). Optionally, the monitoring system includes an on-board engine monitor, of a range of characteristics, such as the frequency of data acquisition.

The one or more engine monitoring controllers also include hardware, firmware, and/or software components that are configured to perform a range of functions such as communicating and utilizing information and data, making determinations including calculation based on information and data and the like similar to the one or more engine controllers. The one or more engine monitoring controllers include one or more processors (e.g. one or more microprocessors, microcontrollers, digital signal processors, etc.), memory, and an input/output (I/O) subsystem. The one or more engine monitoring controllers can be a laptop computer, or mobile device (e.g., a tablet computer, smart phone, body-mounted device or wearable device, etc.), a server, an enterprise computer system, a network of computers or the like.

The input and output subsystems of the one or more engine monitoring controllers are communicatively coupled to hardware, firmware, and/or software components, including a data storage device, a display, a user interface subsystem, a communication subsystem, the engine performance monitor of the monitoring system and the one or more engine coating controllers. Portions of the engine performance monitor and the one or more controllers of the control system may reside at least temporarily in the data storage device and/or other data storage devices that are part of a fleet management system.

The communication subsystem of the one or more engine monitoring controllers connects the one or more engine monitoring controllers to other computing devices and/or systems by one or more networks. The network(s) may be a cellular network, a local area network, a wide area network (e.g., Wi-Fi), a cloud, a virtual personal network (e.g., VPN), an Ethernet network, and/or a public network such as the Internet. The communication subsystem may, alternatively or in addition, enable shorter-range wireless communications between the one or more engine monitoring controllers and other computing devices, using, for example, Bluetooth and/or other technology. Accordingly, the communication sub-system may include one or more optical, wired and/or wireless network interface subsystems, cards, adapters, or other devices, as may be needed pursuant to the specifications and/or design of the particular engine monitoring controller.

The control system can also include one or more fleet operations controllers that are in communication with the one or more engine controllers such that scheduling determinations are communicated to the one or more fleet operations controllers. Thus, in addition to single engine coating restoration schedule generation, schedules for full fleets of engines or vehicles also may be generated. A communication system of the one or more engine controllers communicates outputs of one or more of the engine performance monitor, the one or more engine monitoring controllers and/or the one or more engine controllers to the one or more fleet operations controllers and/or the one or more controllers of the coating restoration system. Portions of engine health data and/or coating restoration schedule data, may be supplied to the one or more fleet operations controllers and/or the one or more controllers of the coating restoration system. Therefore, the one or more fleet operations controllers are configured to manage turbine engine coating restoration for a fleet of aircraft.

The one or more engine monitoring controllers compare the real-time engine operating conditions to historical data of similar engines that are operating appropriately. By monitoring historical operational data of the engine in a test cell or of similar engines that are operating appropriately, an engine profile is developed over time using model-based control algorithms. Based on the comparison of the real-time operating conditions to the engine profile, the one or more monitoring engine controllers or the one or more engine monitoring controllers predict or determine the engine performance at a particular time. Therefore, after an engine is built, the engine is tested in a test cell to make sure that it meets the performance requirements to ensure the engine is operating normally before use in the field. The data for each engine is acquired in a test cell and then incorporated into the model-based control algorithm so the control algorithm can determine an engine profile.

This test information for specific engines is used to build the control algorithms, and then, on-wing, the measured engine output is compared to this engine profile at a specific point in the engine life that is under consideration. Thus, the turbine parameters such as temperature and turbine component temperatures can be measured in a test cell and these measurements can be compared with subsequent on-wing temperature measurements. If the difference between the measurements obtained in the test cell and the measurements obtained on-wing) exceeds certain prescribed values, then the one or more engine controllers or one or more engine monitoring controllers are configured to determine that the turbine temperature is deteriorating over time, and a coating restoration is required. A predetermined range can be set for each parameter or combination of parameters. Then based on whether the parameter, combination of parameters, calculated parameters or the like, fall within the predetermined range, the one or more engine controllers determines when to restore the coatings, such as by scheduling a time for restoration of the coatings.

The one or more controllers of the coating restoration system can be one or more computing devices configured to manage engine coating restoration services. The one or more controllers of the coating restoration system are operated by an engine coating restoration service, such as at an A check, C check, or procedure at an airport. The one or more controllers of a coating restoration system is in communication with all of the other controllers of the control system, including the one or more engine controllers, one or more fleet operations controllers, and the one or more engine monitoring controllers. The one or more controllers of a coating restoration system includes an engine coating restoration history database and a coating restoration parameters database. The engine coating restoration database stores information related to the coating restoration history of the turbine engine system, such as, when was the date of the last coating restoration of the turbine engine and what coating restoration was performed.

The term "database" may refer to, among other things, a computerized data structure capable of storing information for easy retrieval (e.g., a keyword search) or a computer program command. Portions of each database may be embodied as, for example, a file, a table, or a database. While not specifically shown, the fleet management system may include other computing devices (e.g., servers, mobile computing devices, etc.), which may be in communication with each other and/or the other controllers in the control system.

The engine coating restoration history can also be stored on the engine maintenance history database. The coating restoration parameters database includes information related to the coating restoration regimens available to be used to restore a particular turbine engine, such as data on all available coating restoration regimens, which coating restoration regimens are available at which locations geographically, whether a coating restoration crew at a particular location is available to perform a coating restoration, and the like. All historical data stored at the one or more controllers of the coating restoration system is communicated to all the controllers within the control system to be utilized in determinations, calculations, algorithms and as otherwise needed by the controllers within the control system.

The one or more controllers of the coating restoration system obtain and store historical data about the engine or the coating restoration history of the engine. This is through data inputted into the one or more controllers and data determined in real-time and stored within the memories of the one or more controllers. The one or more controllers of the coating restoration system are configured to use historical data to determine an engine coating restoration scheme for the operator. The one or more controllers of the coating restoration system communicate with the other controllers in the control system to determine when to restore a coating, such as by scheduling maintenance intervals, based upon certain parts or modules of the turbine engine that need replacement. Thus, the one or more controllers of the coating restoration system are configured to determine the amount of restoration required for an individual component or module. Consequently, the one or more controllers of the coating restoration system are configured to determine if an engine merely needs a minor overhaul/restoration procedure, and based on the restoration required the one or more controllers of the coating restoration system initiate a coating restoration. Thus, the engine coating or coatings are restored and the engine is quickly returned to service, thereby extending the efficiency of the engine until a major overhaul is required.

The one or more controllers of the coating restoration system monitor multiple parameters of the engine including and in addition to the historical data. Such parameters of the engine include one or more of an engine exhaust temperature, a condition of the coating of the engine, engine fuel flow, compressor exit pressure, compressor exit temperature, engine derating, engine speed, engine cycles, engine power use, auxiliary power use, environmental conditions, ambient airplane temperature or dates of engine use. The condition of the coating may be or represent the presence or absence of spalling in the coating, and/or an amount (e.g., number) of spalling or locations of spalling. The engine derating may occur when the output of the engine is less than a directed output. For example, an engine that remains at the same throttle position may derate when the power output by the engine decreases (while remaining at the same throttle position). The number of engine cycles represents the number of times that the engine is turned on from an inactive or off state, the engine operates for a period of time to perform work, and the engine is then deactivated or turned to an off state. The auxiliary power use may indicate how much work performed by the engine (e.g., how much current generated by operation of the engine) is used for auxiliary power consumption, such as for powering loads that do not propel a vehicle. The environmental conditions may indicate the presence (or absence) of dust in the environment in which the engine operates, and/or the ambient temperatures in which the engine operates.

Optionally, the condition of the coating may be altered or may otherwise impact how and/or when the additive is sprayed onto the component. For example, if the component has a new (e.g., not used in the field) thermal barrier coating, the coating may need to be roughened and made less smooth in order to ensure that the sprayed additive adheres to the surface. If the component is a fielded part of an engine and/or is undergoing an overhaul procedure, then there may not be a need to roughen the surface. This could include a fielded part in an engine that is still on the wing of an aircraft or in the field, a repaired part in an engine or component in an overhaul shop, or the like. Some surfaces may require cleaning prior to spraying the additive onto the surfaces. For example, a part with a thermal barrier coating having dust on the coating may need to be cleaned prior to spraying the additive onto the coating.

Other parameters may include operational parameters indicative of operations or work performed by the engine or components of the engine. In one embodiment, the operational parameters may indicate the temperature, air flow, time of usage, etc., of hot gas components of the engine, such as that of a combustor, turbine blade, turbine vane, turbine vane, turbine shroud, and/or combustor fuel nozzle.

Different parameters may impact when the additive is to be added to the coating during restoration of the coating in different ways. For example, hotter engine exhaust temperatures may require application of the additive sooner than for cooler engine exhaust temperatures. The presence of spalling and/or a greater amount or degree of spalling may require application of the additive sooner than for an absence or smaller amount or degree of spalling. Greater amounts of fuel flowing to the engine may require application of the additive sooner than for lesser amounts of fuel flowing to the engine. Increased compressor exit pressures and/or temperatures may require application of the additive sooner than for smaller or cooler compressor exit pressures and/or temperatures. Derating of the engine may indicate that application of the additive needs to occur sooner than for engines that do not derate or that derate by a lesser amount. Engines operating at faster engine speeds and/or over more engine cycles may require application of the additive to the coating sooner than for slower engine speeds and/or fewer engine cycles. Engines producing greater amounts of power (e.g., relative to a designated threshold) may require application of the additive to the coating sooner than for engines producing lesser amounts of power. Engines that operate to power greater amounts of auxiliary loads may require application of the additive to the coating sooner than for engines powering less or fewer auxiliary loads.

The one or more controllers of the coating restoration system are configured to issue a prompt or notification in order to prevent the occurrence of a restoration cycle (e.g., an event whereby at least part of the coating is restored by applying an additive to the coating), if the one or more controllers of the coating restoration system determine that removal of the engine from service is imminent (e.g., for regularly scheduled required maintenance). The one or more controllers of the coating restoration system include data in a database or memory regarding the date on which predetermined maintenance is to occur. The one or more controllers of the coating restoration system then compare a date of maintenance determined as a result of system parameters and if the date falls within a predetermined range, such as one month, of the date of the predetermined maintenance, the one or more controllers of the coating restoration system are configured to cancel the determined date of maintenance.

The maintenance includes restoring a coating at different points in the operational life of the engine that results in different prolonged life of the coating. In one embodiment, an additive is applied to the coating to extend the life span of the engine or coating to 100% or more (e.g., of the original life span of the engine or coating) compared to if no restorative coating was provided. In another embodiment, after some life span, the additive is applied to extend engine life by 25% the initial life span. Otherwise if applied after some small spalling, life can be extended by 10% the life span. Alternatively, if the restorative coating is applied after large spalling, an additional life span can be added as a result of the coating.

Thus, the one or more controllers of the coating restoration system coordinate coating restoration cycles with other maintenance schedules as well as operational schedules. The one or more controllers of the coating restoration system are configured to establish the best variation of cycle times in which the parameters of engine coating restoration are determined, including the time interval between coating restoration(s), the duration of coating restoration(s), the particular mixture or composition of the coating restoration solution, and the like. The one or more controllers of the coating restoration system are configured to establish a predictive coating restoration schedule based on the historical data. The predictive coating restoration schedule can then be used by the engine manufacturer in order to better predict engine coating restoration as a function of minor and major overhaul intervals.

The coatings described herein are restored by applying one or more additives to the coatings, which optionally are referred to as solutions, agents, protective agents, or barrier coatings. The additives protect underlying thermal barrier coatings from attacks by mixed calcium-magnesium-aluminum-silicon-oxide systems (Ca—Mg—Al—Si—O), hereafter referred to as "CMAS." Environmental contaminant compositions of particular concern are those containing oxides of calcium, magnesium, aluminum, silicon, and mixtures thereof; dirt, ash, and dust ingested by gas turbine engines, for instance, are often made up of such compounds. These oxides often combine to form CMAS. At high turbine operating temperatures, these environmental contaminants can adhere to the hot thermal barrier coating surface, and cause damage to the thermal barrier coating. For example, CMAS can form compositions that are liquid or molten at the operating temperatures of the turbines. The molten CMAS composition can dissolve the thermal barrier coating, or can fill its porous structure by infiltrating the pores, channels, cracks, or other cavities in the coating. Upon cooling, the infiltrated CMAS composition solidifies and reduces the coating strain tolerance, thus initiating and propagating cracks that may cause delamination and spalling of the coating material. This may further result in partial or complete loss of the thermal protection provided to the underlying metal substrate of the part or component. Further, spallation of the thermal barrier coating may create hot spots in the metal substrate leading to premature component failure. Premature component failure can lead to unscheduled maintenance as well as parts replacement resulting in reduced performance, and increased operating and servicing costs.

The additives applied to the thermal barrier coatings at times or instances determined by the systems and methods described herein can prevent or reduce the negative impact of CMAS attack by reacting with the existing layer of environmental contaminant compositions on the surface and/or by reacting with additional CMAS deposits formed on the chemical barrier coating after subsequent use of the component (e.g., after operation of an engine containing the component). Additionally, the chemical barrier coating can protect any bond coat, and particularly any thermally grown oxide on the bond coat, from CMAS attack, from reactive particle attack, or reactive layer attack. The chemical barrier coating is particularly useful on coating systems that include a thermal barrier coating after it has been used in service, and may include a plurality of surface-connected voids, such as cracks and porosity, which provides a path for CMAS attack, reactive particle attack, or a reactive layer attack.

In one embodiment, the additives applied to the thermal barrier coating may form a chemical barrier coating directly on a layer of environmental contaminant compositions (e.g., CMAS deposits). For example, the chemical barrier coating is formed on a layer of environmental contaminant compositions without any pre-washing or any other pre-treatment step in one embodiment. The additives can be applied without the use of any aqueous or organic precursors. The chemical barrier coating generally includes at least one protective agent that is reactive with the contaminant compositions. In one embodiment, the additives are highly reactive to CMAS-type material, such that, at typical temperatures where CMAS is encountered in liquid form, the protective agent rapidly reacts with the CMAS to form a solid reaction product that itself is thermally and chemically stable in the presence of liquid CMAS, forming a solid-phase barrier against further CMAS attack to the underlaying layers (e.g., to the underlying TBC layer).

The additive includes a substance that is reactive with CMAS material. More particularly, a substance is considered suitable as a substance for use in the additive as described herein if the substance has the characteristic property. In certain embodiments, for instance, the protective agent may chemically reacting with a nominal CMAS liquid composition at atmospheric pressure forms a solid, crystalline product that is outside the crystallization field of this nominal CMAS composition. Such a solid crystalline product may have a higher melting temperature than the nominal CMAS composition so that it remains as a solid barrier to liquid infiltration.

For the purposes of this description, the term "nominal CMAS" refers to the following composition, with all percentages in mole percent: 41.6% silica ($SiO_2$), 29.3% calcia (CaO), 12.5% alumina ($AlO_{1.5}$), 9.1% magnesia (MgO), 6.0% iron oxide ($FeO_{1.5}$), and 1.5% nickel oxide (NiO). It will be appreciated that the nominal CMAS composition given in this definition represents a reference composition to define a benchmark for CMAS reactivity of the surface in a way that can be compared to the CMAS reactivity of other substances; use of this reference composition does not limit in any way the actual composition of ingested material that becomes deposited on the coating during operation which, of course, will vary widely in service.

If a given substance is capable of reacting with molten CMAS having the above nominal composition, thereby forming a reaction product that has a melting point higher than about 1200° C., is crystalline, and is outside the crystallization field of this nominal CMAS composition, then the substance may be useful in the protective agent as described herein. A material is outside the crystallization field of the nominal CMAS composition if it is not included in the set of crystalline phases that can be formed from combinations of the component oxides of the CMAS composition. Thus, a material that includes a rare-earth element, such as ytterbium, for instance, would be outside the crystallization field of the nominal CMAS composition because none of the component oxides of the nominal CMAS includes ytterbium. On the other hand, a reactive agent that exclusively employs one or more of the other components of the nominal CMAS composition, such as aluminum oxide, would not form a product outside the crystallization field of nominal CMAS. Use of a protective agent substance that promotes formation of reaction product with CMAS outside the crystallization field of the CMAS may result in faster reaction kinetics with CMAS under some circumstances, and if reaction kinetics can be accelerated, then ingress of molten CMAS prior to reaction and solidification desirably may be reduced.

In some embodiments, the protective agent includes a rare-earth oxide, that is, an oxide compound that includes a rare-earth element as one of its constituent elements. As used herein, the terms "rare-earth" and "rare-earth element" are used interchangeably, and encompass elements of the lanthanide series, yttrium, and scandium. For example, in some embodiments, the oxide includes lanthanum, neodymium, erbium, cerium, gadolinium, or combinations including any one or more of these. Certain complex oxides, that is, oxide compounds that include more than one metal element constituent, have been shown in some circumstances to provide comparatively high reactivity with liquid CMAS. In particular embodiments, the oxide is a complex oxide that includes a rare-earth element and a transition metal element, such as zirconium, hafnium, titanium, or niobium, along with combinations of these. Zirconates, hafnates, titanates, and niobates that include lanthanum, neodymium, cerium, and/or gadolinium are examples of such complex oxide. A particular example is gadolinium zirconate. For example, the protective agents may include, in particular embodiments, alpha-$Al_2O_3$, 55YSZ, $GdAlO_3$, $SrGd_2Al_2O_7$ ("SAG"), etc., and combinations thereof.

The additive can be applied via a variety of methods, including using the systems and atomizing spray nozzles described herein.

One turbine engine considered is a multiple shaft turbofan gas turbine engine. The aspects of the present disclosure are applicable to turbine engines in general. Other types of turbine engines include turboprop and turboshaft systems, as well as turbine engines designed for non-aerospace applications. In the turbine engine, a fan (e.g., a fan, variable pitch propeller, etc.) draws air into the engine.

FIG. 1 is a schematic diagram of a control system 100 for maintaining a component 102 such as an engine of a powered system 106. In one embodiment, the component 102 is an engine on a wing 104 of an aircraft, but optionally may be an engine of another vehicle, an engine of a stationary power-generating system, or another type of component. The control system 100 includes one or more engine controllers 110. The engine controller 110 can be of any type, including but not limited to a computer, computing device, laptop computer, mobile device, tablet computer, smart phone, body-mounted device, wearable device, server, enterprise computer system, network of computers, or the like. The engine controller 110 includes one or more processors 112 that can also be of any type, including but not limited to a controller, microprocessor, microcontroller, digital signal processor, and the like that can receive, determine, compute and transmit information.

The processor 112 can have or operate based on algorithms and look-up tables inputted therein through programming or the like. In this manner, the processor 112 can make calculations based on parameters of the engine 102 and aircraft or compare such parameters to the look-up tables to make determinations. The processor 112 is in communication with a memory 114 that contains a database of information that is either inputted into the controller 110, determined by the processor 112 of the controller 110, or communicated from another controller or device, to be stored within the memory 114. The processor 112 and memory 114 are also in communication with a communication subsystem 116 that has input and output subsystems 118 and 120 to receive and transmit information and data for the controller 110. The communication subsystem 116 connects the one or more engine controllers 110 to other controllers and/or systems by one or more networks 122.

The network(s) 122 may be a cellular network, a local area network, a wide area network (e.g., Wi-Fi), a cloud, a virtual personal network (e.g., VPN), an Ethernet network, and/or a public network such as the Internet. The communication subsystem 116 may, alternatively or in addition, enable shorter-range wireless communications between the one or more engine monitoring controllers and other computing devices, using, for example, Bluetooth and/or other technology. Accordingly, the communication sub-system 116 may include one or more optical, wired and/or wireless network interface subsystems, cards, adapters, or other devices, as may be needed pursuant to the specifications and/or design of the engine controller.

A display module 124 is also in communication with the processor 112, memory 114 and communication subsystem 116. The display module 124 typically is a screen that displays information retrieved from the processor 112, memory 114 or communication subsystem 116 to convey information to the user.

A user interface subsystem 125 similarly is in communication with the other components of the engine controller 110, including the processor 112, memory 114, communication subsystem 116 and display module 124. In this manner, a user my input information, data, historical data, algorithms, models and the like into the engine controller 110 and receive information as requested.

The control system 100 includes a monitoring system 200 that has one or more an engine monitoring controllers 210 that can be of any type, including but not limited to a computer, computing device, laptop computer, mobile device, tablet computer, smart phone, body-mounted device, wearable device, server, enterprise computer system, network of computers, or the like. The engine monitoring controller 210 includes a processor 212 that can also be of any type, including but not limited to a controller, microprocessor, microcontroller, digital signal processor, and the like that can receive, determine, compute and transmit information.

The processor 212 can make calculations based on parameters of the engine 202 and aircraft or compare such parameters to the look-up tables to make determinations. The processor 212 is in communication with a memory 214 that contains a database of information that is either inputted into the controller 210, determined by the processor 212 of the controller 210, or communicated from another controller or device, to be stored within the memory 214. The processor 212 and memory 214 are also in communication with a communication subsystem 216 that has input and output subsystems 218 and 220 to receive and transmit information and data for the controller 210. The communication subsystem 216 connects the one or more engine monitoring controllers to the one or more engine controllers 210 and to other controllers and/or systems by one or more networks 222.

The network(s) 222 may be a cellular network, a local area network, a wide area network (e.g., Wi-Fi), a cloud, a virtual personal network (e.g., VPN), an Ethernet network, and/or a public network such as the Internet. The communication subsystem 216 may, alternatively or in addition, enable shorter-range wireless communications between the one or more engine monitoring controllers and other computing devices, using, for example, Bluetooth and/or other technology. Accordingly, the communication sub-system 216 may include one or more optical, wired and/or wireless network interface subsystems, cards, adapters, or other devices, as may be needed pursuant to the specifications and/or design of the particular engine controller.

A display module 224 is also in communication with the processor 212, memory 214 and communication subsystem 216. The display module 224 typically is a screen that displays information retrieved from the processor 212, memory 214 or communication subsystem 216 to convey information to the user.

A user interface subsystem 225 similarly is in communication with the other components of the engine monitoring controller 210, including the processor 212, memory 214, communication subsystem 216 and display module 224. In this manner, a user my input information, data, historical data, algorithms, models and the like into the engine monitoring controller 210 and receive information as requested.

An engine performance monitoring system 226 is also in communication with the processor 212, memory 214 and communication subsystem 216 of the engine monitoring controller 210. The engine performance monitoring system 226 includes sensors 228 and 230 in the engine 102 that measure real-time parameters of the engine. In one embodiment, sensor 228 is a temperature sensor that measures the air temperature of air entering the engine and sensor 230 is a temperature sensor that measures the air temperature of the exhaust existing the engine 102. In another embodiment, one of the sensors 228 or 230 is a mass flow sensor. The sensors 228 and 230 take real time measurements that are communicated to the processor 212 and memory 214 of the engine monitoring controller 210.

The engine performance monitoring system 226 in one embodiment monitors the condition of the thermal barrier coating of the engine utilizing methods as presented in U.S. Pat. No. 9,395,301 that is incorporated by reference herein. Thus, the sensors 228 and 230 monitor coating parameters including temperature at the coating to utilize the methods presented in the '301 patent.

In this manner, the processor 212 can make determinations such as calculating fuel efficiency of the engine. Such determinations can then be compared to an engine profile created from historical data of similar engines or from test cell data from testing of the engine prior to use. Based on the comparison the processor 212 and thus controller 210 determines a date or range of dates for maintaining the engine for the individual aircraft. Alternatively, the real time measurements, data, information or determination of the one or more engine monitoring controllers are communicated to the one or more engine controllers 110 for similar determinations and calculations and to determine a date or range of dates for maintenance for the individual aircraft. The communication between the one or more engine controller 110 and engine monitoring controller 210 is provided through communication links, including wired and/or wireless, direct or indirect, connections.

The sensors 228 and 230 may include thermocouples that generate potentials representative of temperatures or changes in temperature in the air, a thermometer, or another device that can sense temperature and generate an output signal to the controller 210 that indicates temperature. The sensors 228 and 230 may also be a piezoelectric strain gauge, a capacitive pressure sensor, an electromagnetic pressure sensor, or other device that can sense pressure of the air and generate an output signal to the controller 210 that indicates the pressure. In one embodiment, one of the sensors 228, 230 or an additional sensor may be an oxygen sensor that measures the amount of oxygen conveyed to the engine. The controller 210 may monitor the rates of air flow through the engine during flight from mass flow sensors that are coupled with or included in the engine.

The one or more engine monitoring controllers 210 can be the engine controller of the aircraft 106. The one or more engine monitoring controllers 210 may be a Full Authority Digital Engine Controller (FADEC), a component thereof, or a separate module in communication with a FADEC (e.g., via one or more electronic communication links or networks). Optionally, the monitoring system 226 includes an on-board engine monitor, of a range of characteristics, such as the frequency of data acquisition.

The control system 100 can also optionally include a fleet management system 300 having one or more fleet operations controllers 310. The one or more fleet operations controllers 310 can be of any type, including but not limited to a computer, computing device, laptop computer, mobile device, tablet computer, smart phone, body-mounted device, wearable device, server, enterprise computer system, network of computers, or the like. The fleet operations controller 310 includes a processor 312 that can also be of any type, including but not limited to a controller, microprocessor, microcontroller, digital signal processor, and the like that can receive, determine, compute and transmit information.

The processor 312 can have algorithms and look-up tables inputted therein through programming or the like. In this manner, the processor 312 can make calculations based on parameters of the engine 302 and aircraft or compare such parameters to the look-up tables to make determinations. The processor 312 is in communication with a memory 314 that contains a database of information that is either inputted into the controller 310, determined by the processor 312 of the controller 310, or communicated from another controller or device, to be stored within the memory 314. The processor 312 and memory 314 are also in communication with a communication subsystem 316 that has input and output subsystems 318 and 320 to receive and transmit information and data for the controller 310. The communication subsystem 316 connects the one or more fleet operations controller 310 to other controllers and/or systems of the control system by one or more networks 322, including the one or more engine controllers or the one or more engine monitoring controllers.

The network(s) 322 may be a cellular network, a local area network, a wide area network (e.g., Wi-Fi), a cloud, a virtual personal network (e.g., VPN), an Ethernet network, and/or a public network such as the Internet. The communication subsystem 316 may, alternatively or in addition, enable shorter-range wireless communications between the one or more engine monitoring controllers and other computing devices, using, for example, Bluetooth and/or other technology. Accordingly, the communication sub-system 316 may include one or more optical, wired and/or wireless network interface subsystems, cards, adapters, or other devices, as may be needed pursuant to the specifications and/or design of the particular engine controller.

A display module 324 is also in communication with the processor 312, memory 314 and communication subsystem 316. The display module 324 typically is a screen that displays information retrieved from the processor 312, memory 314 or communication subsystem 316 to convey information to the user.

A user interface subsystem 325 similarly is in communication with the other components of the fleet operations controller 310, including the processor 312, memory 314, communication subsystem 316 and display module 324. In this manner a user my input information, data, historical data, algorithms, models and the like into the engine monitoring controller 310 and receive information as requested.

By using the one or more fleet operation controllers 310, in addition to single engine coating restoration schedule generation, schedules for full fleets of engines or vehicles may be generated. Portions of engine data and/or coating restoration schedule data, may be supplied to the one or more fleet operations controllers 310 and/or the one or more controllers of a coating restoration system. Therefore, the one or more fleet operations controllers 310 are configured to manage turbine engine coating restoration for a fleet of aircraft.

In one example, as the controllers 110 and/or 210 determine dates or ranges of dates maintenance should occur in individual aircraft, the one or more fleet operations controllers 310 receive this information for an entire fleet of aircraft. In this manner, the one or more fleet operation controllers 310 can determine if a predetermined percentage of the fleet exceeds a threshold percentage for maintenance down time to reschedule maintenance of at least one aircraft to ensure the proper amount of aircraft remain operating within the fleet.

In another example, as the controllers 110 and/or 210 determine dates or ranges of dates maintenance should occur in individual aircraft, the one or more fleet operations controllers 310 receive this information for an entire fleet of aircraft. In this manner, the one or more fleet operation controllers 310 can utilize an algorithm that utilizes all of the flight schedules of all of the aircraft that require maintenance in a given range of dates to determine the location that coating restoration for all of the aircraft being restored is to occur to reduce downtime of the aircraft under maintenance.

The control system 100 also includes one or more controllers 410 of a coating restoration system. The one or more controllers 410 of the coating restoration system can be of any type, including but not limited to a computer, computing device, laptop computer, mobile device, tablet computer, smart phone, body-mounted device, wearable device, server, enterprise computer system, network of computers, or the like. The engine controller 410 includes a processor 412 that can also be of any type, including but not limited to a controller, microprocessor, microcontroller, digital signal processor, and the like that can receive, determine, compute and transmit information.

The processor 412 can have algorithms and look-up tables inputted therein through programming or the like. In this manner, the processor 412 can make calculations based on parameters of the engine 402 and aircraft or compare such parameters to the look-up tables to make determinations. The processor 412 is in communication with a memory 414 that contains a database of information that is either inputted into the controller 410, determined by the processor 412 of the controller 410, or communicated from another controller or device, to be stored within the memory 414.

The memory 414 includes a restoration history database and a coating restoration parameters database. The restoration history database stores information related to the coating restoration history of the turbine engine system, such as, when was the date of the last coating restoration of the turbine engine and what coating restoration was performed. The coating restoration parameters database includes information related to the coating restoration regimens available to be used to restore a particular turbine engine, such as data on all available coating restoration regimens, which coating restoration regimens are available at which locations geographically, whether a coating restoration crew at a particular location is available to perform a coating restoration, and the like.

The processor 412 and memory 414 are also in communication with a communication subsystem 416 that has input and output subsystems 418 and 420 to receive and transmit information and data for the controller 410. The communication subsystem 416 connects the one or more controllers 410 of the coating restoration system to the other controllers and systems by one or more networks 422, including the one or more engine controllers, the one or more engine monitoring controllers or the one or more fleet operations controllers.

The network(s) 422 may be a cellular network, a local area network, a wide area network (e.g., Wi-Fi), a cloud, a virtual personal network (e.g., VPN), an Ethernet network, and/or a public network such as the Internet. The communication subsystem 416 may, alternatively or in addition, enable shorter-range wireless communications between the one or more engine monitoring controllers and other computing devices, using, for example, Bluetooth and/or other technology. Accordingly, the communication sub-system 416 may include one or more optical, wired and/or wireless network interface subsystems, cards, adapters, or other devices, as may be needed pursuant to the specifications and/or design of the particular engine controller.

A display module 424 is also in communication with the processor 412, memory 414 and communication subsystem 416. The display module 424 typically is a screen that displays information retrieved from the processor 412, memory 414 or communication subsystem 416 to convey information to the user.

A user interface subsystem 425 similarly is in communication with the other components of the one or more controllers 410 of the coating restoration system, including the processor 412, memory 414, communication subsystem 416 and display module 424. In this manner a user my input information, data, historical data, algorithms, models and the like into the one or more controllers 410 of the coating restoration system and receive information as requested.

Figure 2:
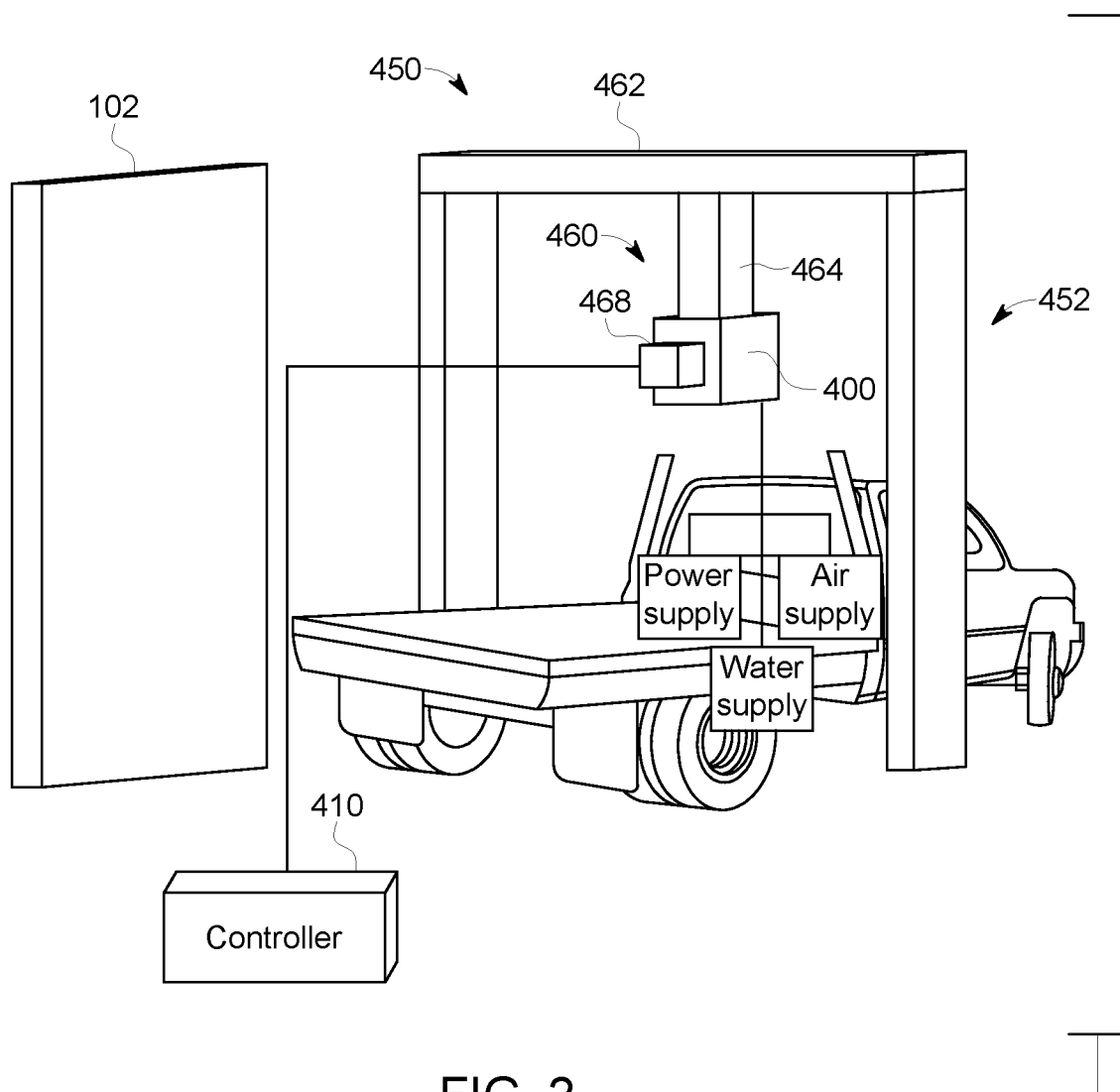

FIG. 2 shows the coating restoration system 450 that is operated by and includes controller 410. The coating restoration system 450 includes a mobile supply unit 452 such as a truck or is incorporated into a work cart, trailer, or other type of vehicle or support structure. The mobile supply unit 452 includes a power supply 454, an air supply 456, a water supply 458 and a coating restoration unit 460 mounted on the mobile supply unit 452. The coating restoration unit 460 includes a rail 462 and glider 464 with an attachment mechanism 466 on the glider that attaches a spray nozzle 468 that receives a slurry and air to output a coating for a component such as a thermal barrier coating. The rail 462 and glider 464 system provide for 360° degree movement to coat any surface of the component. The coating restoration system 450 stores the restoration coating agent so that it can be delivered to the spray nozzle 468 for application in the turbine engine.

The one or more controllers 410 of the coating restoration system 450 are operated by an engine coating restoration service, such as at an A check, C check, or procedure at an airport. The one or more controllers 410 of a coating restoration system 450 is in communication with all of the other controllers 110, 210 and 310 of the control system 100. All historical data stored at the one or more controllers 410 of the coating restoration system 450 is communicated to all of the controllers 110, 210 and 310 within the control system 100 to be utilized in determinations, calculations, algorithms and as otherwise needed by the controllers 110, 210 and 310 within the control system.

The one or more controllers 410 of the coating restoration system 450 obtains and stores historical data about the engine or the engine's coating restoration history. This is through data inputted into the one or more controllers and data determined in real-time and stored within the memories of the one or more controllers 110, 210 and 310. The one or more controllers 410 of the coating restoration system 450 are configured to use the historical data to determine an engine coating restoration scheme for the operator. The one or more controllers 410 of the coating restoration system 450 communicate with the other controllers 110, 210 and 310 in the control system 100 to schedule maintenance intervals based upon certain parts or modules of the turbine engine that need replacement. Thus, the one or more controllers 410 of the coating restoration system 450 are configured to determine the amount of restoration required for an individual component or module. Consequently, the one or more controllers 410 of the coating restoration system 450 are configured to determine if an engine 102 merely needs a minor overhaul/restoration procedure, and based on the restoration required the one or more controllers 410 of the coating restoration system 450 initiate a coating restoration. As a result, the engine coating or coatings are restored and the engine is quickly returned to service, thereby extending the engine's efficiency until a major overhaul is required.

The one or more controllers 410 of the coating restoration system 450 are configured to issue a prompt or notification to prevent the occurrence of a scheduled coating restoration cycle, if the one or more controllers 410 of the coating restoration system 450 determines that the engine's removal from service is imminent (e.g., for regularly scheduled required maintenance). The one or more controllers 410 of the coating restoration system 450 include data in a database or memory regarding the date on which predetermined maintenance is to occur. The one or more controllers 410 of the coating restoration system 450 then compare a date of maintenance determined as a result of system parameters and if the date falls within a predetermined range, such as one month, of the date of the predetermined maintenance, the one or more controllers 410 of the coating restoration system 450 are configured to cancel the determined date of maintenance.

Thus, the one or more controllers 410 of the coating restoration system 450 are configured to coordinate coating restoration cycles with other maintenance schedules as well as operational schedules. The one or more controllers 410 of the coating restoration system 450 are configured to establish the best variation of cycle times in which the parameters of engine coating restoration are determined, including the time interval between coating restoration(s), the duration of coating restoration(s), the particular mixture or composition of the coating restoration solution, and the like. The one or more controllers 410 of the coating restoration system 450 are configured to establish a predictive coating restoration schedule based on the historical data. The predictive coating restoration schedule can then be used by the engine manufacturer in order to better predict engine coating restoration as a function of minor and major overhaul intervals.

Figure 3:
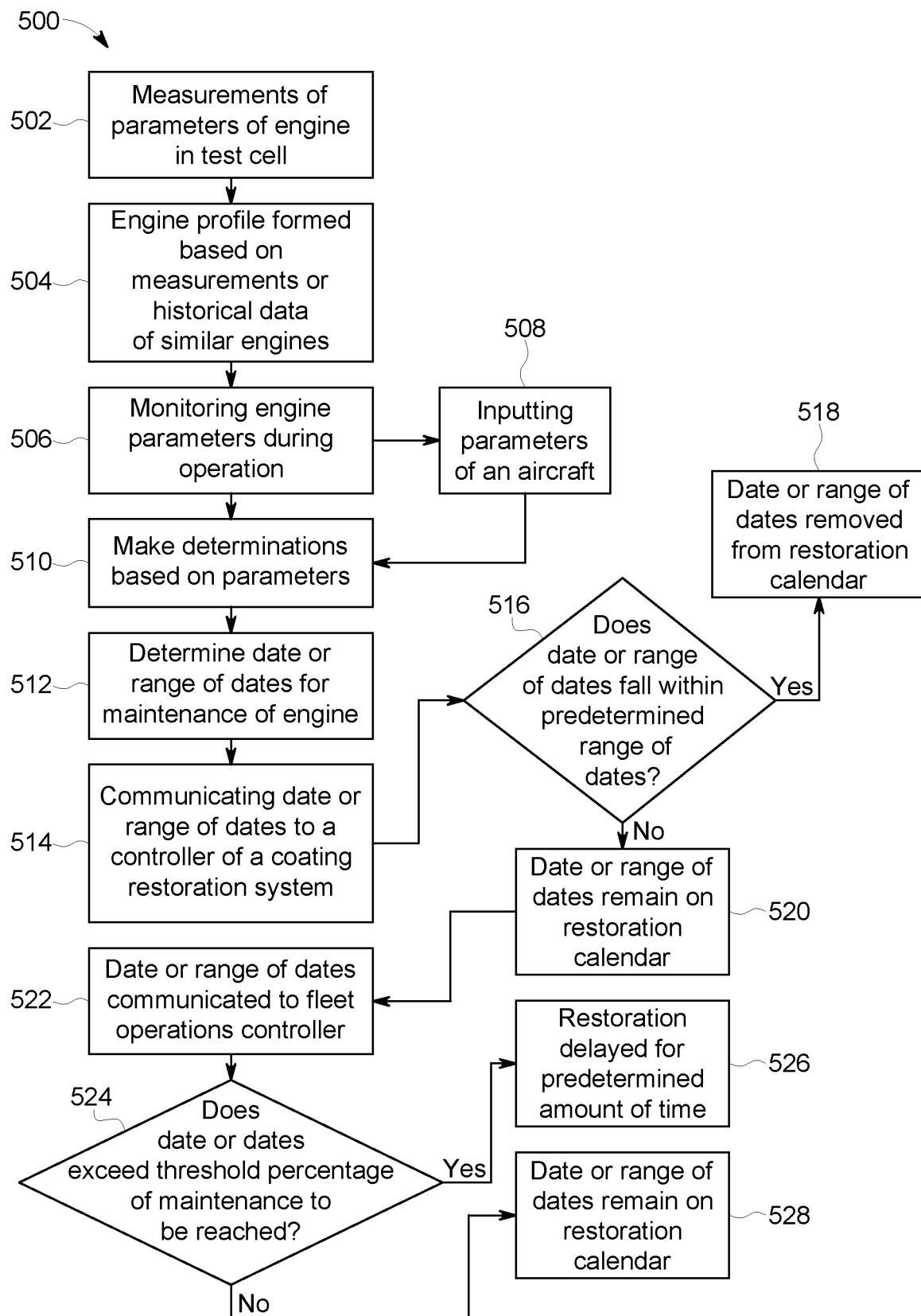

FIG. 3 shows a method for determining maintenance of a turbine engine 500.

At 502, the measurements of parameters of a turbine engine are taken in a test cell prior to use of the turbine engine. At 504, an engine profile is formed based the measurements or on historical data of similar engines and inputted or communicated to the controllers of a control system.

At 506, a controller monitors parameters of the engine during operation. These parameters can include engine temperature, different air temperatures at the engine, fuel consumption and the like. At 508, in an embodiment where the engine is on an aircraft, parameters of the aircraft are inputted and communicated to controllers in the control system. These parameters include environmental conditions during flight, flight durations, air speeds and the like.

At 510, a controller makes determinations based on the parameters of the engine and the aircraft (for such an embodiment). Based on these determinations the controller determines a date or a range of dates for maintenance of the engine to restore a coating at 512.

At 514, the determined date or range of dates is communicated to a controller of a coating restoration system. At 516, the controller of the coating restoration system compares the date or dates communicated to pre-determined maintenance date of the engine to determine if the initial determined date or range of dates falls within a range of dates prior to the pre-determined maintenance.

If at 516 the initial determined date or range of dates falls within the range of dates prior to the pre-determined maintenance, at 518, the controller of the coating restoration system cancels the date or range of dates determined and removes the engine or aircraft (in such an embodiment) from a restoration schedule. If at 516, the initial determined date or range of dates does not fall within the range of dates prior to the pre-determined maintenance, at 520 the controller of the coating restoration system leaves the determined date on the restoration schedule.

At 522, in an embodiment where the engine is on an aircraft and that aircraft belongs to a fleet of aircraft, the updated restoration schedule is communicated to a fleet operation controller. At 524, the fleet operation controller determines the percentage of aircraft in the fleet that are on the restoration schedule for the date or range of dates from maintenance.

At 526, if the percentage of aircraft in the fleet that are on the restoration schedule for the date exceeds a threshold percentage, the fleet operation controller will delay the restoration for a predetermined amount of time when the percentage falls below the threshold percentage. At 528, if the percentage of aircraft in fleet that are on the restoration schedule for the date does not exceed a threshold percentage the fleet operation controller leaves the determined date or range of dates on the restoration schedule.

Figure 4:
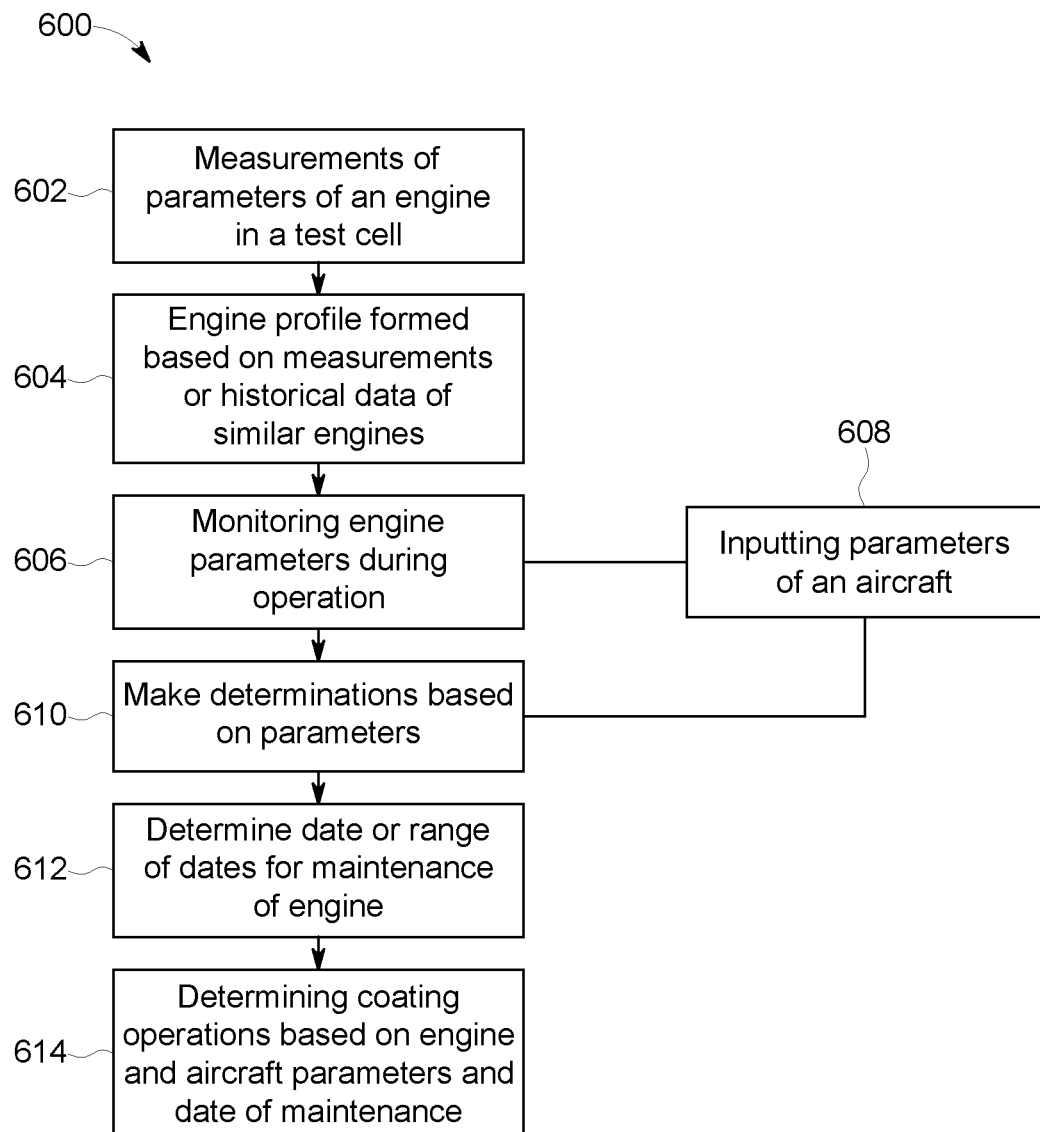

FIG. 4 shows a flow chart of a method of restoring a coating 600. At 602 the measurements of parameters of a turbine engine are taken in a test cell prior to use of the turbine engine. At 604 an engine profile is formed based the measurements or historical data of similar engines and inputted or communicated to the controllers of a control system.

At 606, a controller monitors parameters of the engine during operation. These parameters can include engine temperature, different air temperatures at the engine, fuel consumption and the like. At 608, in an embodiment where the engine is on an aircraft, parameters of the aircraft are inputted and communicated to controllers in the control system. These parameters include environmental conditions during flight, flight durations, air speeds and the like.

At 610, a controller makes determinations based on the parameters of the engine and the aircraft. Based on these determinations the control system determines a date or a range of dates for maintenance of the engine to restore a coating at 612.

At 614, on the date of restoration the controller of a coating restoration system determines based on the date of restoration and the determinations based on engine and aircraft parameters the surfaces of the engine to be coated, the amount of coating to be supplied and/or the consistency of the coating materials.

As an example of how the methods of FIGS. 3 and 4 operate, when a turbine engine is manufactured for an aircraft, before securing the engine on the wing, test cell measurements are taken of the engine and inputted into the either the engine coating controller, engine monitoring controller or both. This information is then communicated wirelessly to all of the controllers in the control system. During operation of the engine, the engine is utilized for the first time on January $1^{st}$. The engine monitoring controller receives inputs from the aircraft engine controller regarding flight information, including but not limited to environmental conditions including temperature and precipitation at take-off and landing, date and time of flight, air temperature changes, relative humidity, air quality, air speed and wind conditions for each flight during operation. Simultaneously, the engine monitoring controller receives inputs from engine sensors regarding the air temperature of the exhaust in the engine and fuel consumed. The information and data inputted and received is stored in the memory of the engine monitoring controller and communicated to the engine controller during all operations of the engine. The controllers utilize algorithms to determine the profile of the engine after completion of each flight based on the information and data gathered during operation and based on historical data.

In the example, after a flight on June $1^{st}$ of the same year, the calculated profile based on engine exhaust temperature is compared to the engine profile formed during testing, and a controller determines maintenance is not needed. The algorithm then determines based on the historical data of the engine parameters to that date, at the current pace of wear the thermal barrier coating of the engine should be restored on September 1 of the same year. This information is communicated to all of the controllers in the control system including the one or more controllers of the coating restoration system and the one or more fleet operation controllers. The one or more controllers of the coating restoration system then compare the September 1 date to the regularly scheduled maintenance date of the engine, which is January 1 of the next year. Because the September 1 date is more than one month away, the one or more controllers of the coating restoration system schedule the engine for maintenance on September 1 of this year. The information is then communicated to the other controllers of the control system including the one or more fleet operations controllers.

In the example, the one or more fleet operations controllers receive the information that the engine is scheduled for restoration of the thermal barrier coating on September 1 of this year. The fleet operations controller then calculates the percentage of aircraft in the fleet that are currently scheduled for maintenance on September 1 is 2% or less than the 3% threshold percentage of aircraft in the fleet undergoing maintenance for that day. As a result, the fleet operations controller does not change the date of the scheduled maintenance and the engine is scheduled for maintenance on September 1. On the day of maintenance, the one or more controllers of the coating restoration system have the coating restoration system provide the pre-determined amount of coating of the engine to restore the engine profile.

In a second example, the same steps occur as the first example, wherein after the June $1^{st}$ flight a controller makes an initial determination that the maintenance is to occur on September 1 of this year. This time the engine profile is determined as a result of monitoring the thermal barrier coating using methods outlined in U.S. Pat. No. 9,395,301. Again the one or more controllers of the restoration system determines that regularly scheduled maintenance is not until January 1 of next year and leaves the aircraft on the restoration schedule for maintenance for September 1 of this year and communicates this information to the fleet operations controller. In this second example, the fleet operations controller calculates the percentage of aircraft scheduled for maintenance is 4%, above the threshold percentage of aircraft. The fleet operations controller then determines the maintenance date to be October 1 of this year when only 2% of aircraft are scheduled for maintenance. The new maintenance date is then communicated to the other controllers in the control system including the one or more controllers of the coating restoration system that again compares date to the regularly scheduled maintenance and because it is more than a month away, keeps the October 1 maintenance date scheduled.

In the second example, when the October 1 maintenance occurs, the one or more controllers of the coating restoration system restores the thermal barrier coating by increasing the amount of coating and surface area of the engine the spray device covers compared to the amount of coating and surface area coated if the maintenance occurred on September 1 as was originally scheduled. In this manner, the coating restoration system compensates for the late maintenance by enhancing the restoration.

In a third example, the same steps occur as the first example with the engine profile being determined based on engine efficiency. In this third example, after the June $1^{st}$ flight a controller makes an initial determination that the maintenance is to occur in a range of dates between December 7-14 of this year. These initial dates of maintenance are scheduled and communicated to the other controllers including the one or more controllers of the coating restoration system. The one or more controllers of the coating restoration system then compares the scheduled range of dates to the regularly scheduled maintenance of the engine on January 1 of the next year and determines this is within one month of the regularly scheduled maintenance. Thus, the one or more controllers of the coating restoration system moves the maintenance of the thermal barrier coating to the date of the regularly scheduled maintenance, cancelling the December 7-14 maintenance.

In the third example, at the regularly scheduled maintenance, similar to the second example, the amount of coating and surface area of the engine the spray device covers increases based on the later maintenance date scheduled compared to the original date calculated by engine monitoring controller. Thus, additional protection is provided.

In a fourth example, the same steps occur as the first example, only after the June $1^{st}$ flight the algorithm makes an initial determination that the maintenance is not to occur until February 1 of the next year. This initial date of maintenance is scheduled and communicated to the other controllers including the one or more controllers of the coating restoration system. The one or more controllers of the coating restoration system then compares the scheduled date to the regularly scheduled maintenance of the engine on January 1 of the next year and determines this is after the regularly scheduled maintenance. Thus, the one or more controllers of the coating restoration system moves the maintenance of the thermal barrier coating to the date of the regularly scheduled maintenance, cancelling the February 1 maintenance.

In the fourth example, at the regularly scheduled maintenance, the amount of coating and surface area of the engine the spray device covers decreases compared to the amount and surface area if maintenance would have occurred on February 1. Thus, based on the earlier maintenance date scheduled compared to the original date calculated by engine monitoring controller not as much restoration is required and the restoration application is altered.

In an additional example the engine monitoring controller monitors the amount of engine cycles and the average ambient temperature of the plane during operation. Based on these parameters the control system utilizes a look up table to determine a maintenance date for the engine.

In another example the engine monitoring controller or the engine coating controller monitors historical data or real time data of engine and airplane parameters. Such parameters include one or more of an engine exhaust temperature, a condition of the coating of the engine, engine fuel flow, compressor exit pressure, compressor exit temperature, engine derating, engine speed, engine cycles, engine power use, environmental conditions, ambient airplane temperature or dates of engine use. Based on one or more of these parameters, the control system determines a maintenance date for the engine. The system on the maintenance date applies an additive to increase the useful life of the engine to greater than 100%. For example, if an initial coating on or in an engine has a useful life of 1,000 engine cycles but, after some use of the engine the coating has a remaining useful life of 750 engine cycles, application of the additive to the coating may increase the useful life of the coating to 1,100 total engine cycles or may increase the useful life by an additional 300 engine cycles such that the actual total useful life of the coating is extended beyond the initial 100%.

As another example, the determination of when to extend a useful life of a coating in or on an engine may not be based on a static or absolute date, but may be a relative time. For example, due to different engines being used different amounts, identical coatings on different engines may need restoration or application of additives at different times. The one or more controllers described herein may direct application of the additive to a coating as a number of engine cycles. The additive may need to be applied before expiration or upon expiration of the number of engine cycles. Optionally, one or more controllers described herein may direct application of the additive to a coating as a trigger point. The trigger point can be a point in time at which the additive should be applied to the coating before continued use of the engine after the trigger point occurs. A trigger point can be a number of engine cycles, a number of hours of engine usage, or the like.

In one embodiment, a control system is provided. The control system has one or more controllers configured to determine when to extend a life span of a coating of an engine by applying an additive to the coating based on one or more monitored parameters of the engine. The one or more controllers also are configured to, direct application of the additive onto a coating of the engine based on the monitored parameters of the engine.

In one embodiment, the coating is a thermal barrier coating.

In one embodiment, the one or more controllers include an engine coating controller and a fleet operation controller. The engine coating controller is configured to determine an initial maintenance date and the fleet operation controller is configured to determine the maintenance date. In one embodiment, the determined maintenance date is later than the initial maintenance date. In this embodiment, the one are more controllers are configured to increase the amount of coating sprayed on the engine based on the maintenance date determined by the fleet operation controller.

In one embodiment, the one or more controllers include an engine coating controller and a controller of a restorative coating system. The engine coating controller determines an initial maintenance date based on the monitored parameters of the engine and the controller of the restorative coating system is configured to determine the maintenance date. In one embodiment, the determined maintenance date is later than the initial maintenance date. In this embodiment, the one are more controllers are configured to increase the amount of coating sprayed on the engine based on the maintenance date determined by the controller of the restorative coating system.

In one embodiment, the monitored parameter of the engine includes one or more of an engine exhaust temperature, a condition of the coating of the engine, engine fuel flow, compressor exit pressure, compressor exit temperature, engine derating, engine speed, engine cycles, engine power use, environmental conditions, ambient airplane temperature or dates of engine use.

In one embodiment, the one or more controllers are configured to determine an amount of additive to apply onto the coating based on the monitored parameters. In another embodiment, the one or more controllers are configured to determine the type of additive to apply onto the coating based on the monitored parameters.

In one embodiment, a method of coating an engine is provided. Steps include monitoring engine parameters with one or more controllers and determining an engine maintenance date with the one or more controllers based on the monitored engine parameters. A coating restoration system having a mobile spray device is provided and coats the engine with the spray device on the engine maintenance date based on the monitored engine parameters.

In one embodiment, the method additionally provides the step of determining the engine maintenance date comprises the steps of testing the engine to form an engine profile and comparing the monitored engine parameters to the formed engine profile to determine an initial engine maintenance date. The initial maintenance date is communicated to a fleet operation controller and the percentage of aircraft in a fleet undergoing maintenance on the engine maintenance date is determined. The engine maintenance date is then determined based of the percentage of aircraft in a fleet undergoing maintenance on the engine maintenance date. In one embodiment, when the percentage of aircraft is above a threshold percentage the determined engine maintenance date is different than the initial engine maintenance date.

In one embodiment, the step of determining the engine maintenance date comprises the steps of testing the engine to form an engine profile and comparing the monitored engine parameters to the formed engine profile to determine an initial engine maintenance date. The initial maintenance date is communicated to a controller of a restorative coating system. Then the initial engine maintenance date is compared to a regularly scheduled maintenance date and the maintenance date is determined based on the regularly scheduled maintenance date. In one embodiment, the determined engine maintenance date is different than the initial engine maintenance date. In this embodiment, the controller of the restorative coating system can increase an amount of coating based on the engine maintenance date being different than the initial engine maintenance date. In this embodiment, the controller of the restorative coating system can change a spray pattern of the spray device based on the engine maintenance date being different than the initial engine maintenance date. In this embodiment, the controller of the restorative coating system can change the consistency of spray based on the engine maintenance date being different than the initial engine maintenance date.

In one embodiment, a control system is provided with one or more controllers configured to monitor one or more parameters of an engine. The one or more controllers also are configured to determine an additive application to direct on the engine based on the one or more monitored parameters of the engine. The additive application in one embodiment extends the life of the engine to greater than 25% of a measured initial life span of the engine. In another embodiment, the one or more controllers also are configured to determine when the additive application is directed on the engine.

Also provided herein is a coating system utilized to coat a component with an atomizing spray device. The coating system may be used to apply the additives to the thermal barrier coatings, as described above. The coating restoration system optionally includes a 360-degree rail and glider, where the glider has an attachment tool to methodically move the glider to locate the glider anywhere in relation to a component, such as a turbine. In this manner, an atomizing spray device attached to the glider applies a coating (e.g., a coating of an additive) on all surfaces of the component (or on a thermal barrier coating of the component) and at any given angle without the need of removing the component from existing machinery or disassembling the component. The process includes the selecting the nozzle spray angle, the spray rates, the spray duration, the glider travel speeds during spraying, the number of passes over the targeted liner surface, and/or the suitability of a liner for coating based on the condition of the thermal barrier coating.

The various spray devices disclosed herein can apply the additive to a thermal barrier coating from significantly larger working or standoff distances than other known spray devices. For example, some known spray devices may require being located within a centimeter or less from the surface receiving the additive. In contrast, the shapes of the outlets and/or interior chambers of the spray devices described herein are able to atomize and spray the additive while being located farther from the surfaces receiving the additive. For example, the spray devices may have a standoff distance of (e.g., be located from the surface being sprayed) two to forty centimeters.

According to the method of coating the component, two fluid streams (typically one liquid and one gas) are introduced into a device through fluid inlets of the device to combine at fluid outlets and to form droplets that comprise a slurry of ceramic particles in a gas. These streams may be combined into the droplets by mixing the fluid streams outside of an outer housing of the atomizing spray device. Optionally, one or more embodiments of the atomizing spray device may mix the fluid streams inside the outer housing of the atomizing spray device. The droplets formed outside or inside the atomizing spray device are two-phase droplets of ceramic particles within the fluid. In particular, the first fluid stream is a slurry that includes a first fluid such as an alcohol or water and the ceramic particle that is to be deposited on the component as at least one of the additives described above. The second fluid is typically a gas such as air, nitrogen or argon that mixes with the slurry and forms the shape of the spray resulting from the plurality of droplets formed from the slurry and gas discharged from the spray device.

The first fluid is selected to promote evaporation of the fluid as the two-phase droplets traverse through the air before the droplets impact the surface of a component. A fluid is selected to promote evaporation when the kinetic energy required to transform a given volume of the fluid from liquid to gas is less than the kinetic energy required to transform the same volume of water into water vapor. Additionally, evaporation is promoted by increasing the amount of evaporation compared to if that step was not taken. Thus, promoting evaporation can encompass partial evaporation of a fluid, complete evaporation of a fluid, or when partial evaporation of a fluid occurs during a time when the fluid is traversing through the air and finishes complete evaporation upon contacting a surface. Similarly, the temperature of the first fluid is selected or increased to again promote evaporation of the fluid after the fluid is discharged from the spray device but before impacting a component. Thus, either the first fluid is eliminated from the coating because of complete evaporation of the fluid prior to droplet impact or the amount of fluid impacting the component is substantially reduced. The amount of fluid remaining in the droplet impacting the component is considered substantially reduced when more than 50% of the fluid by weight of the fluid discharged by the spray device evaporates before impacting the component. By eliminating or minimizing fluid in the droplets a dry coating is provided that improves adhesion, fine atomization and uniformity of the coating layer. This also eliminates or minimizes cracking and imperfections within the coating after the application of the coating. Such imperfections occur because of the evaporation of the first fluid within the coating after application and bubbling cause by the fluids. The end result is a coating that is both uniform and less susceptible to wear and degradation during the life of the coating.

The atomizing spray devices disclosed herein are examples of spray devices that are utilized to accomplish the method of applying an additive to a coating of a component. Each individual spray device has advantages and results in different distributions of spray and coatings to occur at the surface of the component. Thus, a user of the coating restoration system may select the spray device depending on the component and the desired coating an end user desires. Additional spray devices can be provided that have elements or features of the disclosed spray devices, are a combination of the spray devices disclosed or provide components and elements not described as part of the disclosed spray devices yet still function to apply a coating to a component utilizing the method taught herein.

In some embodiments of the atomizing spray device, a device referred to as a pintle is utilized. A pintle generally is one or more target surfaces or areas utilized to atomize a gas, fluid and/or slurry moving past the surfaces. The pintle has a converging shape that narrows, tapers, is conical or otherwise reducing in size.

Figure 5:
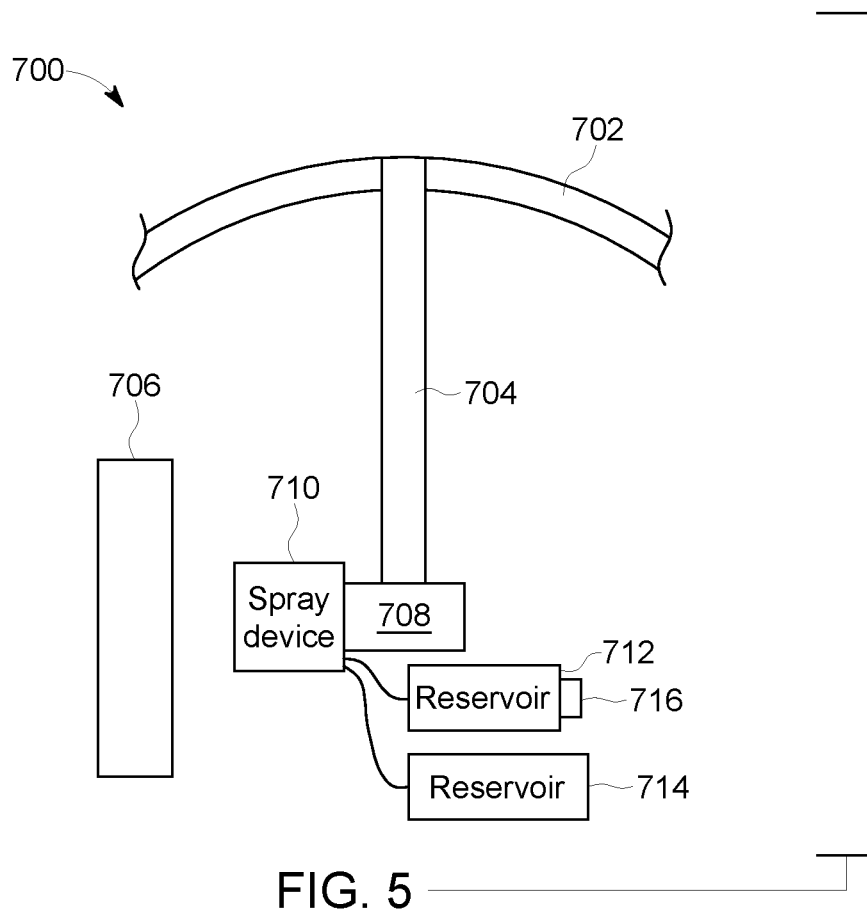

FIG. 5 is a schematic diagram of one embodiment of a coating system 700. The coating system 700 may be used as a coating restoration system that restores (e.g., repairs, replenishes, augments, etc.) an existing or previously applied coating on a surface, or may be used to initially apply or otherwise deposit a coating onto the surface. The system 700 includes a rail element 702 and glider element 704 that function to allow 360 degrees of movement in comparison to a component 706 that needs to be restored or coated. The rail element 702 is an elongated body on which the glider element 704 moves along to coat or restore a coating on different locations of the component 706. The rail element 702 may be placed inside the component 706 to allow the coating to be applied onto interior surfaces of the component 706. The component 706 can be any mechanical component including but not limited to a combustor, a turbine, a nozzle, a blade or the like. The component 706 can also be part of any machinery including, but not limited to a commercial airliner or the like. In one example, the engine 102 is represented by the component 706 in FIG. 5.

An attachment 708 is provided on the glider element 704 to receive a spray device 710, that in one embodiment is an atomizing spray device, to provide the coating (or apply the additive) to the component 706. In one embodiment, the coating or additive is utilized to restore a thermal barrier coating of the component 706. The spray device 710 receives fluid from one or more reservoirs 712, 714 via one or more pumps (not shown) to provide a slurry that includes the fluid and ceramic particles into the spray device 710 that is atomized and discharged by the spray device 710 to form droplets that impact the component 706 to form the coating. The fluid can be water and the ceramic particles can be any solid particles that function to form a coating or that deliver an additive to the component 706. The droplets may be formed outside of the outer housing or outer surfaces of the device such that the fluid and ceramic particles do not mix until the fluid and ceramic particles are outside of the device.

In one embodiment, a first or fluid reservoir 712 contains a fluid such as water, alcohol, or the like. The fluid of the first reservoir can be selected to promote evaporation of the fluid in the droplet formed by the spray device 710 as the droplet traverses through the air from the spray device 710 before impacting the component 706. In this manner, the fluid is either eliminated from the droplet that impacts the component 706 or the amount of fluid remaining in the droplet impacting the component 706 is substantially reduced. The fluid may be a liquid in one or more embodiments, but alternatively may include a gas.

Similarly, the temperature of the fluid in the system 700 can be increased, either by a heating element 716, or other device or method such that when the fluid is finally discharged from the spray device 710 again the amount of fluid remaining in the droplet impacting the component 706 is substantially reduced. Such increase in temperature, or heating, can occur at the fluid reservoir 712, in conduits conveying the fluid to the spray device 710 or within the spray device 710. In one example, both the temperature of the fluid is increased within the system and the fluid is selected to promote evaporation.

The fluid reservoir 712 is also designed to reduce the amount of gas from evaporated fluid that is conveyed to the spray device 710 relative to one or more other reservoirs. Specifically, the fluid reservoir can have an outlet adjacent the bottom of the reservoir or can be cooled to prevent gas from evaporated fluid from flowing from the reservoir 712. This ensures that the slurry of fluid and ceramic particles can be created and ensures a minimal amount of fluid evaporates in the system prior to discharging the fluid as part of the slurry from the spray device 710.

In an embodiment, a second or gas reservoir 114 is also provided. The reservoir contains a fluid that typically is a gas and thus is considered a gas reservoir. The gas in the gas reservoir 114 can include air, nitrogen, argon and the like. The gas flows from the gas reservoir 114 to the spray device 110 so the gas can be combined with the slurry by the spray device 110 to form the droplets that coat the component 106.

Figure 6:
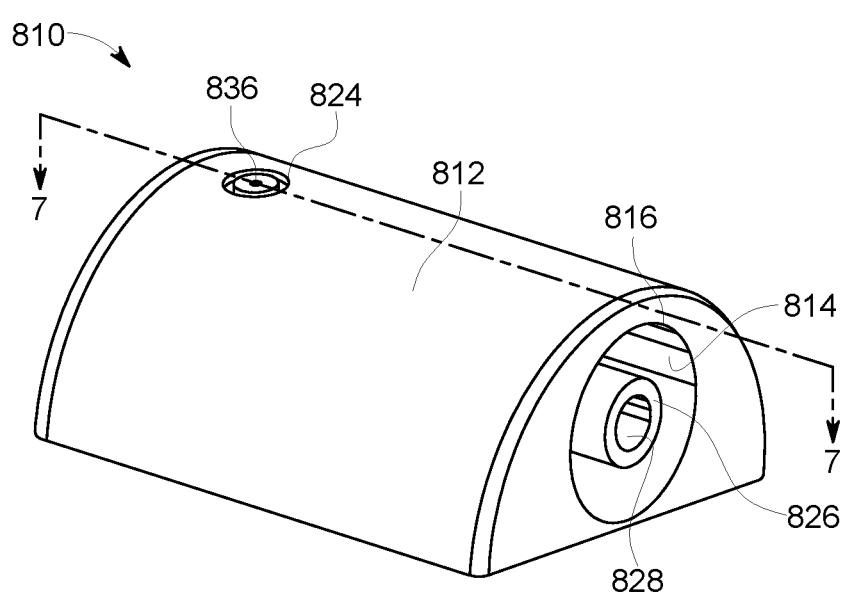
Figure 7:
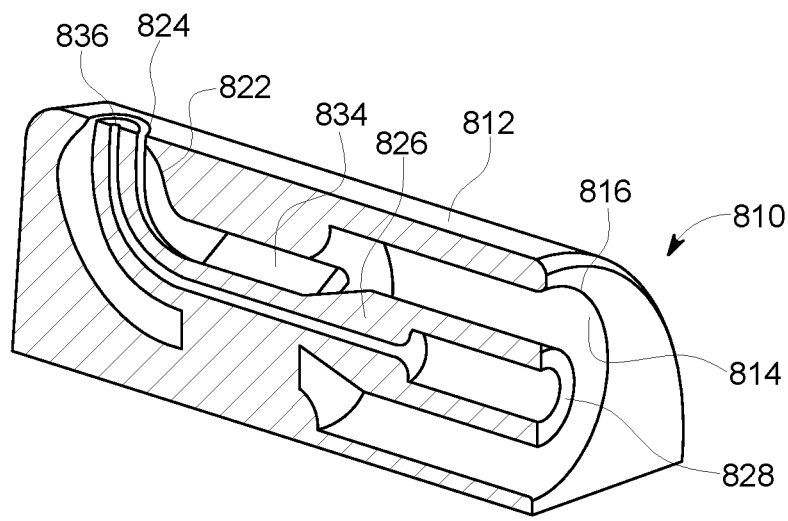
Figure 8:
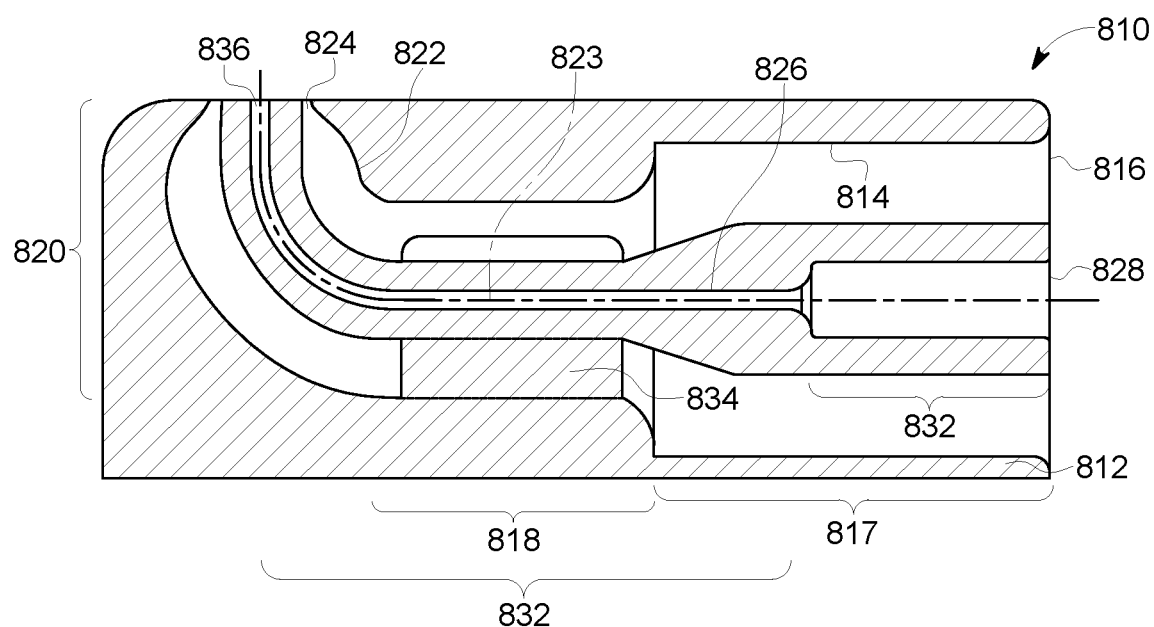

Each of the groups of FIGS. 6-8, 9-11, 12-14, 15-17, and 18-20 shows an example of an atomizing spray device 710. Other examples and embodiments of the atomizing spray devices 710 can be provided without falling outside of this disclosure. FIGS. 7-6-8 show a first atomizing spray device 810 that can be utilized within a coating restoration system. The spray device 810 has an outer housing 812 having a hollow chamber 814 disposed therethrough. The hollow chamber 814 extends through the housing 812 from a chamber inlet 816 through a first chamber section 817 that has a first diameter and narrows to a second chamber section 818 that has a diameter that is less than the diameter of the first chamber section 817. The narrowing diameter causes fluid therein to increase in speed through the second chamber section 818.

The second chamber section 818 extends into a third chamber section 820 that arcuately extends from the second chamber section 818 toward an outer wall of the housing 812. The third chamber section 818 has an outer diameter 822 that curves outwardly and then inwardly toward a center axis 823 of the hollow chamber 814. This shape provides a conical shaped section that converges toward and terminates in an annular outlet 824. The curvature of the outer diameter 822 of the third chamber section 818 determines the angle at which fluid flowing through the hollow chamber exits the annular outlet 824 and toward a center axis 823 of the hollow chamber 814.

A conduit 826 is disposed through the hollow chamber 814 and is centrally located within the hollow chamber 814 along the center axis 823 of the hollow chamber 814. The conduit 826 extends through the hollow chamber 814 from a conduit inlet 828 through a first conduit section 830 that has a first diameter and narrows to a second conduit section 832 that has a diameter that is less than the diameter of the first conduit section 830 to cause fluid therein to increase in speed through the second conduit section 832. Rib elements 834 are disposed within the hollow chamber 814 and engage the conduit 826 to support the conduit 826 within the hollow chamber 814 while allowing fluid flow through the hollow chamber 814. The second conduit section 832 extends arcuately through the third chamber section 818 toward the outer wall of the housing to a conduit outlet 836 continuing to extend along the center axis 823 of the chamber 814. The conduit outlet 836 is centrally located within the annular outlet 824 of the hollow chamber 814 such that the fluid flowing from the annular outlet 824 is angled toward the fluid flowing through the conduit outlet 836 to control the diameter of the resulting spray flowing through the conduit outlet 836.

During operation of the spray device 810 of this embodiment, a first fluid such as air, nitrogen, argon or the like is pumped into the chamber inlet 816 by a pump (not shown) while a second fluid, such as alcohol or water, contains ceramic particles therein to form a slurry and is pumped by a pump (not shown) through the conduit 826. The first fluid flows through the sections of the hollow chamber 814 and is angled by the curve of the outer diameter of the third chamber section 818 to form an air jet directed toward the slurry that flows through the conduit outlet 836. When discharged the first fluid and slurry combine to form two-phase droplets. As the droplets traverse toward the surface of the component the second fluid evaporates leaving only the ceramic particles to provide a uniform coating of the surface of the component. The resulting spray on the surface of the component is a circular spray having a Gaussian distribution at the surface of the component.

Figure 9:
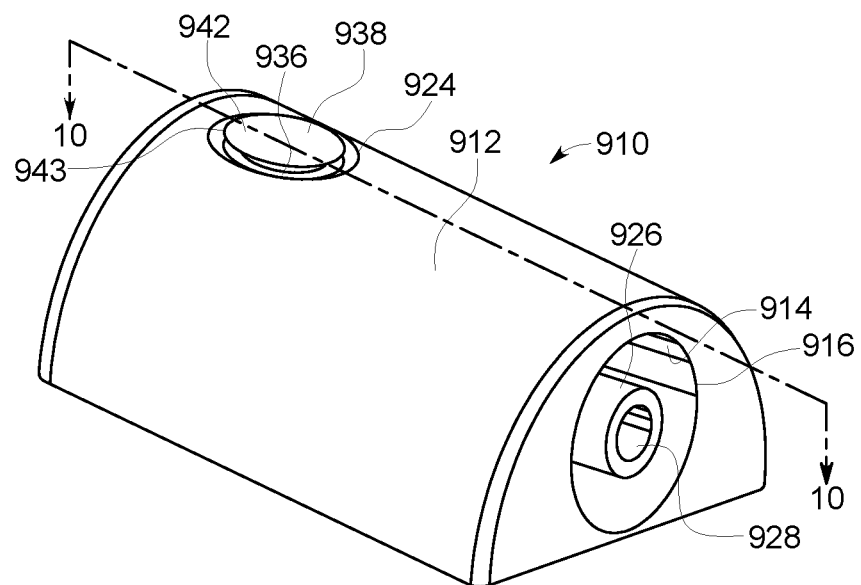
Figure 10:
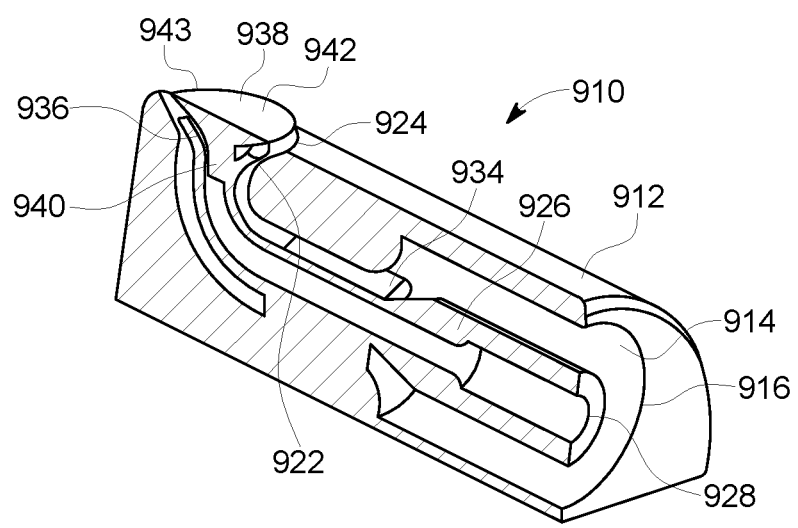
Figure 11:
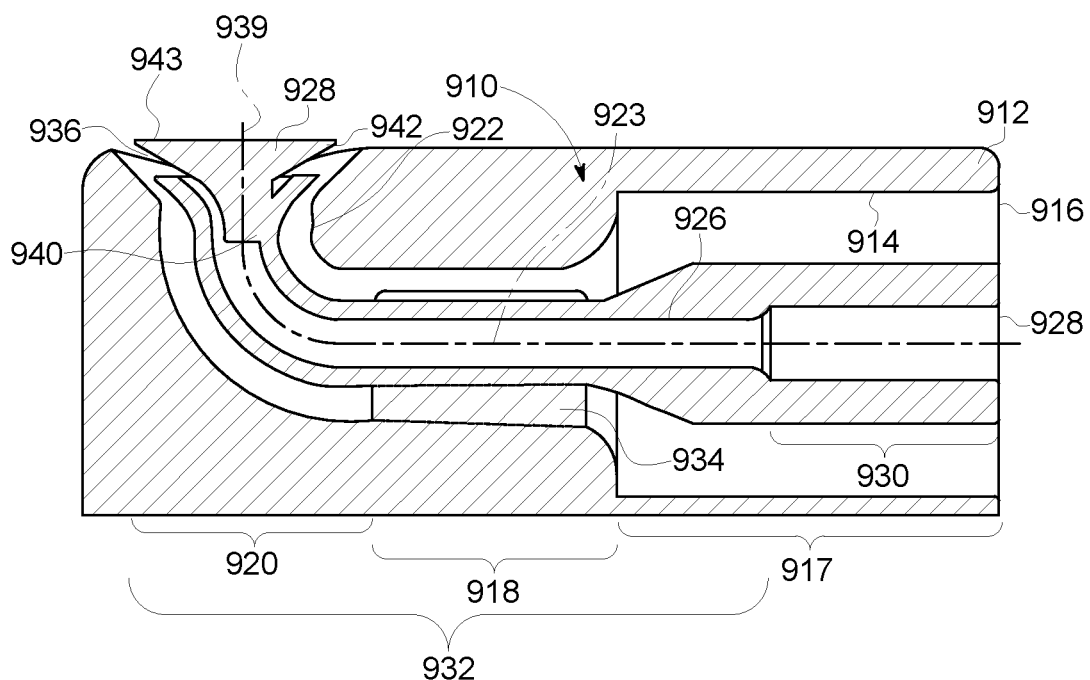

FIGS. 9-11 show another embodiment of an atomizing spray device 910 that can be utilized within a coating restoration system. The spray device 910 has an outer housing 912 having a hollow chamber 914 disposed therethrough. The hollow chamber 914 extends through the housing 912 from a chamber inlet 916 through a first chamber section 917 that has a first diameter and narrows to a second chamber section 918 that has a diameter that is less than the diameter of the first chamber section. As described above, these different diameters cause fluid therein to increase in speed through the second chamber section 918.

The second chamber section 918 extends into a third chamber section 920 that arcuately extends from the second chamber section 918 toward an outer wall of the housing 912. The third chamber section 918 has an outer diameter 922 that curves outwardly away from a center axis 923 of the chamber 914 to provide a conical shaped section that terminates in an annular outlet 924. The curvature of the outer diameter 922 of the third chamber section 918 determines the angle at which fluid flowing through the hollow chamber 914 exits the annular outlet 924 and away from a center axis 923 of the chamber 914.

A conduit 926 is disposed through the hollow chamber 914 and is centrally located within the hollow chamber 914. The conduit 926 extends through the hollow chamber 914 from a second or conduit inlet 928 through a first conduit section 930 that has a first diameter and narrows to a second conduit section 932 that has a diameter that is less than the diameter of the first conduit section 930 to cause fluid therein to increase in speed through the second conduit section 932. Rib elements 934 are disposed within the hollow chamber 914 and engage the conduit 926 to support the conduit 926 within the hollow chamber 914 while allowing fluid flow through the hollow chamber 914. The second conduit section 932 extends arcuately through the third chamber section 918 toward the outer wall of the housing to a conduit outlet 936. In this embodiment, at the conduit outlet 936 the second conduit section increases in diameter and extends away from the center axis of the chamber 914 to form a conically shaped outlet 936.

In this embodiment, a pintle 938 is disposed within the outlet 936 and engages the second conduit section 932 within the outlet 936 against a sidewall of the outlet 936 that is extending away from the center axis of the chamber 914. The pintle is secured such that a center axis 939 of the pintle 938 is off set from the center axis 923 of the chamber 914 at the outlet 924. The pintle 938 is conically shaped extending from a smaller diameter first end 940 to a larger diameter second end 942 that has an edge 943 and causes atomization of the slurry off the edge 943 of the larger diameter second end 942.

During operation of the spray device 910 of this embodiment, a first fluid such as air, nitrogen, argon or the like is pumped into the chamber inlet 916 by a pump (not shown) while a second fluid, such as alcohol or water, contains ceramic particles therein to form a slurry that is pumped by a pump (not shown) through the conduit 926. The first fluid flows through the sections of the hollow chamber 914 and is angled away from the center axis 923 of the chamber 914. The first fluid or gas flows past the edge 943 of the pintle 938 to atomize the fluid. Meanwhile, the slurry flows through the conduit outlet 936 also away from the center axis 923 of the chamber 914 and past the edge 943 of the pintle 938 to atomize the slurry. As a result, when gas and slurry are discharged from the spray device they mix to form two-phase droplets. The first fluid also acts to direct the droplets to form a conically shaped spray thus causing a circular spray pattern with a hollow interior, or a ring shape, at the surface of a component. As the droplets traverse toward the surface of the component, the second fluid within the droplets evaporates leaving only the ceramic particles to provide a uniform, liquid free coat at the surface of the component.

Figure 12:
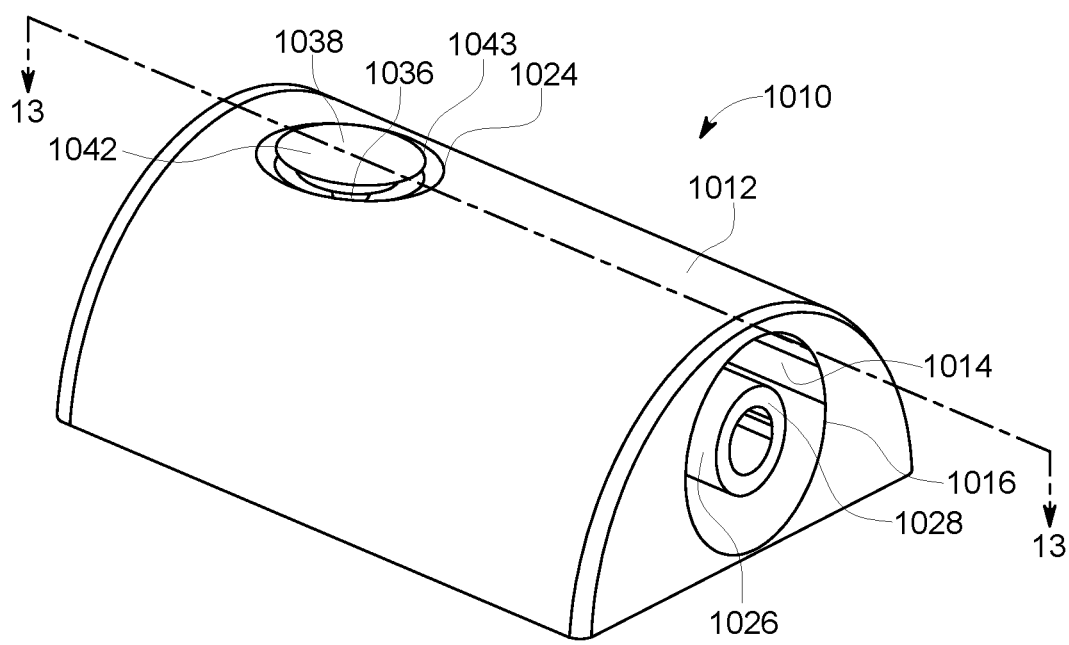
FIG. 12 is a perspective view of an atomizing spray device in accordance with one embodiment.
Figure 13:
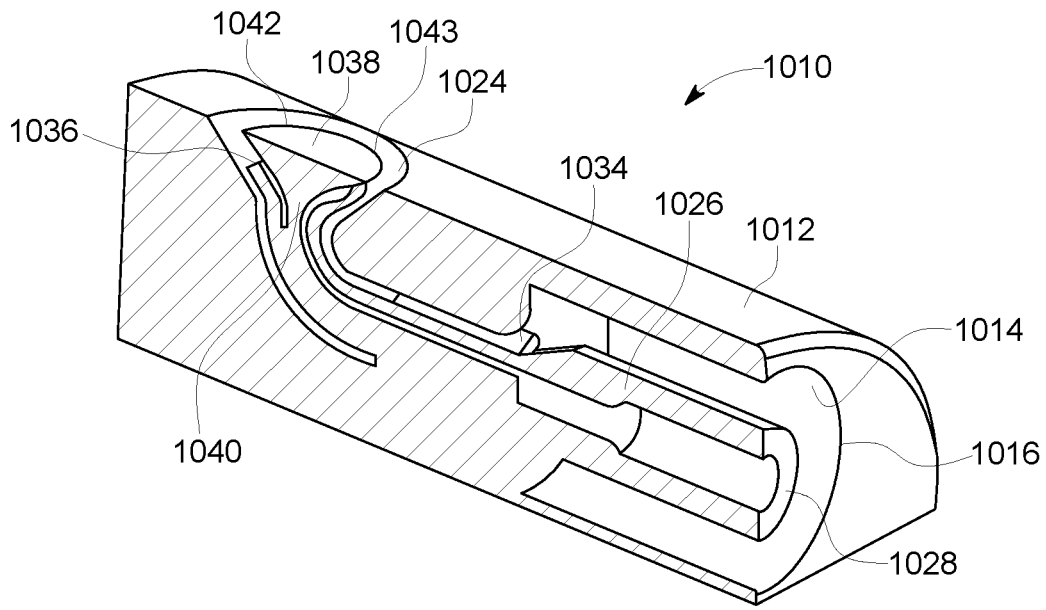
FIG. 13 is a sectional view of the atomizing spray device of FIG. 12 taken along the line 13-13 shown in FIG. 12.
Figure 14:
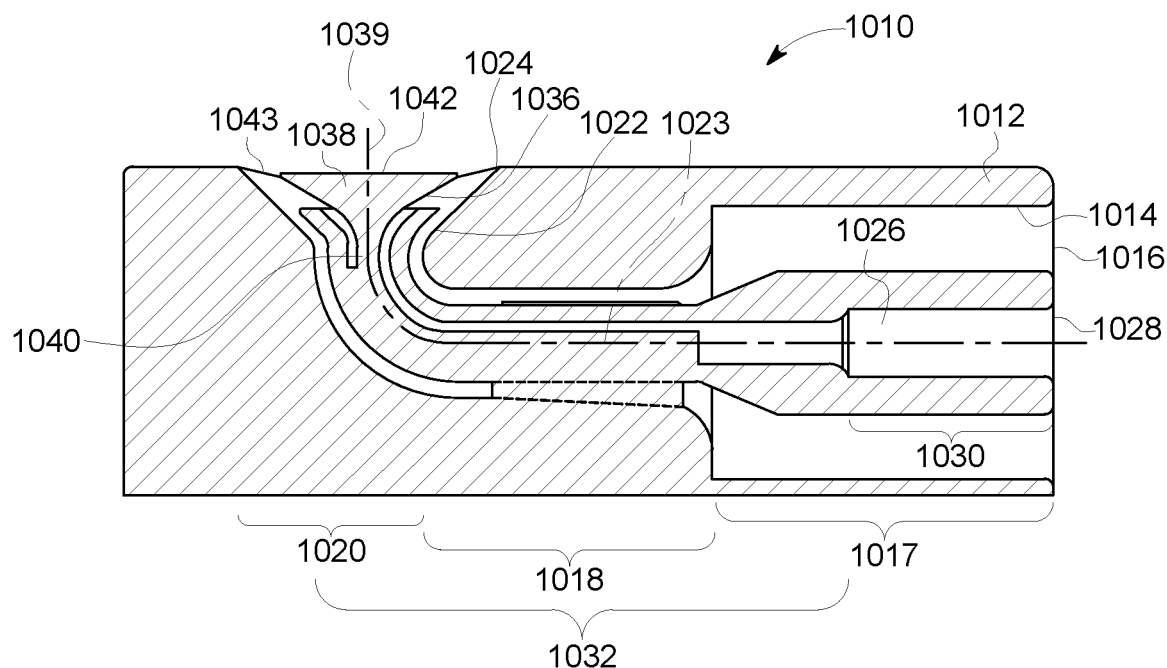
FIG. 14 is a cut away plan view of the atomizing spray device of FIG. 12.

FIGS. 12-14 show yet another embodiment of an atomizing spray device 1010 that can be utilized within a coating restoration system. The spray device 1010 has a housing 1012 having a hollow chamber 1014 disposed therethrough. The hollow chamber 1014 extends through the housing 1012 from a chamber inlet 1016 through a first chamber section 1017 that has a first diameter and narrows to a second chamber section 1018 that has a diameter that is less than the diameter of the first chamber section to cause fluid therein to increase in speed through the second chamber section 1018. The second chamber section 1018 extends into a third chamber section 1020 that arcuately extends from the second chamber 1018 toward an outer wall of the housing 1012. The third chamber section 1018 has an outer diameter 1022 that curves outwardly away from a center axis 1023 of the chamber 1014 to provide a conical shaped section that terminates in an annular outlet 1024. The curvature of the outer diameter 1022 of the third chamber section 1018 determines the angle at which fluid flowing through the hollow chamber exits the annular outlet 1024 and away from the center axis 1023 of the chamber 1014.

A conduit 1026 is disposed through the hollow chamber 1014 and is centrally located within the hollow chamber 1014. The conduit 1026 extends through the hollow chamber 1014 from a conduit inlet 1028 through a first conduit section 1030 that has a first diameter and narrows to a second conduit section 1032 that has a diameter that is less than the diameter of the first conduit section 1030 to cause fluid therein to increase in speed through the second conduit section 1032. Rib elements 1034 are disposed within the hollow chamber 1014 and engage the conduit 1026 to support the conduit 1026 within the hollow chamber 1014 while allowing fluid flow through the hollow chamber 1014. The second conduit section 1032 extends arcuately through the third chamber section 1018 toward the outer wall of the housing to a conduit outlet 1036. In this embodiment, at the conduit outlet 1036 the second conduit section increases in diameter and extends away from the center axis 1023 of the third chamber 1014 to form a conically shaped outlet 1036.

In this embodiment, a pintle 1038 is provided similar to the embodiment of FIGS. 6-8. In this embodiment, the pintle 1038 again is disposed within and engages the second conduit section 1032. However, in this embodiment, the pintle 1038 does not engage the outlet 1036. As a result, the first end 1040 of the pintle 1038 having a smaller diameter extends along the center axis 1023 of the chamber 1014 adjacent the conduit outlet 1036 such that the center axis 1039 of the pintle 1038 aligns with and is the same as the center axis 1023 of the hollow chamber 1014 at the outlet 1036. The pintle 1038 again is conically shaped extending from the smaller diameter first end 1040 to a larger diameter second end 1042 with atomization of the slurry occurring at the edge 1043 of the larger diameter end 1042. The pintle 1038 extends to its second end 1042 in such a way to provide even spacing between the pintle 1038 to the conduit outlet 1036 around the entire conduit outlet 1036. The pintle 1038 is this embodiment is fully within the housing 1012 and allows for an annular slurry flow as a result of being aligned with the center axis 1023 of the chamber 1014.

During operation of the spray device 1010 of this embodiment, a first fluid such as air, nitrogen, argon or the like is pumped into the chamber inlet 1016 by a pump (not shown) while a second fluid, such as alcohol or water, contains ceramic particles therein to form a slurry that is pumped by a pump (not shown) through the conduit 1026. The first fluid flows through the sections of the hollow chamber 1014 and is angled away from the center axis 1023 of the hollow chamber 1014. The slurry through the conduit outlet 1036 also away from the center axis 1023 of the hollow chamber 1014 and around the pintle 1038. As a result, when the first fluid and slurry are discharged from the spray device 1010 they mix to form two-phase droplets. The first fluid directs the droplets to provide a conically shaped spray of the droplet. Thus, a circular spray pattern with a hollow interior, or a ring shape, occurs at the surface of a component. As the droplets traverse toward the surface of a component the liquid in the droplets evaporate leaving only the ceramic particles to coat the surface of the component to provide a uniform coating.

Figure 15:
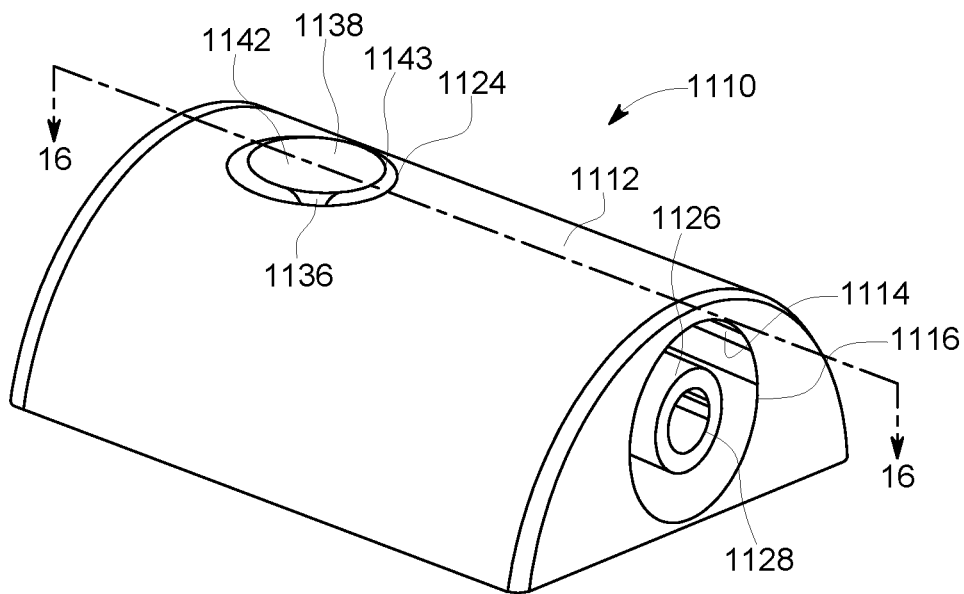
FIG. 15 is a perspective view of an atomizing spray device in accordance with one embodiment.
Figure 16:
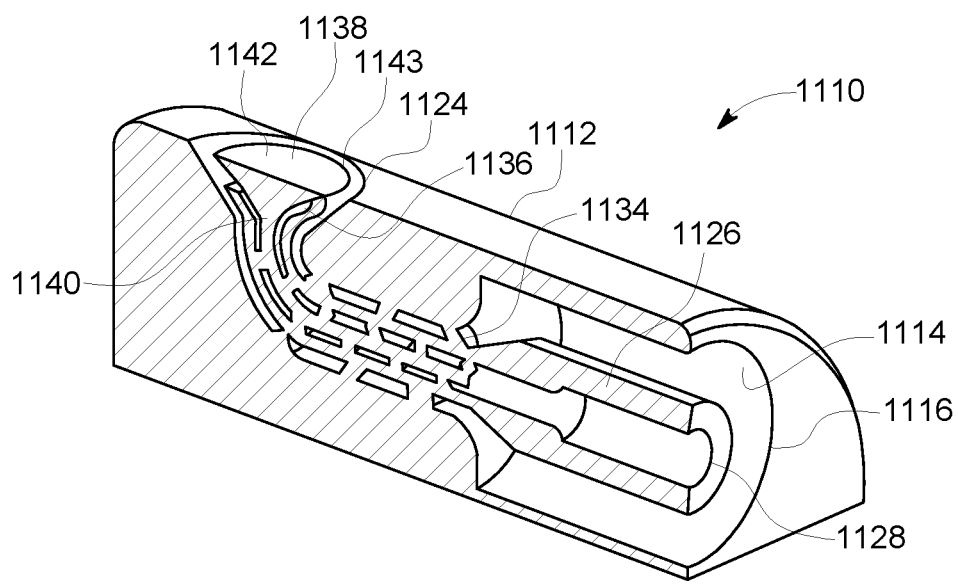
FIG. 16 is a sectional view of the atomizing spray device of FIG. 15 taken along the line 16-16 shown in FIG. 15.
Figure 17:
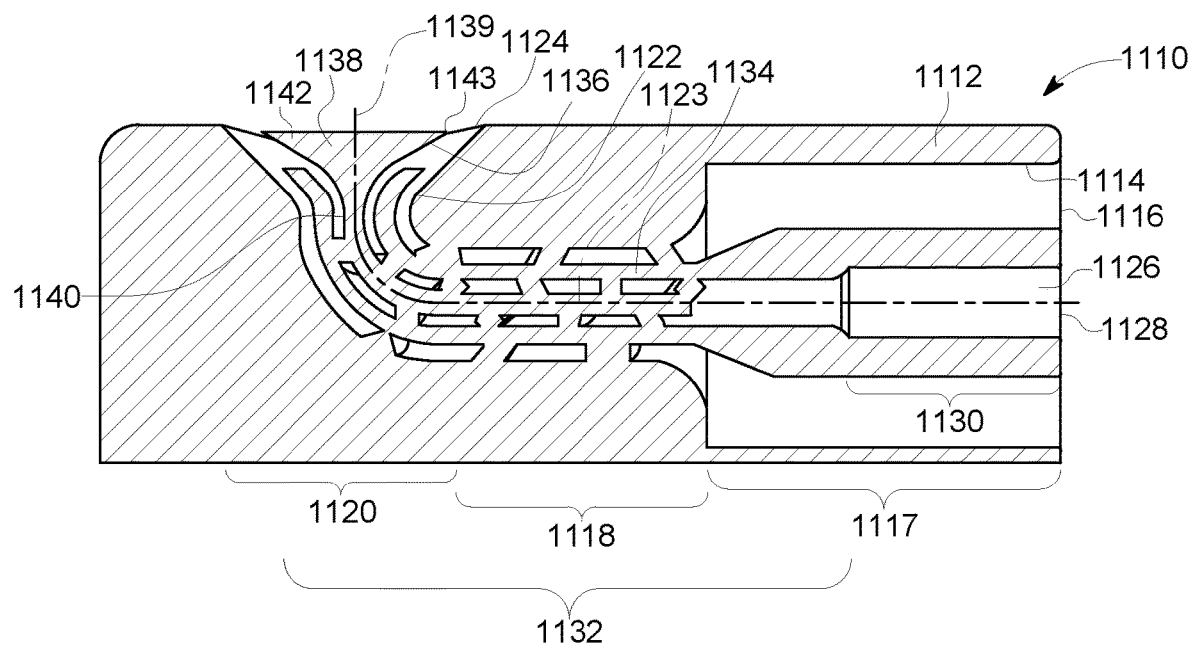
FIG. 17 is a cut away plan view of the atomizing spray device of FIG. 15.

FIGS. 15-17 show yet another embodiment of an atomizing spray device 1110 that can be utilized within a coating restoration system. The spray device 1110 has a housing 1112 having a hollow chamber 1114 disposed therethrough. The hollow chamber 1114 extends through the housing 1112 from a chamber inlet 1116 through a first chamber section 1117 that has a first diameter and narrows to a second chamber section 1118 that has a diameter that is less than the diameter of the first chamber section to cause fluid therein to increase in speed through the second chamber section 1118. In this embodiment, the second chamber section 1118 is helically shaped or curves about a center axis 1123 of the chamber 1114. The second chamber section 1118 extends in this manner into a third chamber section 1120 that arcuately extends from the second chamber 1118 toward an outer wall of the housing 1112. The third chamber section 1118 has an outer diameter 1122 that curves outwardly away from the center axis 1123 of the chamber 1114 to provide a conical shaped section that terminates in an annular outlet 1124. The curvature of the outer diameter 1122 of the third chamber section 1118 determines the angle at which fluid flowing through the hollow chamber exits the annular outlet 1124 and away from the center axis 1123 of the chamber 1114.

A conduit 1126 is disposed through the hollow chamber 1114 and is centrally located within the hollow chamber 1114. The conduit 1126 extends through the hollow chamber 1114 from a conduit inlet 1128 through a first conduit section 1130 that has a first diameter and narrows to a second conduit section 1132 that has a diameter that is less than the diameter of the first conduit section 1130 to cause fluid therein to increase in speed through the second conduit section 1132. Similar to the second chamber section 1118, the second conduit section 1132 is helically shaped or curves about a center axis 1123 of the hollow chamber 1114. Rib elements 1134 are disposed within the hollow chamber 1114 and engage the conduit 1126 to support the conduit 1126 within the hollow chamber 1114 while allowing fluid flow through the hollow chamber 1114. The second conduit section 1132 extends arcuately through the third chamber section 1118 toward the outer wall of the housing to a conduit outlet 1136. In this embodiment, at the conduit outlet 1136 the second conduit section increases in diameter and extends away from the center axis 1123 of the chamber 1114 to form a conically shaped outlet 1136.

In this embodiment, a pintle 1138 is provided similar to the embodiment of FIGS. 9-11. In this embodiment, the pintle 1138 is disposed within and engages the second conduit section 1132, but does not engage the outlet 1136. As a result, the first end 1140 of the pintle 1138 having a smaller diameter extends along the center axis 1123 of the chamber 1118 adjacent the conduit outlet 1136. In this manner, the center axis 1139 of the pintle 1138 aligns or is the same as the center axis 1123 of the chamber 1114 at the outlet 1124. The pintle 1138 again is conically shaped extending from the smaller diameter first end 1140 to a larger diameter second end 1142 with atomization of the slurry occurring at the edge 1143 of the larger diameter end 1142. The pintle 1138 extends to its second end 1142 in such a way to provide even spacing between the pintle 1138 to the conduit outlet 1136 around the entire conduit outlet 1136. The pintle 1138 is this embodiment is fully within the housing 1112 and allows for an annular slurry flow as a result of being aligned with the center axis 1123 of the chamber 1114.

During operation of the spray device of this embodiment, a first fluid such as air, nitrogen, argon or the like is pumped into the chamber inlet 1116 by a pump (not shown) while a second fluid, such as alcohol or water, contains ceramic particles therein to form a slurry that is pumped by a pump (not shown) through the conduit 1126. In this embodiment, the pressurization of the fluid should be increased to address loss in speed as a result of the helix shaped chamber 1114 and conduit 1126. As the first fluid flows through the second chamber section 1118 and flows through the helically shaped section to cause increase sheer over the pintle 1138 thus providing a finer, more efficient atomization and finer film of gas resulting passing the pintle 1138. Similarly, as the slurry flows through the second conduit section 1132 and through the helically shaped section, sheer at the pintle 1138 is increased providing a finer, more efficient atomization and finer film of slurry passing the pintle 1138.

Similar to the embodiment of FIGS. 9-11, the first fluid at the third chamber section 1118 is angled away from the center axis 1123 of the chamber 1114. At this time, the slurry flows through the conduit outlet 1136 also away from the center axis 1123 of the chamber 1114 and around the pintle 1138. As a result, the first fluid and slurry mix after being discharged from the spray device 1110 to form two phase droplets that traverse toward a component surface. The first fluid directs the droplets to provide a conically shaped spray of the droplets causing a circular spray pattern with a hollow interior, or a ring shape, at the surface of a component. As the droplets flow toward the surface of the component, the liquid in the droplets evaporates leaving only the ceramic particles to provide a uniform coat at the surface of the component. The spray distributions at the surface of the component for each of the embodiments shown in FIGS. 6-17 provide dual peaks, with a peak distribution at an outer perimeter and then a second peak at the inner perimeter of the coating.

Figure 18:
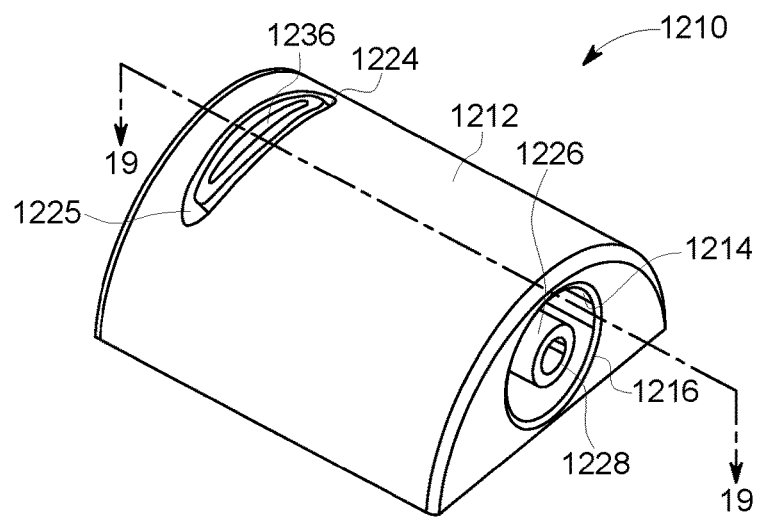
FIG. 18 is a prospective view of an atomizing spray device in accordance with one embodiment.
Figure 19:
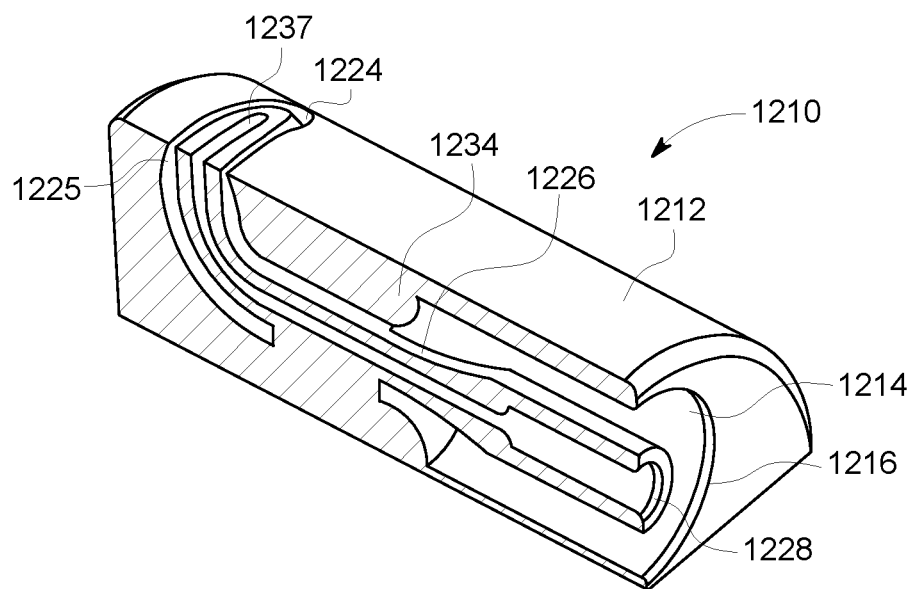
FIG. 19 is a sectional view of the atomizing spray device of FIG. 18 taken along the line 19-19 shown in FIG. 18.
Figure 20:
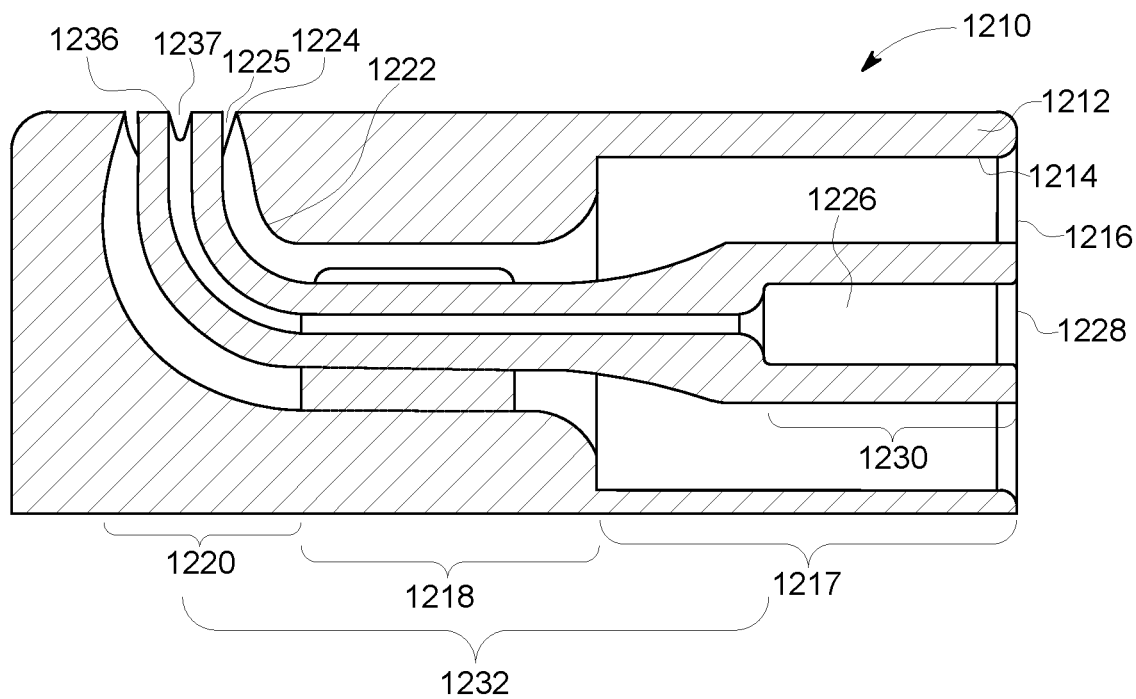
FIG. 20 is a cut away plan view of the atomizing spray device of FIG. 18.
Figure 22:
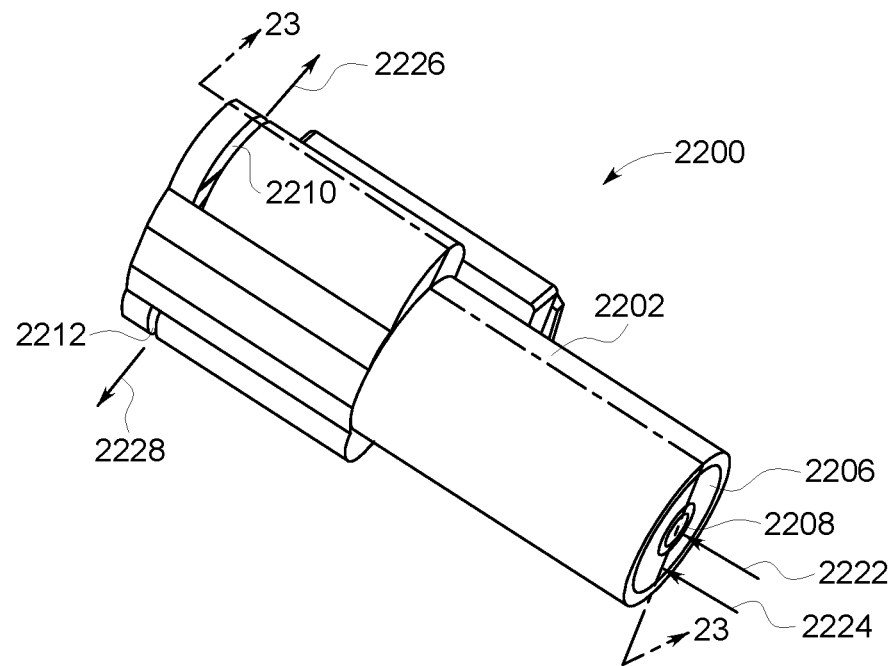
FIG. 22 illustrates a perspective view of another embodiment of an atomizing spray device.
Figure 23:
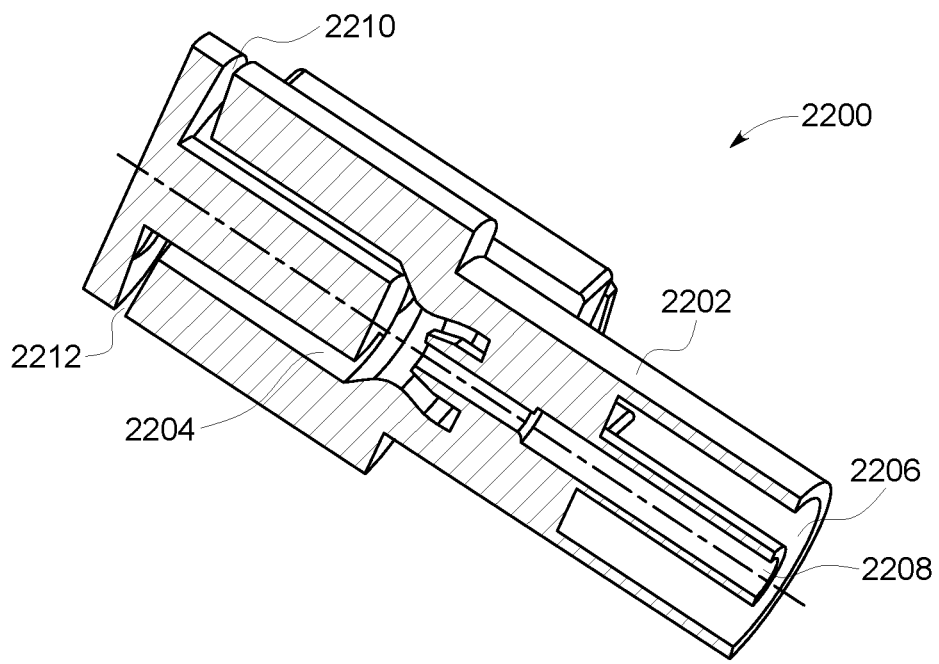
FIG. 23 illustrates a cross-sectional view of the atomizing spray device shown in FIG. 22.
Figure 24:
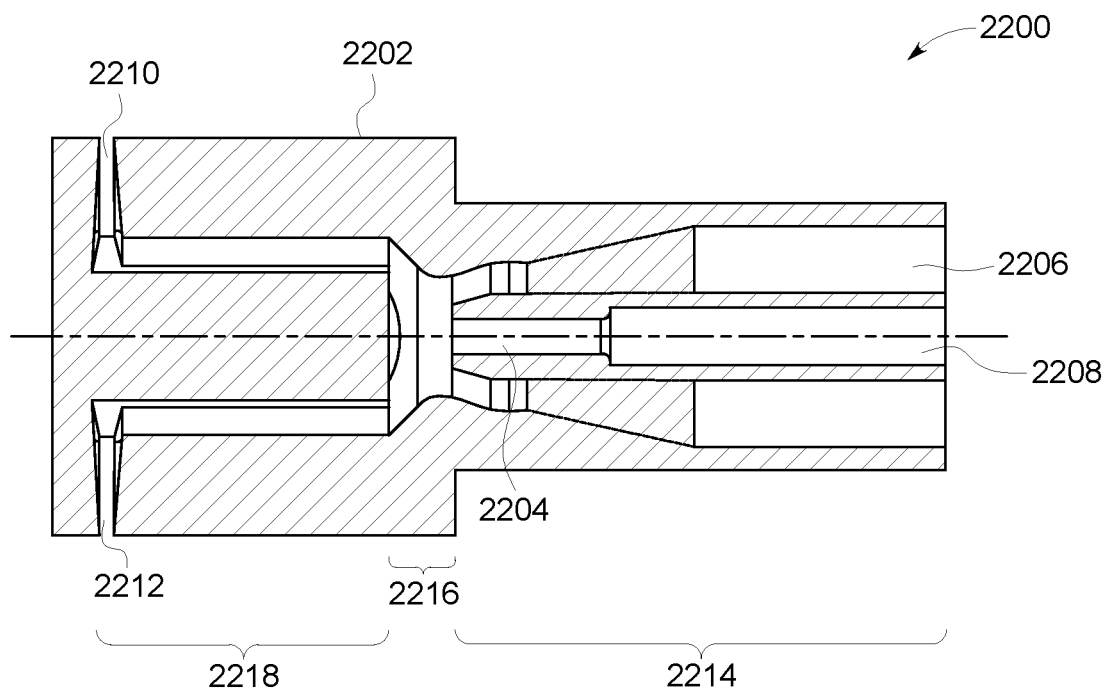
FIG. 24 illustrates a cross-sectional view of the atomizing spray device shown in FIG. 22.
Figure 25:
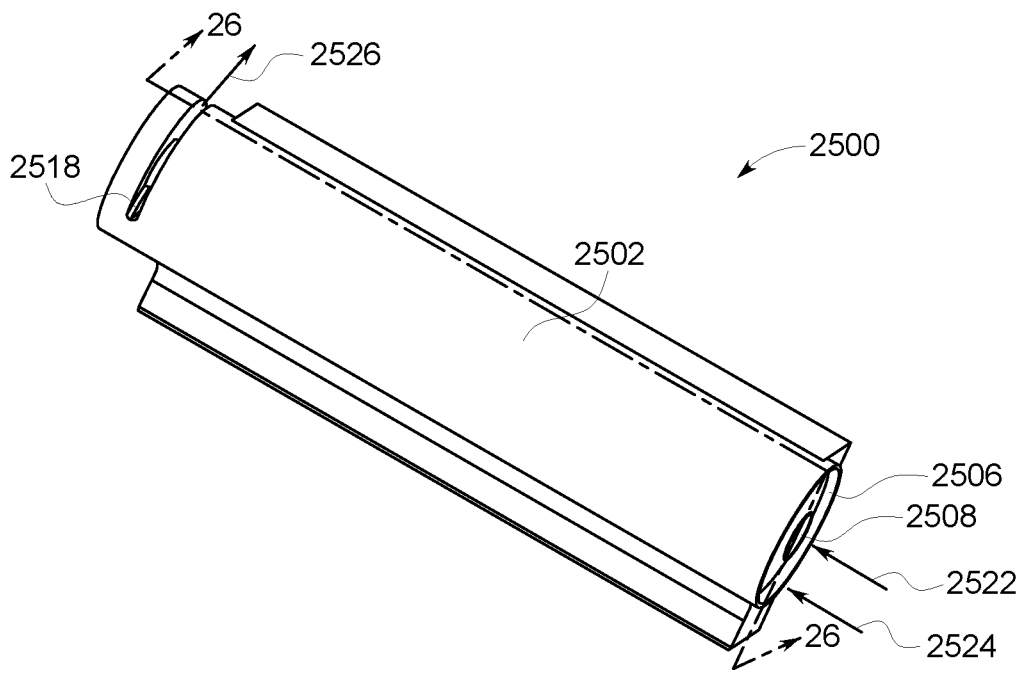
FIG. 25 illustrates a perspective view of another embodiment of an atomizing spray device.

FIGS. 18-20 show another example of an atomizing spray device 1210 that can be utilized within a coating restoration system. The spray device 1210 has a housing 1212 having a hollow chamber 1214 disposed therethrough. The hollow chamber 1214 extends through the housing 1212 from a chamber inlet 1216 through a first chamber section 1217 that has a first diameter and narrows to a second chamber section 1218 that has a diameter that is less than the diameter of the first chamber section to cause fluid therein to increase in speed through the second chamber section 1218. The second chamber section 1218 extends into a third chamber section 1220 that arcuately extends from the second chamber 1218 toward an outer wall of the housing 1212. The third chamber section 1218 has an outer diameter 1222 that curves inwardly toward a center axis 1223 of the chamber 1214 and terminates at an outlet 1224 that has an angled surface 1225 to form an oval shape outlet 1224 in the outer wall of the housing 1212.

A conduit 1226 is disposed through the hollow chamber 1214 and is centrally located within the hollow chamber 1214. The conduit 1226 extends through the hollow chamber 1214 from a conduit inlet 1228 through a first conduit section 1230 that has a first diameter and narrows to a second conduit section 1232 that has a diameter that is less than the diameter of the first conduit section 1230 to cause fluid therein to increase in speed through the second conduit section 1232. Rib elements 1234 are disposed within the hollow chamber 1214 and engage the conduit 1226 to support the conduit 1226 within the hollow chamber 1214 while allowing fluid flow through the hollow chamber. The second conduit section 1232 extends arcuately through the third chamber section 1218 toward the outer wall of the housing to a conduit outlet 1236. The conduit outlet 1236 has an angled surface 1237 similar to the chamber outlet 1224 such that the oval shape of the chamber outlet surrounds the oval shape of the conduit outlet 1236. Therefore, fluid flowing from the outlet 1224 is angled toward the slurry flowing through the conduit outlet 1236 to control the perimeter of the resulting spray flowing through the conduit outlet 1236.

During operation of the spray device 1210 of this embodiment, a first fluid such as air, nitrogen, argon or the like is pumped into the chamber inlet 1216 by a pump (not shown) while a second fluid, such as alcohol or water, contains ceramic particles therein to form a slurry that is pumped by a pump (not shown) through the conduit 1226. The first fluid flows through the sections of the hollow chamber 1214 and is angled by the third chamber section 1218 toward the slurry that flows through the conduit outlet 1236. When the first fluid and slurry are discharged from the spray device 1210 they mix to form two-phase droplets. As a result of the angled shape of the chamber outlet 1224 and the angled shape of the conduit outlet 1236, the first fluid directs the droplets to provide an oval-shaped spray of the second fluid causing a solid oval-shaped spray pattern at the surface of a component. As the droplets flow toward the surface of a component the liquid in the droplets evaporates leaving only the ceramic particles to provide a uniform coat at the surface of the component. The spray device 1210 of this embodiment is referred to as a fan nozzle design and the spray device provides a flat spray (as compared to the conical sprays of FIGS. 6-17) that widens the spray area that is coated. Distribution of the spray at the surface has an extended central peak.

FIG. 21 illustrates a flow chart of one embodiment of a method 1300 for coating a component with a spray device. According to the method of coating a component, at 1302, a coating application where a component needs to be coated is determined to be presented. An atomizing spray device is provided at 1304. At 1306, a fluid for mixing with ceramic particles to form a slurry is selected to promote evaporation of the fluid during the spraying process. At 1308, the temperature of the fluid flowing through the spray device outlet is selected to promote evaporation of the fluid during the spraying process. At 1310, the atomizing spray device forms two-phase droplets. The two-phase droplets of ceramic particles then traverse through the air toward the surface of the component at 1312. At 1314, while two-phase droplets are in the air before impacting the surface of the component the selected fluid evaporates from the two-phase droplets. The droplets then coat the surface of the component at 1316.

In a first example of the method, a turbine engine on the wing of an airplane has a thermal barrier coating that is to be restored. After selecting the atomizing spray device, alcohol is chosen as the fluid to be mixed with the ceramic particles to form the slurry, because alcohol is a fluid that promotes evaporation. In this example, the temperature of the fluid is not selected or increased to promote evaporation of the spray. After the spray device discharges the fluid as part of a slurry from the spray device, a droplet that includes the fluid is formed. As this droplet traverses through the air, the fluid evaporates substantially reducing the amount of fluid in the droplet before the droplet impacts the surface of the turbine to form the thermal barrier coating.

In a second example of the method when a fan blade requires a coating the atomizing spray device is chosen. Water is the fluid selected to be mixed with the ceramic particles to form the slurry and does not promote evaporation of the fluid. In this example the temperature of the two-phase droplets is increased compared the temperature of the two-phase droplets without auxiliary heating of the droplets. Auxiliary heating of the droplets can include, but is not limited to increasing the temperature of the water flowing to the inlet of the spray device or increasing the temperature of the water within the spray device as a result of an additional heat source within the spray device, or the like. By increasing the temperature of the fluid, in this example water, above the ambient temperature, kinetic energy is increased in the droplets and the likelihood of evaporation of the water in the droplets is more likely. Thus, the selected temperature of the fluid promotes evaporation. In this embodiment, the amount of water that evaporates from the droplets substantially reduces the amount of water in the droplet upon impact compared to the amount of water discharged from the spray device.

In an additional example, again, when a turbine engine is to be restored the fluid selected for mixing with the ceramic particles is alcohol to promote evaporation. In this embodiment, the ambient temperature is 20° C. (68° F.) and the selected temperature requires the temperature of the fluid entering the spray device to be increased to 40° C. (104° F.) to promote evaporation of the alcohol once the droplets are sprayed. In this embodiment, because of the selection of the alcohol and the increase in the droplet temperature, again a substantial amount of the alcohol discharged from the spray device evaporates prior to the droplets impacting the surface of the turbine engine.

In yet another example, a turbine engine is to be restored and the fluid selected for mixing with the ceramic particles is alcohol to promote evaporation. In this embodiment, the ambient temperature again is 20° C. (68° F.). In this example, the selected temperature is in a range between 25° C. (77° F.) and 78° C. (173° F.) or in a range below the boiling point of the alcohol to prevent evaporation within the spray device. After the discharge of the slurry and gas from the spray device and after the forming of the droplets, all of the alcohol in the droplets evaporates such that when the droplets impact the turbine engine no alcohol remains as part of the coating.

In one embodiment, a system is provided. The system has a fluid reservoir containing a fluid that promotes evaporation when the fluid is exposed to gas and a spray device having one or more hollow chambers having one or more conduits disposed therethrough that are fluidly connected to the first reservoir to receive a slurry containing the fluid and a mix of ceramic particles and the gas. Said one or more conduits extend from a conduit inlet to a conduit outlet where the slurry is discharged to form droplets containing the fluid such that, based on a discharged amount of fluid in the droplets, the fluid promotes evaporation when the fluid is exposed to a gas, as the droplets traverse from the spray device toward an article. In one embodiment, the fluid contained in the droplets at least partially evaporates prior to impacting the surface of the article being coated. In one embodiment a a secondary coating is discharged from the conduit outlet to provide at least one of, removal of loose particles from the article, removal of overspray from cooling holes, or coating thickness control.

In one embodiment, a method is contemplated to provide a coating to a component. That method includes providing a spray device and supplying a slurry of a fluid and ceramic particles to the spray device. The slurry is then discharged from the spray device to form droplets containing the fluid to impact the component. As the droplets traverse from the spray device towards the component the fluid contained in the droplets evaporates prior to impacting the component.

In one embodiment of the method the fluid is selected to promote evaporation of the fluid prior to impacting the component. In this embodiment, the fluid can be alcohol. In this embodiment, the fluid can also be a fluid that has a lower boiling point than water provided at the same atmospheric pressure as the fluid.

In another embodiment, the temperature of the slurry is increased to promote evaporation of the fluid prior to impacting the component. In this embodiment, the temperature of the slurry can be increased by at least 10° C. to promote evaporation of the fluid prior to impacting the component.

In one embodiment, all of the fluid contained in the droplets formed evaporate such that when the droplets impact the component the fluid is eliminated from the droplets. In another embodiment, more than 50% of the fluid by weight of the fluid discharged by the spray device evaporates prior to impacting the component.

In one embodiment, the method further comprises supplying a gas to the spray device and discharging the gas from the spray device. The gas is directed toward the slurry discharged from the spray device to mix with the slurry to form the droplets.

In one embodiment, the gas is selected from a group consisting of air, nitrogen, and argon. In an embodiment, the method further comprises selecting the gas to promote the evaporation of the fluid in the droplets prior to impacting the component.

In one embodiment, the droplets that impact the component form a thermal barrier coating on the component. In another embodiment, the component is a gas turbine.

In one embodiment the spray device comprises a housing and a hollow chamber disposed through the housing from a chamber inlet to a chamber outlet. The hollow chamber has a conical shape adjacent the chamber outlet that tapers inwardly toward a center axis of the hollow chamber and toward the chamber outlet such that a gas flowing through the hollow chamber is directed toward the center axis of the hollow chamber upon being discharged from the chamber outlet.

In this embodiment, the spray device further comprises a conduit disposed through and centrally located within the hollow chamber from a conduit inlet to a conduit outlet and receiving the slurry. In particular, the slurry is discharged at the conduit outlet along the center axis of the hollow chamber such that the gas flowing through the chamber outlet that is directed toward the center axis of the hollow chamber combines with the slurry to form the droplets. The gas shapes a plurality of the droplets as the droplets are formed to provide a uniform distribution of droplets on the component. In addition, a curvature of an outer wall of the hollow chamber that forms the conical shape determines the angle at which the gas discharges from the chamber outlet.

In one embodiment, the spray device comprises a housing and a hollow chamber disposed through the housing from a chamber inlet to a chamber outlet. The hollow chamber has a conical shape adjacent the chamber outlet that tapers outwardly away from a center axis of the hollow chamber and toward the chamber outlet such that a gas flowing through the hollow chamber is directed away from the center axis of the hollow chamber upon being discharged from the chamber outlet.

In this embodiment, the spray device can further comprise a conduit disposed through and centrally located within the hollow chamber from a conduit inlet to a conduit outlet and receiving the slurry. The conduit has a conical shape adjacent the conduit outlet that tapers outwardly away from the center axis of the hollow chamber and toward the conduit outlet such that the slurry flowing through the conduit is directed away from the center axis of the hollow chamber upon being discharged from the conduit outlet.

In this embodiment, the spray device further comprises one or more target surfaces disposed in the chamber outlet and secured to the conduit such that a center axis of the one or more target surfaces is off set from the center axis of the hollow chamber at the chamber outlet such that the one or more target surfaces direct slurry away from the center axis of the one or more target surfaces as the slurry is discharged from conduit outlet. As slurry is discharged at the conduit outlet away from the center axis of the one or more target surfaces, the gas flowing through the chamber outlet that is directed away from the center axis of the hollow chamber combines with the slurry to form the droplets. Thus, the gas shapes a plurality of the droplets as the droplets are formed to provide a uniform distribution of droplets on the component.

In another embodiment of this embodiment of the spray device, one or more target surfaces are disposed in the chamber outlet and secured to the conduit such that a center axis of the one or more target surfaces align with the center axis of the hollow chamber at the chamber outlet such that the one or more target surfaces direct slurry away from the center axis of the one or more target surfaces as the slurry is discharged from conduit outlet. As slurry is discharged at the conduit outlet away from the center axis of the one or more target surfaces, the gas flowing through the chamber outlet that is directed away from the center axis of the hollow chamber combines with the slurry to form the droplets. Thus, the gas shapes a plurality of the droplets as the droplets are formed to provide a uniform distribution of droplets on the component.

In one embodiment, at least one section of the hollow chamber is helically shaped, extending around the center axis of the hollow chamber to reduce shear forces of air flowing through the hollow chamber prior to the air being discharged from the chamber outlet. In another embodiment, at least one section of the conduit is helically shaped, extending around the center axis of the hollow chamber to reduce shear forces of slurry flowing through the conduit prior to being discharged from the chamber outlet.

In one embodiment, the spray device comprises a housing and a hollow chamber disposed through the housing from a chamber inlet to a chamber outlet and receiving a gas. The chamber outlet has an angled surface to elongate the chamber outlet along an axis perpendicular to the center axis of the hollow chamber at the outlet. In this embodiment, the spray device further comprises a conduit disposed through and centrally located within the hollow chamber from a conduit inlet to a conduit outlet and receiving the slurry. The conduit outlet also has an angled surface to elongate the conduit outlet along an axis perpendicular to the center axis of the hollow chamber at the outlet. The slurry is discharged at the conduit outlet such that the gas flowing through the chamber outlet is directed toward and combines with the slurry to form the droplets. Therefore, the gas shapes a plurality of the droplets as the droplets are formed to provide a uniform distribution of droplets on the component.

In one embodiment, a system is provided. The system includes a fluid reservoir containing a fluid that promotes evaporation when the fluid is exposed to air and a spray device having a hollow chamber that has a conduit disposed therethrough that is fluidly connected to the first reservoir to receive a slurry containing the fluid and a mix of ceramic particles. The fluid reservoir prevents evaporation from the fluid from being received within the conduit. The conduit extends from a conduit inlet to a conduit outlet where the slurry is discharged to form droplets containing the fluid such that based on a discharged amount of fluid in the droplets and the fluid promoting evaporation when the fluid is exposed to air, as the droplets traverse from the spray device towards the component the fluid contained in the droplets evaporates prior to impacting the component.

In one embodiment, the fluid is alcohol.

In one embodiment, the fluid contained in the droplets evaporates further based on slurry temperature at the chamber outlet. As the fluid flows through the spray device, the temperature of the fluid is increased to promote evaporation of the fluid as the fluid travels toward the component.

In one embodiment, the fluid reservoir increases the temperature of the fluid to promote evaporation of the fluid as the fluid travels toward the component. In another embodiment, the fluid reservoir has a fluid outlet located adjacent a bottom of the fluid reservoir to prevent evaporation from the fluid from being received within the conduit.

In this embodiment, the system further comprises a gas reservoir containing a gas and fluidly connected to a chamber inlet of the hollow chamber such that the hollow chamber receives the gas. The gas flows through the spray device from the chamber inlet to a chamber outlet. The gas is discharged from the spray device at the chamber outlet to mix with the slurry discharged from the conduit outlet to form the droplets.

In one embodiment, the gas mixes with the slurry inside the conduit before being discharged from the spray device at the chamber outlet. In another embodiment, the gas includes at least one of air, nitrogen, or argon.

In one embodiment, a spray device is provided. The spray device has a housing and one or more hollow chambers disposed through the housing from one or more chamber inlets to one or more chamber outlets. The one or more hollow chambers are configured to direct gas received into the one or more hollow chambers away from the center axis of the hollow chamber upon being discharged from the chamber outlet. A conduit is disposed through and centrally located within the hollow chamber from a conduit inlet to a conduit outlet and receiving a slurry. The one or more hollow chambers are also configured to direct gas received into the one or more hollow chambers away from the center axis of the hollow chamber upon being discharged from the chamber outlet.

In one embodiment, the spray device further comprises one or more target surfaces disposed in the chamber outlet and secured to the conduit such that one or more edges of the one or more target surfaces atomize the gas and slurry flowing past the one or more edges to provide a uniform coating of a slurry and gas droplet formed by the spray device onto an article. In the embodiment, the one or more target surfaces have a converging shape adjacent the chamber outlet that tapers outwardly away from a center axis of the hollow chamber and toward the chamber outlet.

In one embodiment, the one or more target surfaces are secured to the conduit such that one or more center axes of the one or more target surfaces are off set from the center axis of the hollow chamber at the chamber outlet. In another embodiment, the one or more target surfaces are secured to the conduit such that a center axis of the one or more target surfaces align with the center axis of the hollow chamber at the chamber outlet. In yet another embodiment, at least one section of the hollow chamber is helically shaped, extending around the center axis of the hollow chamber from the inlet to the outlet.

In one embodiment, a method is provided for applying a coating to an article.

Steps include supplying a slurry comprising a fluid and ceramic particles to a spray device and discharging the slurry from the spray device to form droplets containing the fluid and the ceramic particles that are directed toward the component. As the droplets traverse from the spray device toward the component the fluid contained in the droplets at least partially evaporates prior to the ceramic particles impacting the component. In another embodiment, the fluid at least partially evaporates prior to the ceramic particles impacting the component. In yet another embodiment, an additional step of increasing a temperature of the slurry prior to discharging the slurry from the spray device is provided.

In one embodiment, another spray device is provided. The spray device has a housing and a hollow chamber disposed through the housing from a chamber inlet to a chamber outlet. The hollow chamber has a conical shape adjacent the chamber outlet that tapers outwardly away from a center axis of the hollow chamber and toward the chamber outlet such that a gas flowing through the hollow chamber is directed away from the center axis of the hollow chamber upon being discharged from the chamber outlet. A conduit is disposed through and centrally located within the hollow chamber from a conduit inlet to a conduit outlet and receiving a slurry. The conduit has a conical shape adjacent the conduit outlet that tapers outwardly away from the center axis of the hollow chamber and toward the conduit outlet such that the slurry flowing through the conduit is directed away from the center axis of the hollow chamber upon being discharged from the conduit outlet. One or more target surfaces is disposed in the chamber outlet and secured to the conduit such that an edge of the one or more target surfaces atomize the gas and slurry flowing past the edge to provide a uniform coating of a slurry and gas droplet formed by the spray device onto a surface of a component.

In one embodiment of the spray device, the one or more target surfaces are secured to the conduit such that a center axis of the one or more target surfaces are off set from the center axis of the hollow chamber at the chamber outlet. In another embodiment, the one or more target surfaces are secured to the conduit such that a center axis of the one or more target surfaces align with the center axis of the hollow chamber at the chamber outlet.

In one embodiment, at least one section of the hollow chamber is helically shaped, extending around the center axis of the hollow chamber to increase a shear force at the edge of the one or more target surfaces to provide a finer atomization of slurry and gas flowing past the edge of the one or more target surfaces. In another embodiment, at least one section of the conduit is helically shaped, extending around the center axis of the hollow chamber to increase a shear force at the edge of the one or more target surfaces to provide a finer atomization of slurry and gas flowing past the edge of the one or more target surfaces.

In one embodiment, a method of providing a coating to a component is provided and includes providing a spray device. Slurry comprising a fluid and ceramic particles is supplied to the spray device. The slurry is discharged from the spray device to form droplets containing the fluid to impact the component. As the droplets traverse from the spray device towards the component the fluid contained in the droplets evaporates prior to strengthen adhesion of the droplets to the component compared to adhesion of the droplet to the component had the fluid in the droplets not evaporated. In addition, the evaporation of the fluid contained in the droplets results in a more uniform coating on the component as compared to a coating formed if the fluid had not evaporated from the droplets.

FIG. 22 illustrates a perspective view of another embodiment of an atomizing spray device 2200. FIGS. 23 and 24 illustrate cross-sectional views of the atomizing spray device 2200 along line 23-23 shown in FIG. 22. The atomizing spray device 2200 represents one or more of the spray devices described herein, such as the spray device 710 shown in FIG. 5. The spray device 2200 has an outer housing 2202 having a hollow chamber 2204 disposed therethrough. The hollow chamber 2204 extends through the housing 2202 from plural different or separate chamber inlets 2206, 2208 to plural common or mixed chamber outlets 2210, 2212. The different inlets 2206, 2208 separately receive the different fluid streams that are mixed to form the slurry. For example, the inlet 2206 can be referred to as an outer inlet 2206 and the inlet 2208 can be referred to as an inner inlet 2208 as the inlet 2206 partially or completely encircles the inlet 2208. In one embodiment, the outer inlet 2206 receives a first fluid (e.g., air, argon, nitrogen, or another gas) and the inner inlet 2208 receives a different, second fluid (e.g., ceramic particles disposed within a fluid such as an alcohol or water). Alternatively, the inner inlet 2208 receives the ceramic-based fluid and the outer inlet 2206 receives the other fluid. The fluids may be received via conduits connected to pumps.

The chamber 2204 is shaped to keep the fluids received via the different inlets 2206, 2208 separate in an inlet segment or stage 2214 (shown in FIG. 24) of the housing 2202. The chamber 2204 is shaped so that the fluids received via the different inlets 2206, 2208 merge together and are mixed in a mixing segment or stage 2216 (shown in FIG. 24) of the housing 2202. The chamber 2204 is shaped to separate the mixture of the fluids into plural separate streams that are ejected from the housing 2202 via plural different or separate outlets or orifices 2210, 2212 in an output segment or stage 2218 (shown in FIG. 24) of the housing 2202. In this way, the chamber 2204 extends from the inlets 2206, 2208 to the outlets 2210, 2212 through the stages 2214, 2216, 2218. The shape of the chamber 2204 separately receives the different fluids, mixes the fluids inside the housing 2202, and sprays the mixed fluids out of the housing 2202 via the outlets 2218 so that the mixed fluids are sprayed onto a component, such as a thermal barrier coating of a turbine engine.

In the illustrated embodiment, the outlets 2210, 2212 of the housing 2202 are oppositely oriented. For example, the outlets 2210, 2212 face opposite directions such that the mixed fluids are sprayed from the housing 2202 in opposite directions. This directs the droplets formed by the mixed fluids in different directions and onto different portions of a component to which the additive is being applied. Alternatively, the housing 2202 may include a greater number of outlets 2210, 2212, only a single outlet 2210 or 2212, or outlets 2210, 2212 that face in different, but not opposite, directions.

As shown in FIGS. 23 and 24, the portions of the chamber 2204 that carry the fluids in the inlet stage 2214 are larger (e.g., have larger diameters) than the portions of the chamber 2204 in the outlet stage 2218 so that the fluids accelerate during movement through the housing 2202 in the chamber 2204 as the fluids are pumped or otherwise forced into the housing 2202 via the inlets 2206, 2208.

During operation of the spray device 2200, the fluid such as air, nitrogen, argon, or the like, is pumped into the chamber 2204 via the outer inlet 2206 by a pump (not shown) while another fluid, such as alcohol or water, having ceramic particles therein, is pumped into the chamber 2204 by a pump (not shown) via the inner inlet 2208. The fluids mix inside the mixing segment 2216 of the chamber 2204, and are forced through the chamber 2204 toward the outlets 2210, 2212. The mixed fluids are discharged from the housing 2202 via the outlets 2210, 2212 and form two-phase droplets. As these droplets travel toward the surface of the component, the non-ceramic-based fluid evaporates, thereby leaving the ceramic particles to provide a uniform coating of the surface of the component.

FIG. 25 illustrates a perspective view of another embodiment of an atomizing spray device 2500. FIGS. 26 and 27 illustrate cross-sectional views of the atomizing spray device 2500 along line 26-26 shown in FIG. 25. The atomizing spray device 2500 represents one or more of the spray devices described herein, such as the spray device 710 shown in FIG. 5. The spray device 2500 has an outer housing 2502 having a hollow chamber 2504 disposed therethrough. The hollow chamber 2504 extends through the housing 2502 from plural different or separate chamber inlets 2506, 2508 to a common or mixed chamber outlet 2518. The different inlets 2506, 2508 separately receive the different fluid streams that are mixed to form the slurry. For example, the inlet 2506 can be referred to as an outer inlet 2506 and the inlet 2508 can be referred to as an inner inlet 2508 as the inlet 2506 partially or completely encircles the inlet 2508. In one embodiment, the outer inlet 2506 receives a first fluid (e.g., air, argon, nitrogen, or another gas) and the inner inlet 2508 receives a different, second fluid (e.g., ceramic particles disposed within a fluid such as an alcohol or water). Alternatively, the inner inlet 2508 receives the ceramic-based fluid and the outer inlet 2506 receives the other fluid. The fluids may be received via conduits connected to pumps.

The chamber 2504 is shaped to keep the fluids received via the different inlets 2506, 2508 separate in an inlet segment or stage 2514 of the housing 2502. The chamber 2504 is shaped so that the fluids received via the different inlets 2506, 2508 merge together and are mixed in a mixing segment or stage 2516 of the housing 2502. The chamber 2504 is shaped to separate the mixture of the fluids into plural separate streams that are ejected from the housing 2502 via a single outlet or orifice 2518 in an output segment or stage 2520 of the housing 2502. In this way, the chamber 2504 extends from the inlets 2506, 2508 to the outlet 2518 through the stages 2514, 2516, 2520. The shape of the chamber 2504 separately receives the different fluids, mixes the fluids inside the housing 2502, and sprays the mixed fluids out of the housing 2502 via the outlet 2518 so that the mixed fluids are sprayed onto a component, such as a thermal barrier coating of a turbine engine. In the illustrated embodiment, the housing 2502 includes a single outlet through which the mixed fluid is discharged from the housing 2502. Alternatively, the housing 2502 may include a greater number of outlets 2518.

Figure 26:
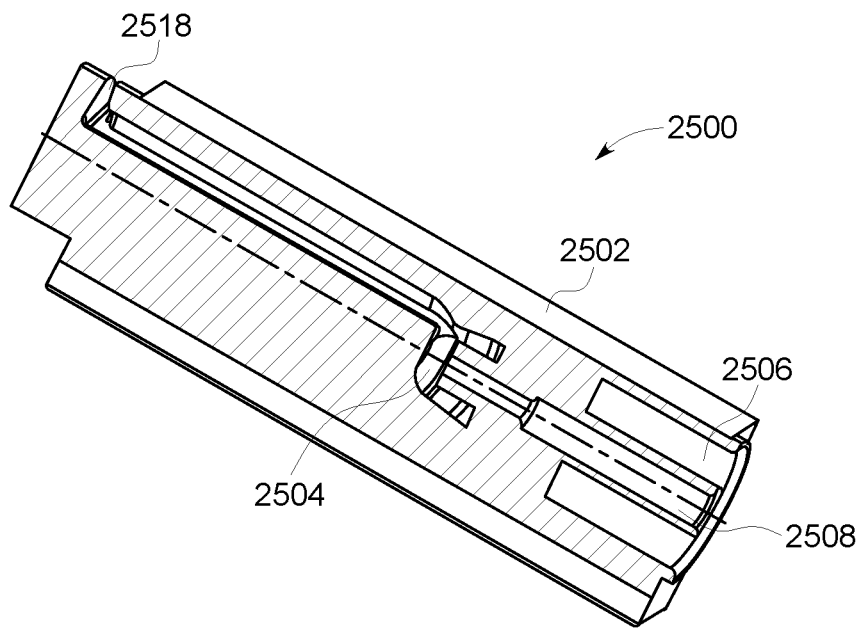
FIG. 26 illustrates a cross-sectional view of the atomizing spray device shown in FIG. 25.
Figure 27:
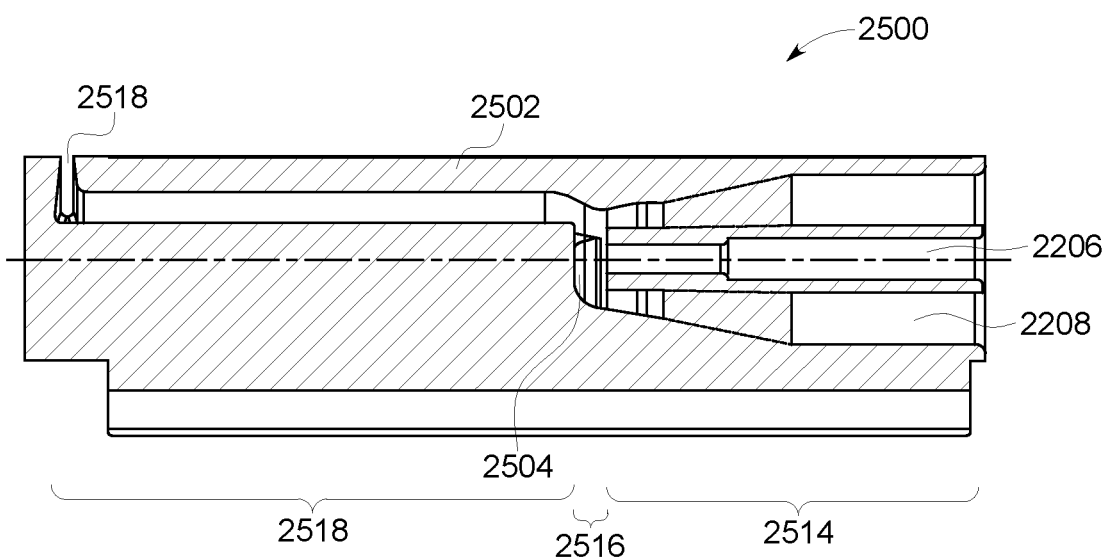
FIG. 27 illustrates a cross-sectional view of the atomizing spray device shown in FIG. 25.

As shown in FIGS. 26 and 27, the portions of the chamber 2504 that carry the fluids in the inlet stage 2514 are larger (e.g., have larger diameters) than the portions of the chamber 2504 in the outlet stage 2520 so that the fluids accelerate during movement through the housing 2502 in the chamber 2504 as the fluids are pumped or otherwise forced into the housing 2502 via the inlets 2506, 2508.

During operation of the spray device 2500, the fluid such as air, nitrogen, argon, or the like, is pumped into the chamber 2504 via the outer inlet 2506 by a pump (not shown) while another fluid, such as alcohol or water, having ceramic particles therein, is pumped into the chamber 2504 by a pump (not shown) via the inner inlet 2508. The fluids mix inside the mixing segment 2516 of the chamber 2504, and are forced through the chamber 2504 toward the outlets 2518. The mixed fluids are discharged from the housing 2502 via the outlets 2518 and form two-phase droplets. As these droplets travel toward the surface of the component, the non-ceramic-based fluid evaporates, thereby leaving the ceramic particles to provide a uniform coating of the surface of the component.

In the embodiments of the spray devices 2200, 2500 shown in FIGS. 22 through 27, the droplets formed by the mixed fluids are directed out of the housings 2202, 2502 along directions that are transverse (or perpendicular) to a direction in which the fluids are received into the inlets of the housings 2202, 2502. For example, the housing 2202 receives the fluids along directions 2222, 2224 (shown in FIG. 22), but sprays the mixed fluid droplets along directions 2226, 2228 (shown in FIG. 22) that are generally (at least 40%), predominantly (at least 50%), or substantially (at least 90%) perpendicular to the directions 2222, 2224 in one embodiment. The housing 2502 receives the fluids along directions 2522, 2524 (shown in FIG. 25), but sprays the mixed fluid droplets along directions 2526 (shown in FIG. 25) that are generally (at least 40%), predominantly (at least 50%), or substantially (at least 90%) perpendicular to the directions 2522, 2524 in one embodiment.

Figure 28:
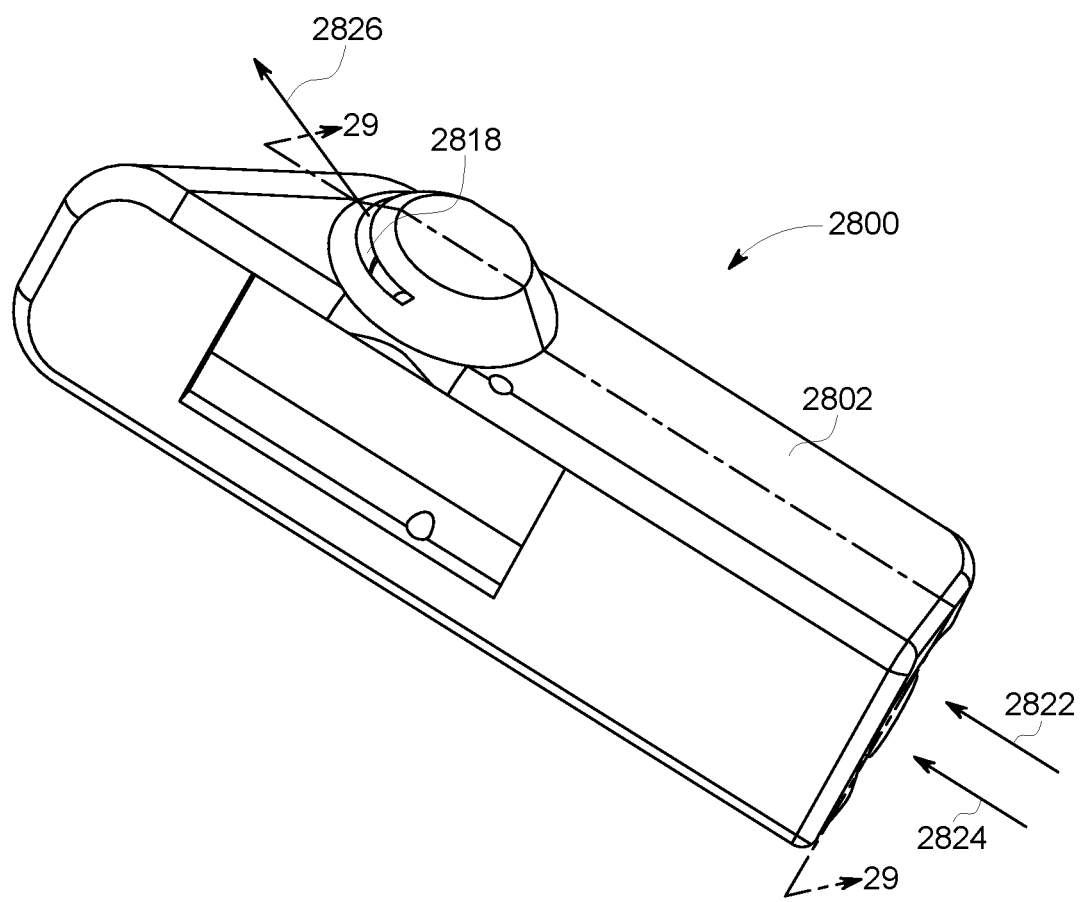
FIG. 28 illustrates a perspective view of another embodiment of an atomizing spray device.
Figure 29:
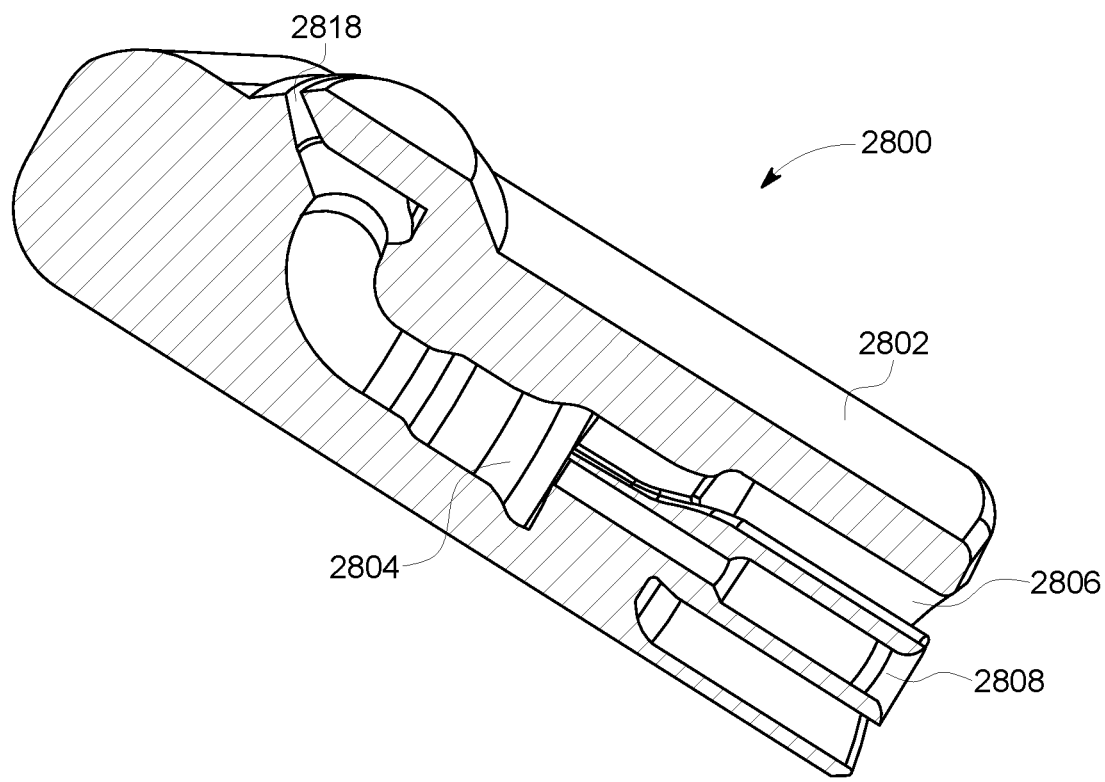
FIG. 29 illustrates a cross-sectional view of the atomizing spray device shown in FIG. 28.
Figure 30:
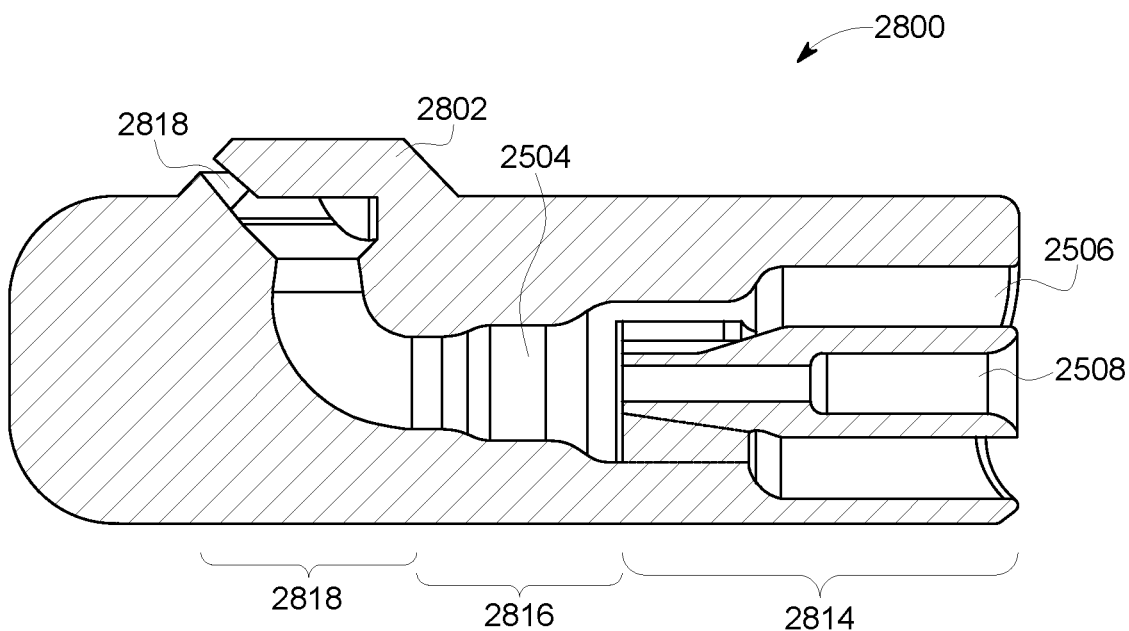
FIG. 30 illustrates a cross-sectional view of the atomizing spray device shown in FIG. 28.

FIG. 28 illustrates a perspective view of another embodiment of an atomizing spray device 2800. FIGS. 29 and 30 illustrate cross-sectional views of the atomizing spray device 2800 along line 29-29 shown in FIG. 28. The atomizing spray device 2800 represents one or more of the spray devices described herein, such as the spray device 710 shown in FIG. 5. The spray device 2800 has an outer housing 2802 having a hollow chamber 2804 disposed therethrough. The hollow chamber 2804 extends through the housing 2802 from plural different or separate chamber inlets 2806, 2808 (shown in FIGS. 29 and 30) to a common or mixed chamber outlet 2818. The different inlets 2806, 2808 separately receive the different fluid streams that are mixed to form the slurry. For example, the inlet 2806 can be referred to as an outer inlet 2806 and the inlet 2808 can be referred to as an inner inlet 2808 as the inlet 2806 partially or completely encircles the inlet 2808. In one embodiment, the outer inlet 2806 receives a first fluid (e.g., air, argon, nitrogen, or another gas) and the inner inlet 2808 receives a different, second fluid (e.g., ceramic particles disposed within a fluid such as an alcohol or water). Alternatively, the inner inlet 2808 receives the ceramic-based fluid and the outer inlet 2806 receives the other fluid. The fluids may be received via conduits connected to pumps.

The chamber 2804 is shaped to keep the fluids received via the different inlets 2806, 2808 separate in an inlet segment or stage 2814 of the housing 2802. The chamber 2804 is shaped so that the fluids received via the different inlets 2806, 2808 merge together and are mixed in a mixing segment or stage 2816 of the housing 2802. The chamber 2804 is shaped to separate the mixture of the fluids into plural separate streams that are ejected from the housing 2802 via a single outlet or orifice 2818 in an output segment or stage 2820 of the housing 2802. In this way, the chamber 2804 extends from the inlets 2806, 2808 to the outlets 2818 through the stages 2814, 2816, 2820. The shape of the chamber 2804 separately receives the different fluids, mixes the fluids inside the housing 2802, and sprays the mixed fluids out of the housing 2802 via the outlet 2818 so that the mixed fluids are sprayed onto a component, such as a thermal barrier coating of a turbine engine. In the illustrated embodiment, the housing 2802 includes a single outlet through which the mixed fluid is discharged from the housing 2802. Alternatively, the housing 2802 may include a greater number of outlets 2818.

During operation of the spray device 2800, the fluid such as air, nitrogen, argon, or the like, is pumped into the chamber 2804 via the outer inlet 2806 by a pump (not shown) while another fluid, such as alcohol or water, having ceramic particles therein, is pumped into the chamber 2804 by a pump (not shown) via the inner inlet 2808. The fluids mix inside the mixing segment 2816 of the chamber 2804, and are forced through the chamber 2804 toward the outlets 2818. The mixed fluids are discharged from the housing 2802 via the outlets 2818 and form two-phase droplets. As these droplets travel toward the surface of the component, the non-ceramic-based fluid evaporates, thereby leaving the ceramic particles to provide a uniform coating of the surface of the component.

In the embodiment of the spray device 2800 shown in FIGS. 28 through 30, the droplets formed by the mixed fluids are directed out of the housing 2802 along directions that are transverse, but not perpendicular, to a direction in which the fluids are received into the inlets of the housing 2802. For example, the housing 2802 receives the fluids along directions 2822, 2824 (shown in FIG. 28), but sprays the mixed fluid droplets along directions 2826 (shown in FIG. 28) that are not perpendicular to the directions 2822, 2824 in one embodiment. The directions 2826 may be oriented at an acute angle relative to the directions 2822, 2824.

Figure 31:
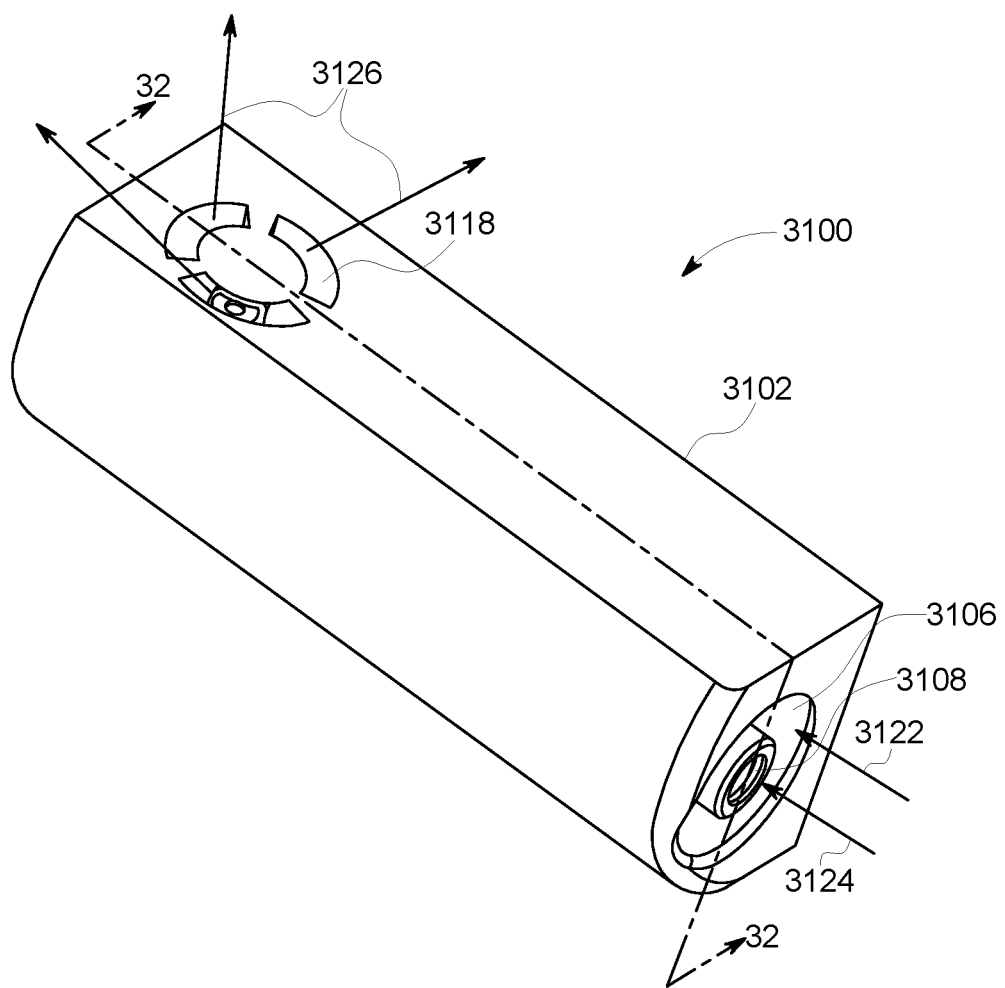
FIG. 31 illustrates a perspective view of another embodiment of an atomizing spray device.
Figure 32:
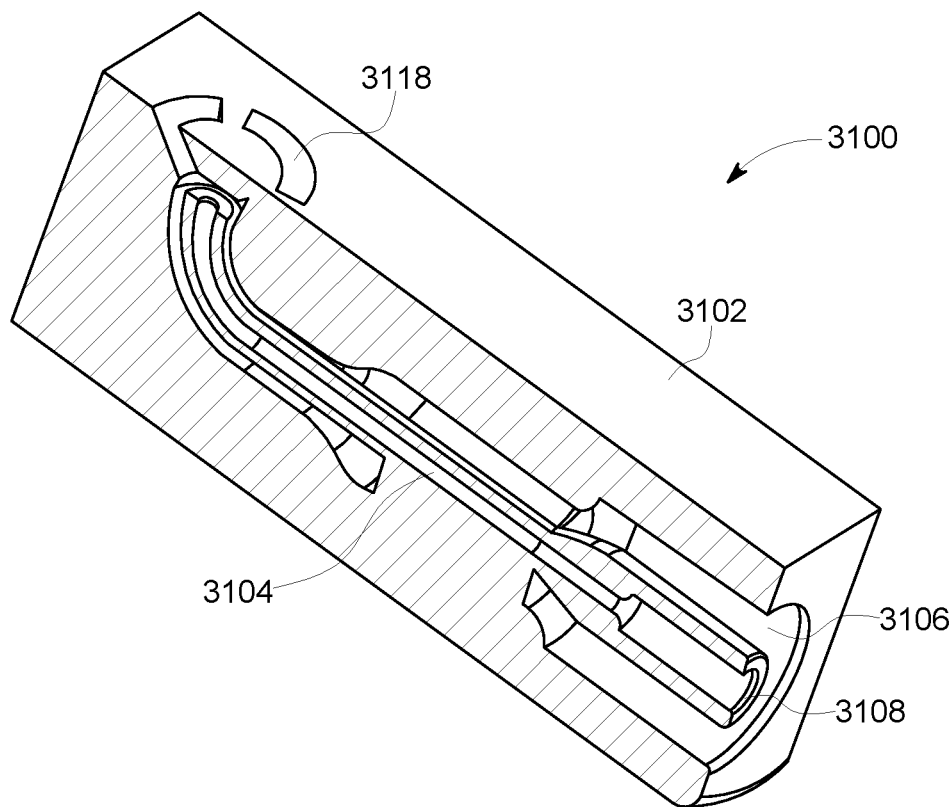
FIG. 32 illustrates a cross-sectional view of the atomizing spray device shown in FIG. 31.
Figure 33:
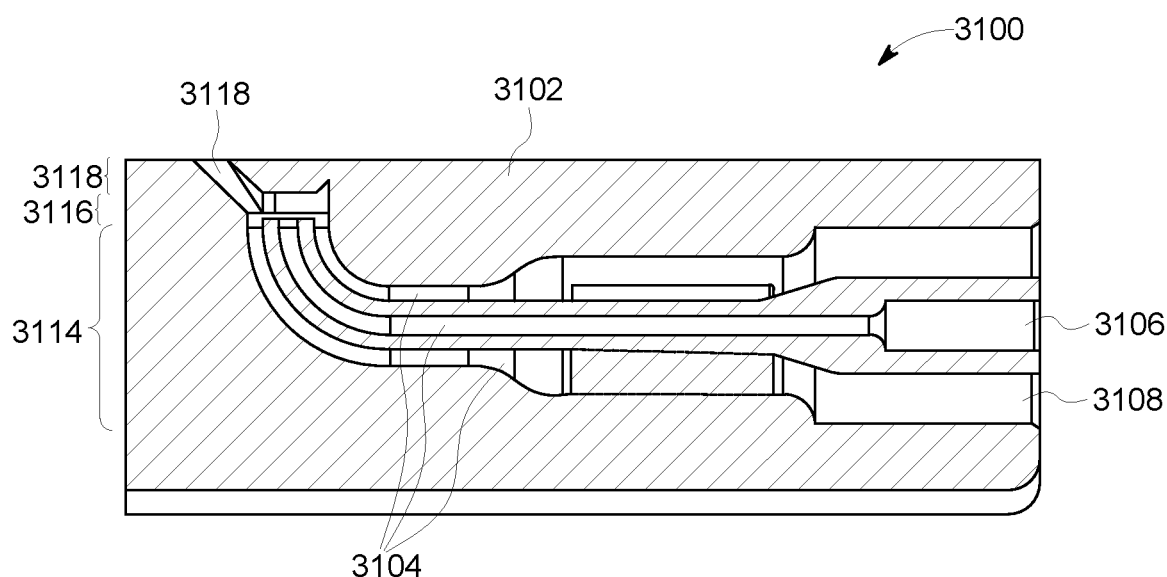
FIG. 33 illustrates a cross-sectional view of the atomizing spray device shown in FIG. 31.

FIG. 31 illustrates a perspective view of another embodiment of an atomizing spray device 3100. FIGS. 32 and 33 illustrate cross-sectional views of the atomizing spray device 3100 along line 32-32 shown in FIG. 31. The atomizing spray device 3100 represents one or more of the spray devices described herein, such as the spray device 710 shown in FIG. 5. The spray device 3100 has an outer housing 3102 having a hollow chamber 3104 disposed therethrough. The hollow chamber 3104 extends through the housing 3102 from plural different or separate chamber inlets 3106, 3108 to a common or mixed chamber outlet 3118. The different inlets 3106, 3108 separately receive the different fluid streams that are mixed to form the slurry. For example, the inlet 3106 can be referred to as an outer inlet 3106 and the inlet 3108 can be referred to as an inner inlet 3108 as the inlet 3106 partially or completely encircles the inlet 3108. In one embodiment, the outer inlet 3106 receives a first fluid (e.g., air, argon, nitrogen, or another gas) and the inner inlet 3108 receives a different, second fluid (e.g., ceramic particles disposed within a fluid such as an alcohol or water). Alternatively, the inner inlet 3108 receives the ceramic-based fluid and the outer inlet 3106 receives the other fluid. The fluids may be received via conduits connected to pumps.

The chamber 3104 is shaped to keep the fluids received via the different inlets 3106, 3108 separate in an inlet segment or stage 3114 of the housing 3102. In contrast to the embodiments of the spray devices shown in FIGS. 22 through 30, the chamber 3104 is shaped to keep the different fluids received via the different inlets 3106, 3108 separate throughout a majority or substantially all (e.g., at least 90% of the total volume) of the chamber 3104. As shown in FIG. 31, the chamber 3104 includes an inlet stage that keeps the fluids separate throughout almost all of the housing 3102. The chamber 3104 combines the fluids in a mixing segment or stage 3116 of the housing 3102. In contrast to one or more other embodiments of the spray devices described herein that mix the fluids midway between the inlets and the outlet(s) (e.g., the spray devices 2200, 2500, 2800), the spray device 3400 mixes the fluids in a location that is closer to the outlet 3418 than the inlets 3406, 3408.

The chamber 3104 is shaped to separate the mixture of the fluids into plural separate streams that are ejected from the housing 3102 via the outlet or orifice 3118 in an output segment or stage 3120 of the housing 3102. In this way, the chamber 3104 extends from the inlets 3106, 3108 to the outlets 3118 through the stages 3114, 3116, 3118. The shape of the chamber 3104 separately receives the different fluids, mixes the fluids inside the housing 3102, and sprays the mixed fluids out of the housing 3102 via the outlet 3118 so that the mixed fluids are sprayed onto a component, such as a thermal barrier coating of a turbine engine.

During operation of the spray device 3100, the fluid such as air, nitrogen, argon, or the like, is pumped into the chamber 3104 via the outer inlet 3106 by a pump (not shown) while another fluid, such as alcohol or water, having ceramic particles therein, is pumped into the chamber 3104 by a pump (not shown) via the inner inlet 3108. The fluids mix inside the mixing segment 3116 of the chamber 3104, and are forced through the chamber 3104 toward the outlets 3118. The mixed fluids are discharged from the housing 3102 via the outlets 3118 and form two-phase droplets. As these droplets travel toward the surface of the component, the non-ceramic-based fluid evaporates, thereby leaving the ceramic particles to provide a uniform coating of the surface of the component.

In the embodiment of the spray device 3100 shown in FIGS. 31 through 33, the droplets formed by the mixed fluids are directed out of the housing 3102 along directions that are transverse, but not perpendicular, to a direction in which the fluids are received into the inlets of the housing 3102. For example, the housing 3102 receives the fluids along directions 3122, 3124 (shown in FIG. 31), but sprays the mixed fluid droplets along directions 3126 (shown in FIG. 31) that are not perpendicular to the directions 3122, 3124 in one embodiment.

Figure 34:
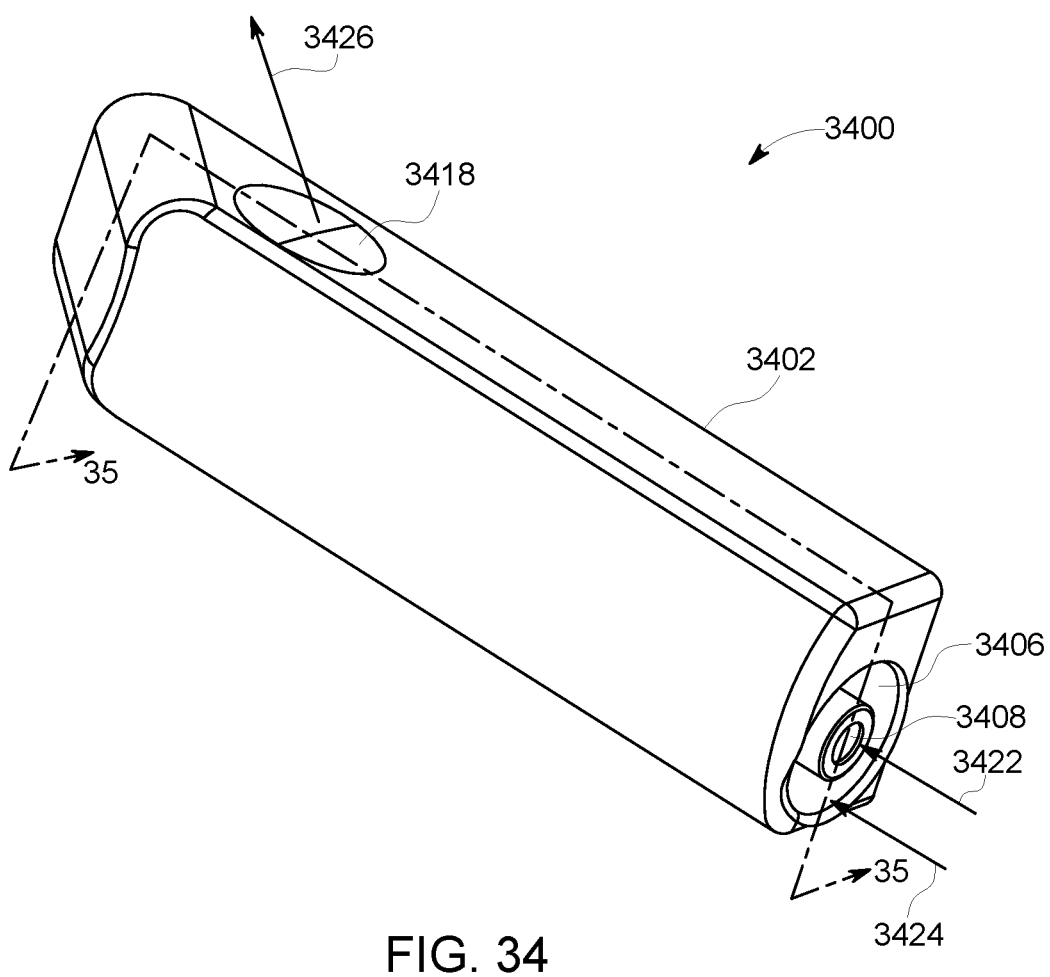
FIG. 34 illustrates a perspective view of another embodiment of an atomizing spray device.
Figure 35:
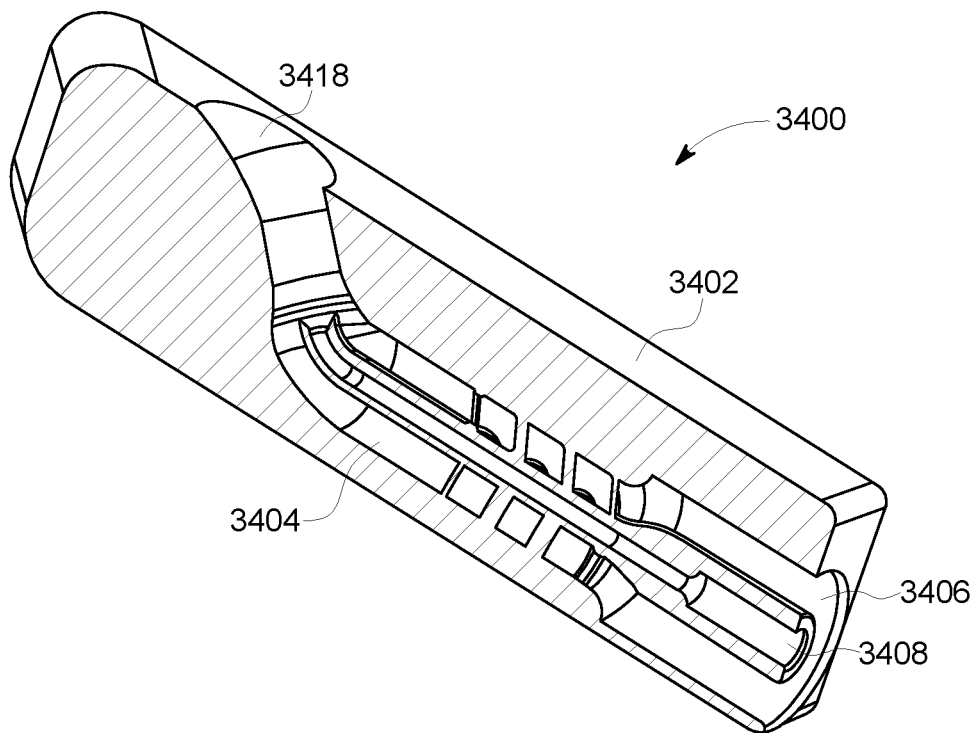
FIG. 35 illustrates a cross-sectional view of the atomizing spray device shown in FIG. 34.
Figure 36:
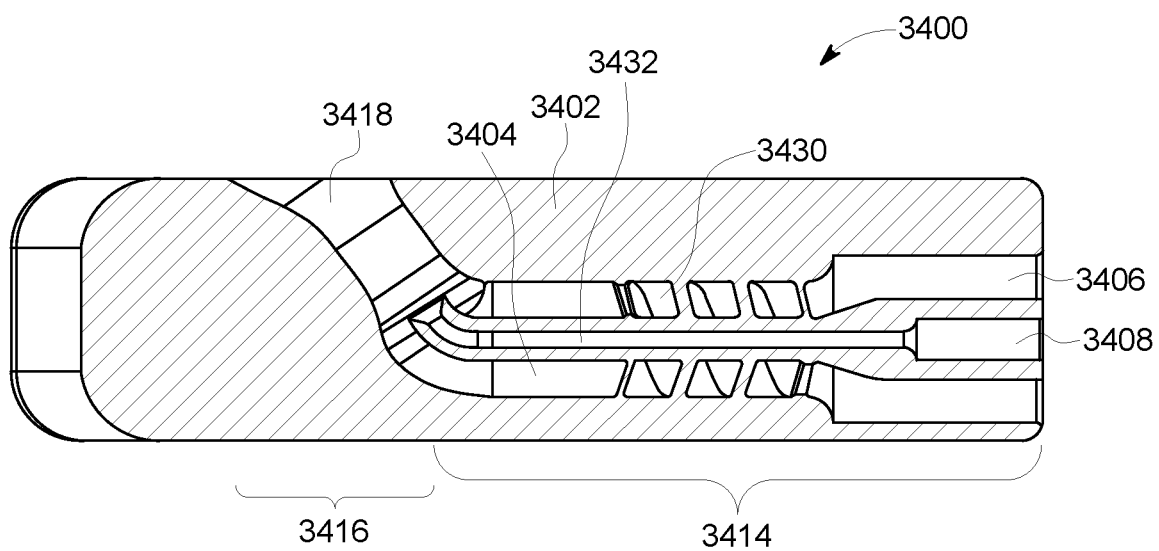
FIG. 36 illustrates a cross-sectional view of the atomizing spray device shown in FIG. 34.

FIG. 34 illustrates a perspective view of another embodiment of an atomizing spray device 3400. FIGS. 35 and 36 illustrate cross-sectional views of the atomizing spray device 3400 along line 35-35 shown in FIG. 34. The atomizing spray device 3400 represents one or more of the spray devices described herein, such as the spray device 710 shown in FIG. 5. The spray device 3400 has an outer housing 3402 having a hollow chamber 3404 disposed therethrough. The hollow chamber 3404 extends through the housing 3402 from plural different or separate chamber inlets 3406, 3408 to a common or mixed chamber outlet 3418. The different inlets 3406, 3408 separately receive the different fluid streams that are mixed to form the slurry. For example, the inlet 3406 can be referred to as an outer inlet 3406 and the inlet 3408 can be referred to as an inner inlet 3408 as the inlet 3406 partially or completely encircles the inlet 3408. In one embodiment, the outer inlet 3406 receives a first fluid (e.g., air, argon, nitrogen, or another gas) and the inner inlet 3408 receives a different, second fluid (e.g., ceramic particles disposed within a fluid such as an alcohol or water). Alternatively, the inner inlet 3408 receives the ceramic-based fluid and the outer inlet 3406 receives the other fluid. The fluids may be received via conduits connected to pumps.

The chamber 3404 is shaped to keep the fluids received via the different inlets 3406, 3408 separate in an inlet segment or stage 3414 of the housing 3402. In contrast to the embodiments of the spray devices shown in FIGS. 22 through 30, the chamber 3404 has a helical shape throughout all or at least a portion of the inlet stage 3414, as shown in FIG. 36. For example, a first portion 3430 of the chamber 3404 operates as a conduit for the fluid received via the inlet 3406 and a different, second portion 3432 of the chamber 3404 operates as a conduit for the fluid received via the inlet 3408. The first portion 3430 of the chamber 3404 helically wraps around the second portion 3432 of the chamber 304 in the inlet stage 3414. This winding of the first portion 3430 of the chamber 3404 can help to mix the ceramic particles within the fluid more evenly (relative to a non-helically shaped conduit).

The chamber 3404 combines the fluids in a mixing segment or stage 3416 of the housing 3402. The chamber 3404 is shaped to eject the mixed fluids from the housing 3402 via the outlet or orifice 3418 in the mixing stage 3416 of the housing 3402. The shape of the chamber 3404 separately receives the different fluids, mixes the fluids inside the housing 3402, and sprays the mixed fluids out of the housing 3402 via the outlet 3418 so that the mixed fluids are sprayed onto a component, such as a thermal barrier coating of a turbine engine.

During operation of the spray device 3400, the fluid such as air, nitrogen, argon, or the like, is pumped into the chamber 3404 via the outer inlet 3406 by a pump (not shown) while another fluid, such as alcohol or water, having ceramic particles therein, is pumped into the chamber 3404 by a pump (not shown) via the inner inlet 3408. The fluids mix inside the mixing segment 3416 of the chamber 3404, and are forced through the chamber 3404 toward the outlets 3418. The mixed fluids are discharged from the housing 3402 via the outlets 3418 and form two-phase droplets. As these droplets travel toward the surface of the component, the non-ceramic-based fluid evaporates, thereby leaving the ceramic particles to provide a uniform coating of the surface of the component.

In the embodiment of the spray device 3400 shown in FIGS. 34 through 33, the droplets formed by the mixed fluids are directed out of the housing 3402 along directions that are transverse, but not perpendicular, to a direction in which the fluids are received into the inlets of the housing 3402. For example, the housing 3402 receives the fluids along directions 3422, 3424 (shown in FIG. 34), but sprays the mixed fluid droplets along directions 3426 (shown in FIG. 34) that are not perpendicular to the directions 3422, 3424 in one embodiment.

In the embodiments of the atomizing spray devices shown herein, the inlets through which the fluids are received (e.g., the fluid in one inlet and the fluid mixture of ceramic particles and another fluid or gas in another inlet) are on one side or end of the housings of the spray devices, while the outlets through which the droplets formed by a mixture of these fluids are ejected from the spray devices are on adjacent or intersecting side surfaces of the housings. For example, the surface of the housing through which the droplets are ejected from the housing intersects the surface of the housing through which the fluids are received into the housing.

In one embodiment, an atomizing spray device includes a housing having plural inlets and one or more outlets fluidly coupled with each other by an interior chamber. The inlets include a first inlet shaped to receive a first fluid and a second inlet shaped to receive a slurry of ceramic particles and a second fluid. The interior chamber in the housing is shaped to mix the first fluid received via the first inlet with the slurry received via the second inlet inside the housing to form a mixture in a location between the inlets and the one or more outlets. The interior chamber in the housing also is shaped to direct the mixture formed inside the housing as droplets outside of the housing via the one or more outlets such that, based on a discharged amount of the first fluid in the droplets, the first fluid promotes evaporation of the second fluid as the droplets traverse from the housing toward a surface of a component.

In one example, the first fluid includes air.

In one example, the inlets are located in a first surface of the housing and the one or more outlets are located in a second surface of the housing that intersects the first surface.

In one example, the housing includes at least two of the outlets located in the housing to direct the mixture in opposite directions out of the housing.

In one example, the one or more outlets are located in the housing to direct the mixture in at least one direction that is perpendicular to a direction in which the first fluid or the second fluid is received into the inlets.

In one example, the one or more outlets are located in the housing to direct the mixture in at least one direction that is oriented at an acute angle relative to a direction in which the first fluid or the second fluid is received into the inlets.

In one example, the chamber in the housing is shaped to mix the first fluid and the slurry in a location that is midway between the inlets and the one or more outlets in the housing.

In one example, the chamber in the housing is shaped to mix the first fluid and the slurry in a location that is closer to the one or more outlets than the inlets.

In one example, the chamber in the housing forms a first conduit portion that carries the first fluid in the housing and a second conduit portion that carries the slurry in the housing. The first conduit portion can helically wind around the exterior of the second conduit portion.

In one example, the first and second inlets define separate openings into the chamber in the housing, with the first inlet encircling the second inlet at one end of the housing.

In one example, the one or more outlets of the housing are shaped to spray the mixture onto the surface of the component at a standoff distance of at least two centimeters.

In one embodiment, a method includes receiving a first fluid into a housing of an atomizing spray device through a first inlet of the housing, receiving a slurry of ceramic particles and a second fluid into the housing of the atomizing spray device through a second inlet of the housing, mixing the first fluid and the slurry in an interior chamber of the housing of the atomizing spray device to form a mixture in a location between the first and second inlets and one or more outlets, and directing the mixture outside of the housing of the atomizing spray device as droplets via the one or more outlets such that, based on a discharged amount of the first fluid in the droplets, the first fluid promotes evaporation of the second fluid as the droplets traverse from the housing toward a surface of a component.

In one example, the first fluid includes air.

In one example, the second fluid includes an alcohol.

In one example, directing the mixture outside of the housing includes directing the mixture in opposite directions out of the housing.

In one example, mixing the first fluid and the slurry occurs in a location that is midway between the inlets and the one or more outlets in the housing.

In one embodiment, an atomizing spray device includes a housing having plural inlets through a first surface of the housing and one or more outlets through a different, second surface of the housing. The housing includes an interior chamber that fluidly couples the inlets with the one or more outlets. The inlets include a first inlet shaped to receive a first fluid and a second inlet shaped to receive a slurry of ceramic particles and a second fluid. The interior chamber in the housing is shaped to mix the first fluid received via the first inlet with the slurry received via the second inlet inside the housing to form a mixture in a location between the inlets and the one or more outlets. The interior chamber in the housing also is shaped to direct the mixture formed inside the housing as droplets outside of the housing via the one or more outlets such that, based on a discharged amount of the first fluid in the droplets, the first fluid promotes evaporation of the second fluid as the droplets traverse from the housing toward a surface of a component.

In one example, the first fluid includes an alcohol.

In one example, the inlets are located in the first surface of the housing and the one or more outlets are located in the second surface of the housing that intersects the first surface.

In one example, the housing includes at least two of the outlets located in the housing to direct the mixture in opposite directions out of the housing.

In one example, the chamber in the housing forms a first conduit portion that carries the first fluid in the housing and a second conduit portion that carries the slurry in the housing. The first conduit portion can helically wind around the exterior of the second conduit portion.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 38 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising:
   receiving a first fluid into a housing of an atomizing spray device through a first inlet of the housing;
   receiving a slurry of ceramic particles and a second fluid into the housing of the atomizing spray device through a second inlet of the housing;
   mixing the first fluid and the slurry in an interior chamber of the housing of the atomizing spray device to form a mixture in a location between the first and second inlets and one or more outlets; and
   directing the mixture outside of the housing of the atomizing spray device as droplets via the one or more outlets such that, based on a discharged amount of the first fluid in the droplets, the first fluid promotes evaporation of the second fluid as the droplets traverse from the housing toward a surface of a component
   wherein the first fluid is received by a first conduit defined by a first chamber disposed in the housing, and the slurry is received by a second conduit defined by a second chamber disposed in the housing, and
   wherein the first conduit and the second conduit are both helically shaped about a central axis of the interior chamber, with the first chamber of the first conduit extending helically around an exterior of the second chamber of the second conduit.

2. The method of claim 1, wherein the first fluid includes air.

3. The method of claim 1, wherein the second fluid includes an alcohol.

4. The method of claim 1, wherein directing the mixture outside of the housing includes directing the mixture in opposite directions out of the housing.

5. The method of claim 1, wherein mixing the first fluid and the slurry occurs in a location that is midway between the inlets and the one or more outlets in the housing.

6. The method of claim 1, wherein the slurry comprises at least a liquid and a solid.

7. The method of claim 1, wherein the mixture is directed in at least one direction that is perpendicular to a direction in which the first fluid or the slurry is received.

8. The method of claim 1, wherein the mixture is directed in at least one direction that is oriented at an acute angle relative to a direction in which the first fluid or the slurry is received into the inlets.

9. The method of claim 1, wherein the first fluid and the slurry are mixed in a location that is closer to the one or more outlets than the inlets.

10. The method of claim 1, wherein the mixture is directed through at least one outlet is oval-shaped.

11. The method of claim 1, further comprising spraying the mixture onto the surface of the component at a standoff distance of at least two centimeters.

12. A method comprising:
   receiving, by a helically shaped first conduit defined by a first chamber disposed in a housing, a first fluid into the housing of an atomizing spray device through a first inlet of the housing, wherein the first conduit is helically shaped about a central axis of an interior chamber;
   receiving, by a helically shaped second conduit defined by a second chamber disposed in the housing, a slurry of ceramic particles and a second fluid into the housing of the atomizing spray device through a second inlet of the housing, the slurry comprising at least a liquid and a solid, wherein the second conduit is helically shaped about the central axis of the interior chamber, with the first chamber of the first conduit extending helically around an exterior of the second chamber of the second conduit;
   mixing the first fluid and the slurry in the interior chamber of the housing of the atomizing spray device to form a mixture in a location between the first and second inlets and one or more outlets; and directing the mixture outside of the housing of the atomizing spray device as droplets via the one or more outlets such that, based on a discharged amount of the first fluid in the droplets, the first fluid promotes evaporation of the second fluid as the droplets traverse from the housing toward a surface of a component.

13. The method of claim 12, wherein directing the mixture outside of the housing includes directing the mixture in opposite directions out of the housing.

14. The method of claim 12, wherein mixing the first fluid and the slurry occurs in a location that is midway between the inlets and the one or more outlets in the housing.

15. The method of claim 12, wherein the mixture is directed in at least one direction that is perpendicular to a direction in which the first fluid or the slurry is received.

16. The method of claim 12, wherein the mixture is directed in at least one direction that is oriented at an acute angle relative to a direction in which the first fluid or the slurry is received into the inlets.

17. The method of claim 12, wherein the first fluid and the slurry are mixed in a location that is closer to the one or more outlets than the inlets.

18. The method of claim 12, further comprising spraying the mixture onto the surface of the component at a standoff distance of at least two centimeters.

* * * * *